(12) United States Patent
Nakamura et al.

(10) Patent No.: US 7,768,892 B2
(45) Date of Patent: Aug. 3, 2010

(54) RECORDING DEVICE, REPRODUCTION DEVICE, HOST DEVICE, DRIVE DEVICE, RECORDING METHOD, REPRODUCTION METHOD, PROGRAM, AND INFORMATION RECORDING MEDIUM

(75) Inventors: Tadashi Nakamura, Nara (JP); Yoshiho Gotoh, Osaka (JP)

(73) Assignee: Panasonic Corporation, Osaka (JP)

( * ) Notice: Subject to any disclaimer, the term of this patent is extended or adjusted under 35 U.S.C. 154(b) by 912 days.

(21) Appl. No.: 10/595,627

(22) PCT Filed: Mar. 23, 2005

(86) PCT No.: PCT/JP2005/005286
§ 371 (c)(1),
(2), (4) Date: May 1, 2006

(87) PCT Pub. No.: WO2005/091290
PCT Pub. Date: Sep. 29, 2005

(65) Prior Publication Data
US 2009/0016181 A1    Jan. 15, 2009

(30) Foreign Application Priority Data
Mar. 23, 2004  (JP) ............................. 2004-085823
Apr. 2, 2004   (JP) ............................. 2004-110584
May 7, 2004    (JP) ............................. 2004-138920

(51) Int. Cl.
*G11B 20/12* (2006.01)

(52) U.S. Cl. ................ 369/59.25; 369/47.1; 369/53.21; 369/47.21; 369/47.47

(58) Field of Classification Search .............. 369/30.04, 369/30.07, 30.09, 59.25, 53.27, 3.07, 47.11, 369/53.18, 47.19, 53.16, 44.28, 13.06, 47.1, 369/53.21; 711/5, 202; 707/3; 360/49, 78.04
See application file for complete search history.

(56) References Cited

U.S. PATENT DOCUMENTS
5,142,521 A * 8/1992 Terashima et al. ....... 369/47.19
(Continued)

FOREIGN PATENT DOCUMENTS
JP            63048662         3/1988
(Continued)

*Primary Examiner*—Thuy N Pardo
(74) *Attorney, Agent, or Firm*—Snell & Wilmer L.L.P.

(57) ABSTRACT

The recording apparatus (300A) of the present invention includes a drive apparatus (320). The drive apparatus (320) includes a head section (334) for performing a recording operation or a reproduction operation for an information recording medium (100) and a drive control section (331) for controlling the head section (334). The drive control section (331) receives an update instruction including a third address indicating at least a part of the locations of the information recording medium (100) at which the first address information is recorded and the second address information. In accordance with the update instruction, the drive control section (331) controls the head section (334) to record the second address information in the information recording medium (100), generates disc management information including correlation information (336) which correlates the first address information with the second address information, and controls the head section (334) to record the disc management information in the information recording medium (100). The drive control section (331) controls the head section (334) to record the second information in the information recording medium (100) in accordance with the second address.

6 Claims, 52 Drawing Sheets

U.S. PATENT DOCUMENTS

| | | | | |
|---|---|---|---|---|
| 5,526,335 A * | 6/1996 | Tamegai | ................... | 369/53.16 |
| 5,872,955 A * | 2/1999 | Asano | ....................... | 711/202 |
| 6,298,022 B1 * | 10/2001 | Aramaki et al. | .......... | 369/47.11 |
| 6,525,894 B1 * | 2/2003 | Nakamura | ................... | 360/49 |
| 6,718,427 B1 * | 4/2004 | Carlson et al. | ................. | 711/5 |
| 6,813,227 B2 * | 11/2004 | Cho et al. | ................ | 369/44.28 |
| 7,126,784 B2 * | 10/2006 | Tamura et al. | ........... | 360/78.04 |
| 7,233,547 B2 * | 6/2007 | Teraoka et al. | ........... | 369/13.06 |
| 7,369,475 B2 * | 5/2008 | Nagai | ..................... | 369/53.27 |
| 2001/0036136 A1 * | 11/2001 | Fukushima et al. | ...... | 369/53.18 |
| 2004/0143574 A1 * | 7/2004 | Nakamura et al. | .............. | 707/3 |
| 2006/0146666 A1 * | 7/2006 | Ueda et al. | ................. | 369/47.1 |
| 2006/0153037 A1 * | 7/2006 | Koda et al. | ............... | 369/53.21 |
| 2007/0086281 A1 * | 4/2007 | Terada et al. | ............. | 369/30.07 |

FOREIGN PATENT DOCUMENTS

| | | |
|---|---|---|
| JP | 02183472 | 7/1990 |
| JP | 08335386 | 12/1996 |
| JP | 11039801 | 2/1999 |
| JP | 11339385 | 12/1999 |
| JP | 2004171714 | 6/2004 |

* cited by examiner

FIG.2
(a) Session management information 200
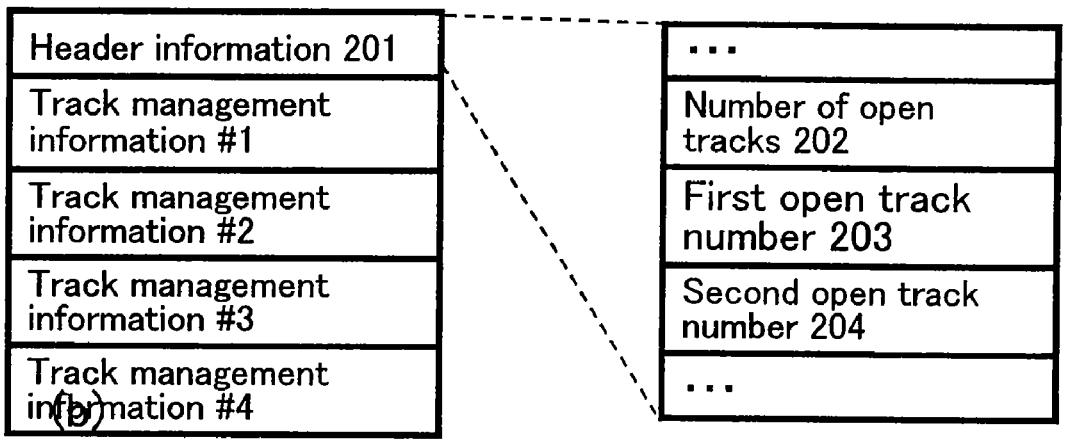
(b) Track management information 210
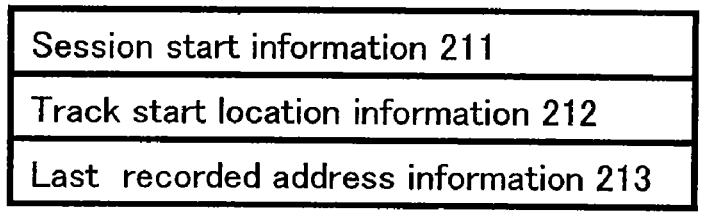
(c) Space bitmap management information 220
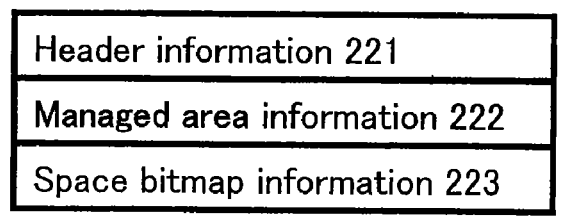

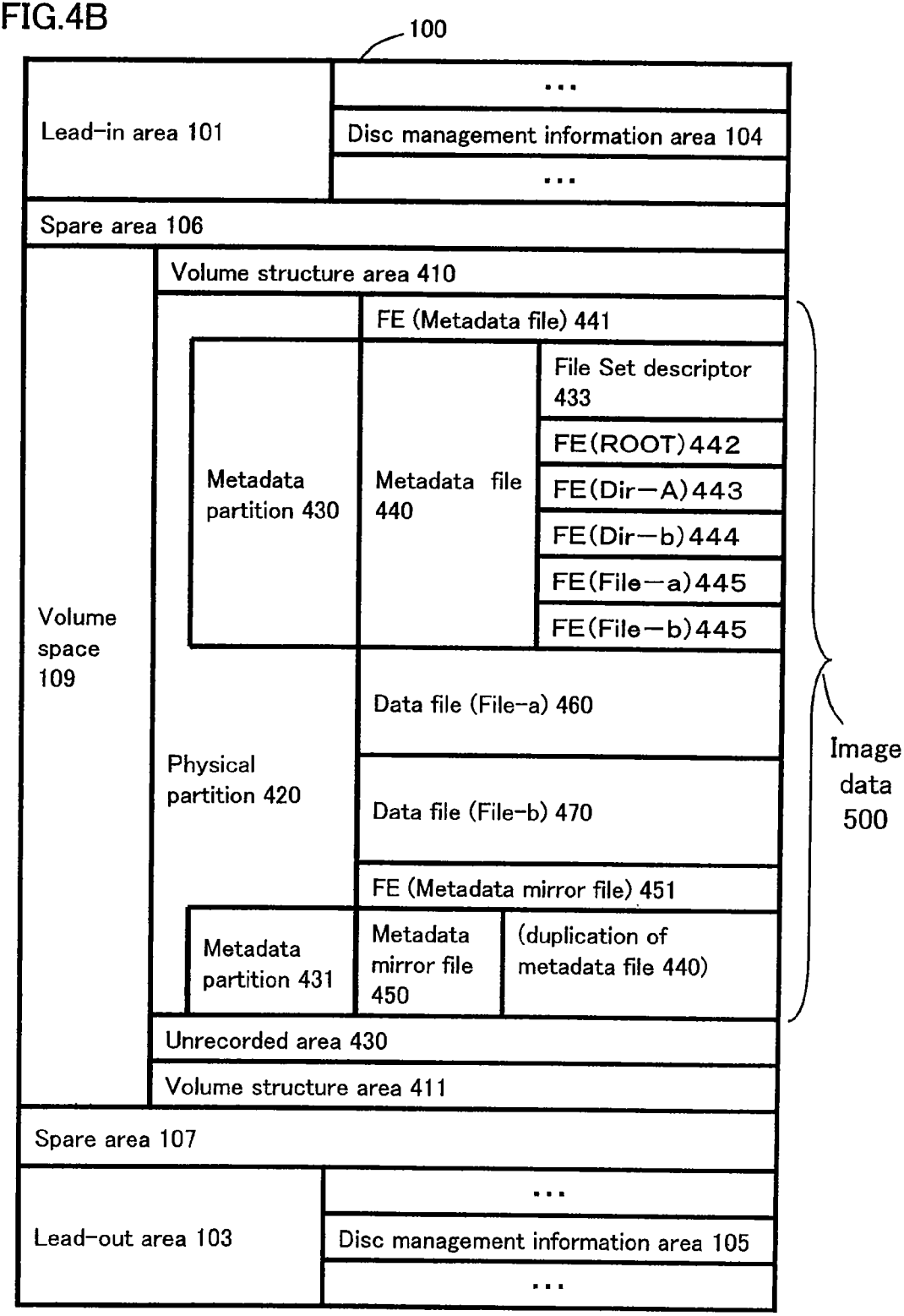

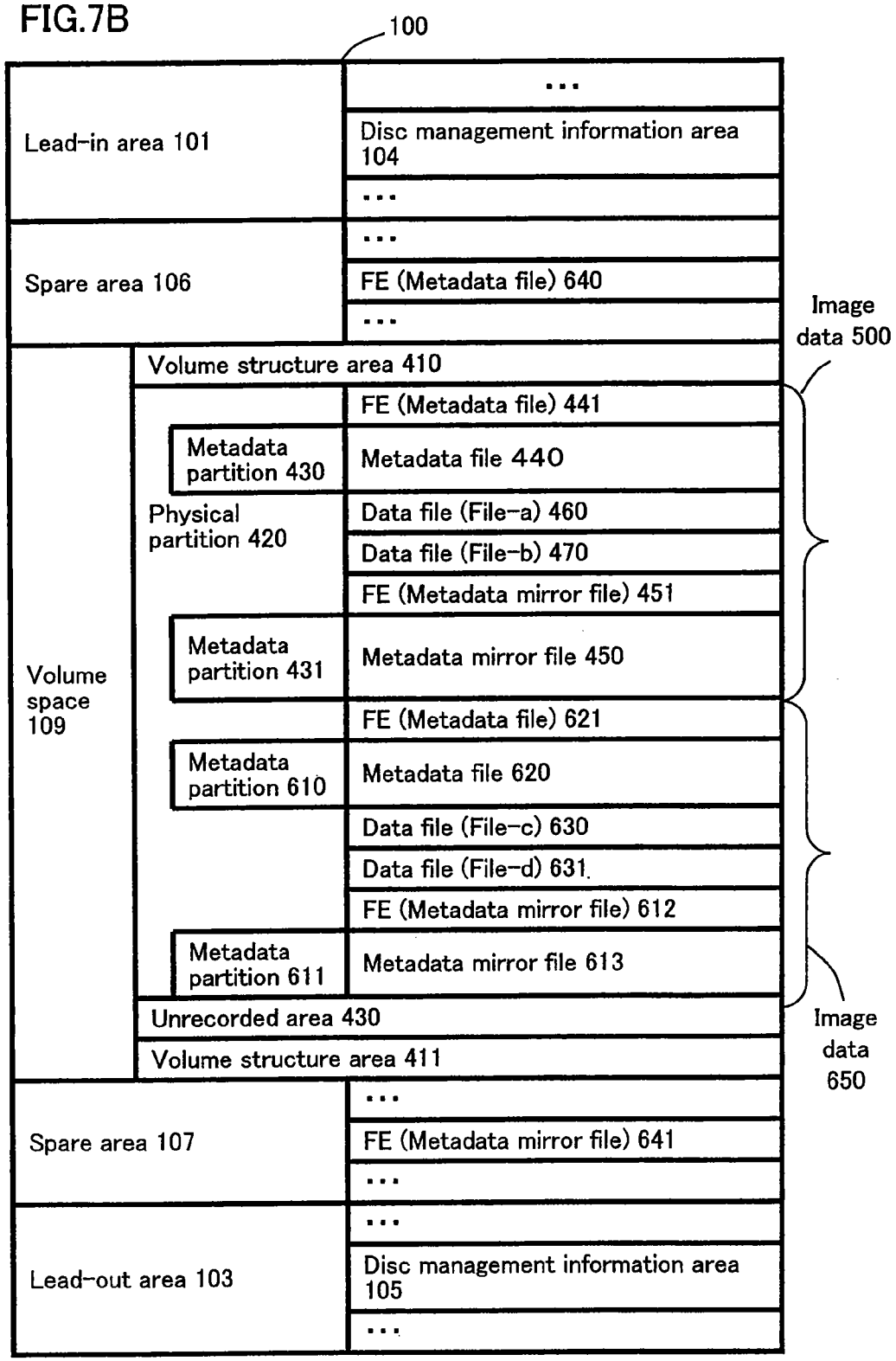

FIG.17

(a) Replacement management information list 1000

| Header information 1001 |
|---|
| Replacement management information #1 |
| Replacement management information #2 |
| Replacement management information #3 |
| ... |
| Terminator information |
| 00h |

(b) Replacement management information 1010

| Status information 1011 |
|---|
| Original location information 1012 |
| Replacement location information 1013 |

FIG.19

Disc structure information 1100

| |
|---|
| General information 1101 |
| Replacement management information list location information 1102 |
| User area start location information 1103 |
| User area end location information 1104 |
| Spare area information 1105 |
| Recording mode information 1106 |
| Last recorded address information 1107 |
| Spare area management information 1108 |
| Session management information location information 1109 |
| Space bitmap management information location information 1110 |

FIG.21
(a) The structure of image data 500
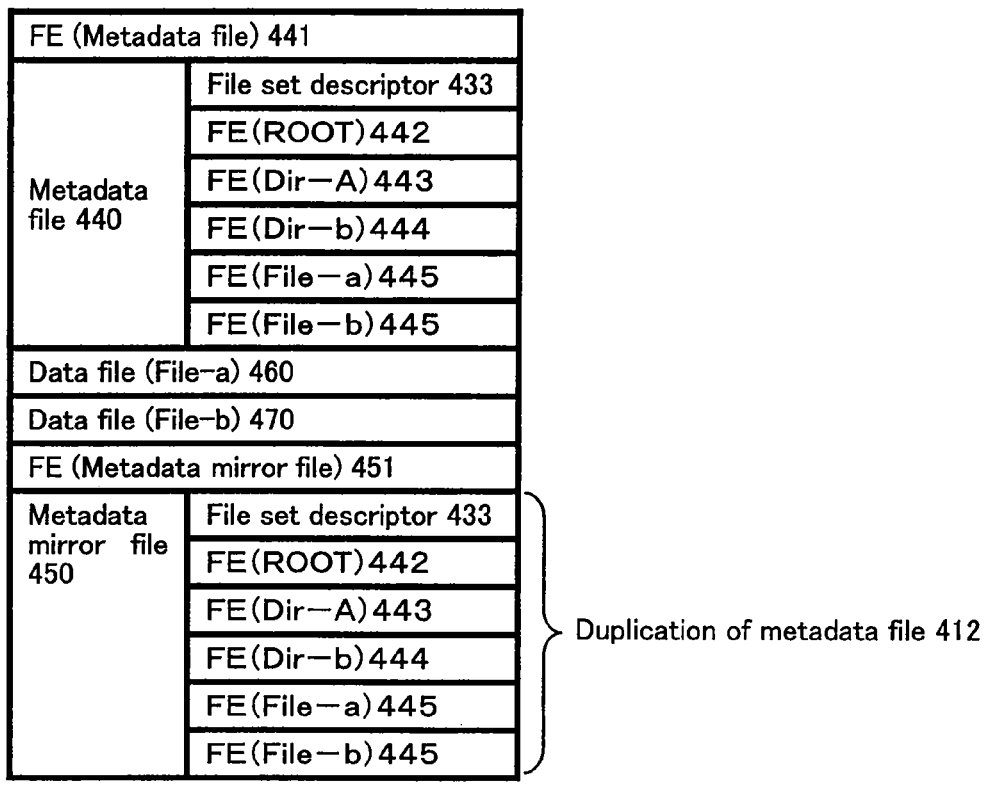
(b) An example of different data arrangement in metadata file 440
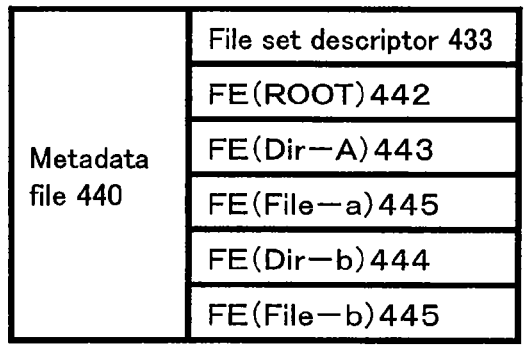

FIG.22
(a)
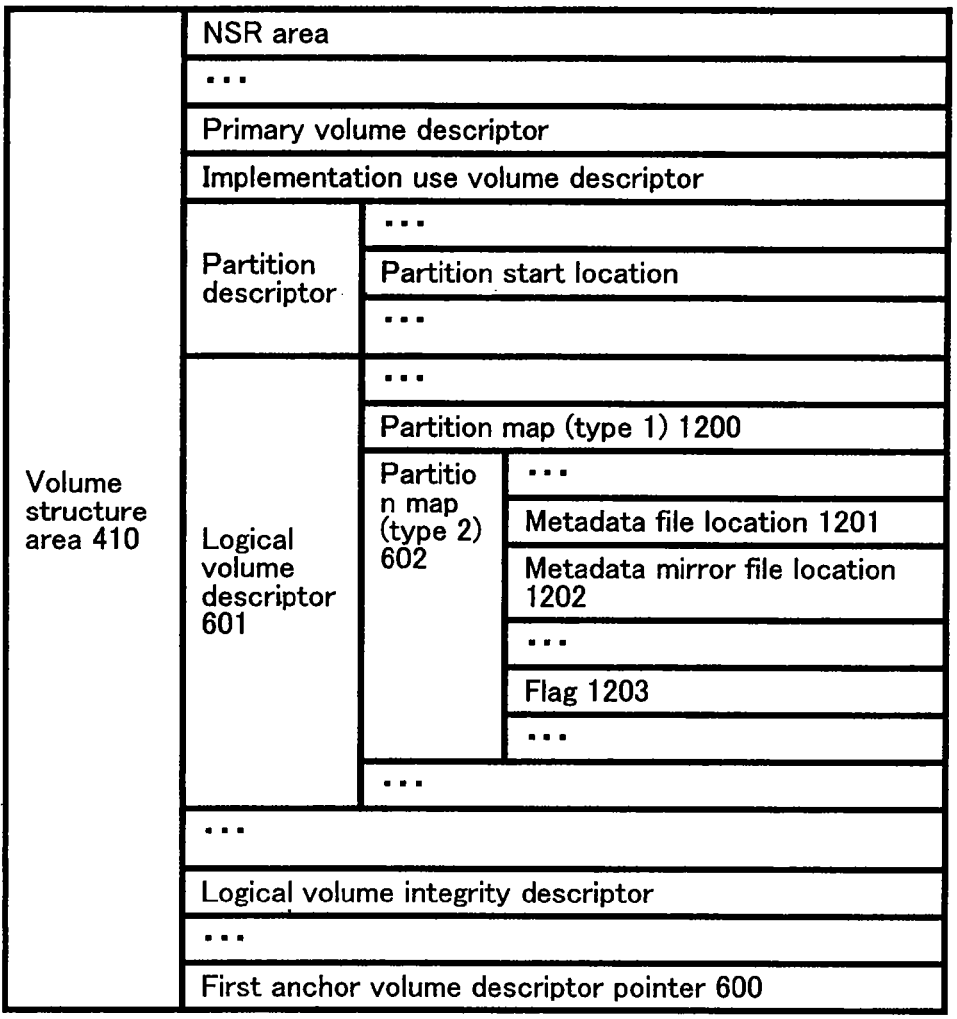
(b)
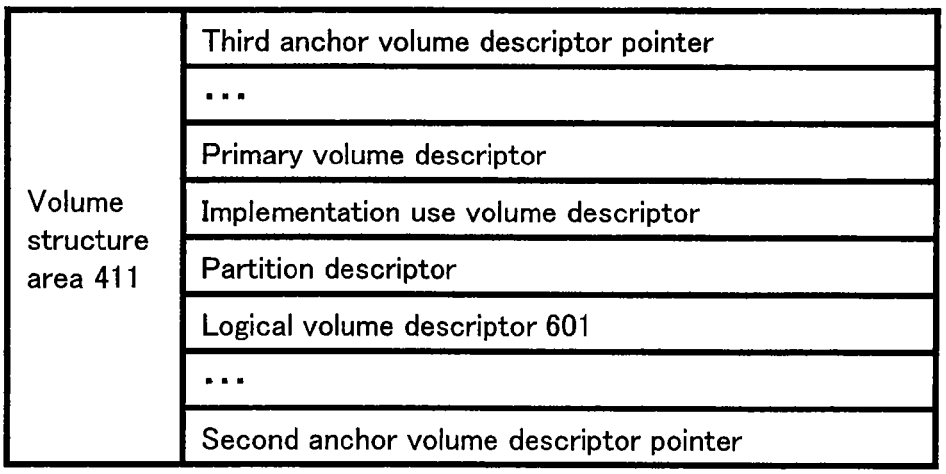

FIG.23
(a)
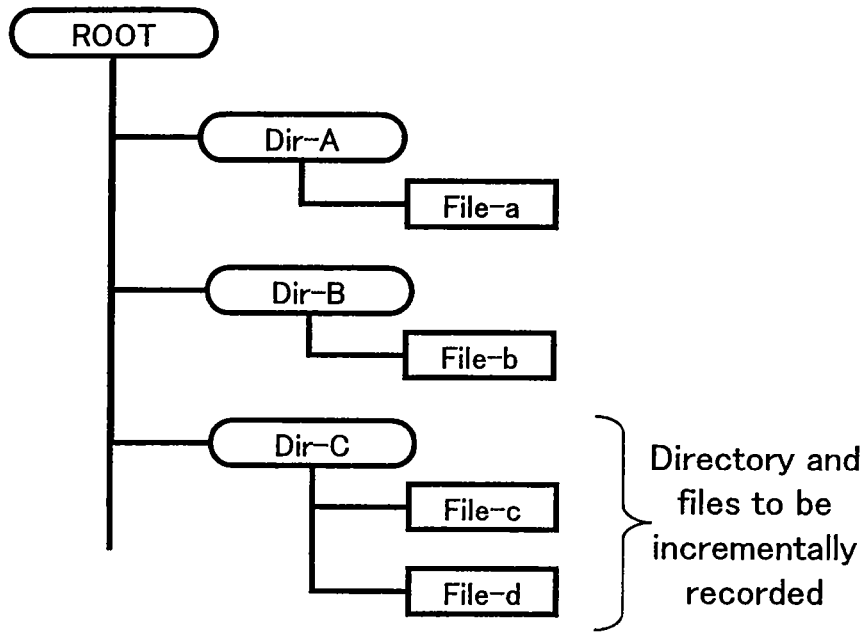
Directory and files to be incrementally recorded
(b)
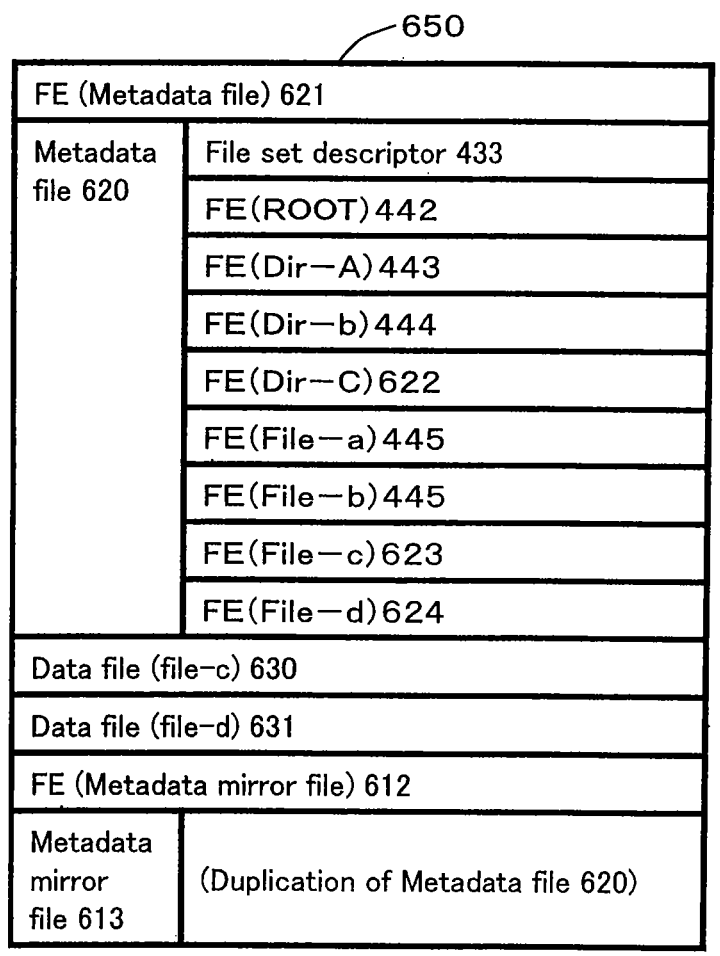

Fig. 36
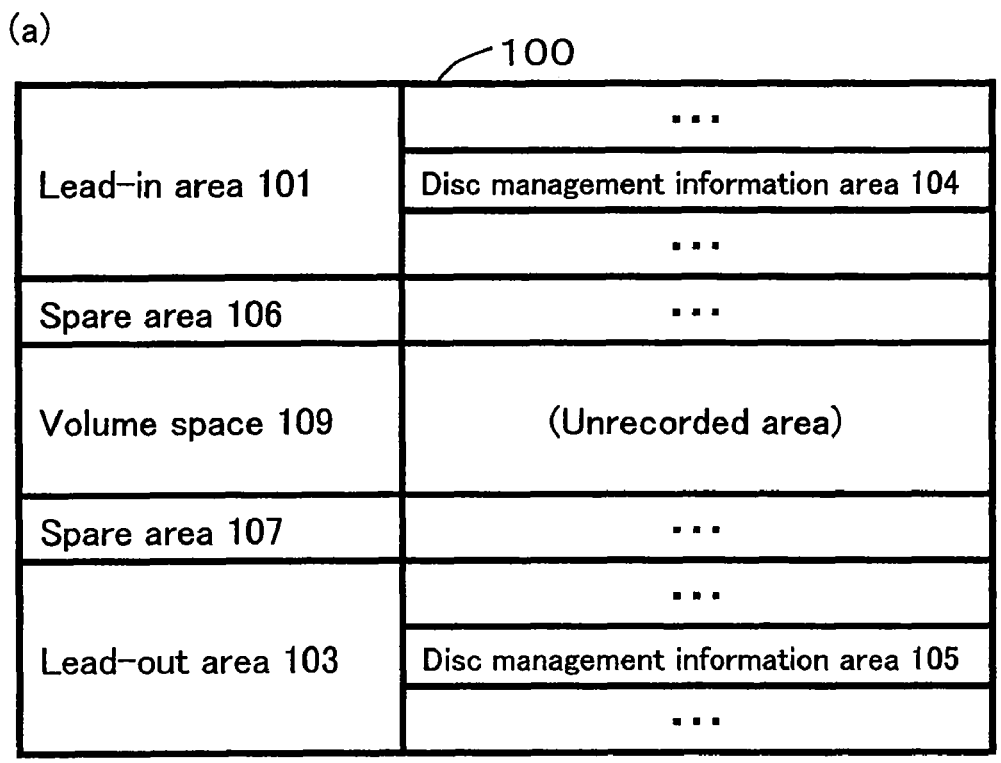
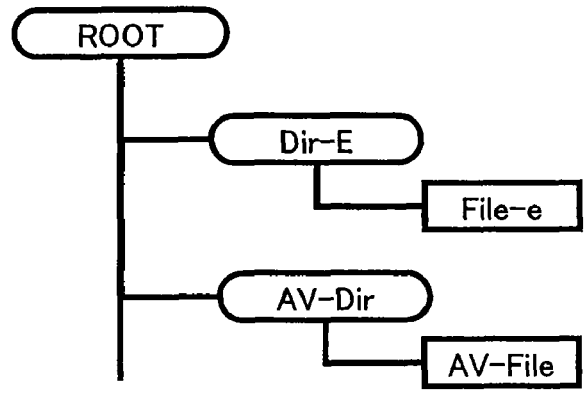

FIG.47

| Original location information 1012 | Replacement location information 1013 |
|---|---|
| Location information of AVDP 3600a | Location information of AVDP 3800a |
| Location information of AVDP 3600b | Location information of AVDP 3800b |
| Location information of AVDP 3600c | Location information of AVDP 3800c |

RECORDING DEVICE, REPRODUCTION DEVICE, HOST DEVICE, DRIVE DEVICE, RECORDING METHOD, REPRODUCTION METHOD, PROGRAM, AND INFORMATION RECORDING MEDIUM

TECHNICAL FIELD

The present invention relates to: an information recording medium; a recording apparatus, a host apparatus, a drive apparatus and a recording method for recording information on the information recording media; a reproducing apparatus, a drive apparatus and a reproducing method for reproducing the information recorded on the information recording media; and a program which instructs the apparatuses to execute a recording operation and a reproduction operation.

BACKGROUND ART

In recent years, various forms of information recording media has been used for recording digital data. Among others, write-once optical discs are gaining wide use although data can be recorded only once, since the cost thereof is inexpensive.

Examples of such optical discs include CD-R discs and DVD-R discs. Several methods for incrementally recording data on CD-R discs or DVD-R discs have been proposed (see, for example, U.S. Pat. No. 5,666,531). The methods for incrementally recording data may be, for example, a VAT (Virtual Allocation Table) method, or a multiborder (multisession) method.

Operations for recording/reproducing digital data on/from DVD-R discs using the VAT method or multiborder method will be described.

First, incrementally recording method using VAT will be described below with reference to the drawings. Herein, an operation for recording a file and directory tree structure shown in FIG. 12 on an information recording medium and a data structure which is formed as a result thereof when an example of the recording information medium is a DVD-R disc will be described in steps.

First, a format process will be described with reference to FIG. 13. FIG. 13 shows data immediately after a format process which is on a DVD-R disc, an example of a conventional information recording medium 10100.

A DVD-R disc is an information recording medium defined by the DVD-R physical specification.

Further, files are recorded by using a volume file structure defined by the DVD-R file system specification. The DVD-R file system specification conforms to the ISO/IEC 13346 standard or the UDF (Universal Disk Format) specification. The description will be made below using the structure defined by the UDF specification.

As shown in FIG. 13, a data area included on the information recording medium 10100 includes a lead-in area 10101 and a volume space 10109.

The volume space 10109 includes a volume structure area 10410, a file structure/file area 10420, and a VAT (Virtual Allocation Table) structure area 10430.

In the volume structure area 10410, a volume structure defined by the UDF specification is to be recorded. In detail, the volume structure area 10410 includes an NSR descriptor, a primary volume descriptor, an implementation use volume descriptor, a partition descriptor, a logical volume descriptor, an unallocated space descriptor, a terminating descriptor, a logical volume integrity descriptor, an anchor volume descriptor pointer, and the like.

The file structure/file area 10420 includes a file set descriptor 10421, which will be an origin of a directory tree in a partition space, and an FE (ROOT) 10422, which is a file entry of a ROOT directory file.

The file entry (hereinafter, referred to as FE) has a data structure defined by the UDF specification for managing the position and the size of the files to be recorded in the volume space. Herein, in order to simplify the description, the ROOT directory file is assumed to be recorded in the FE (ROOT) 10422.

In the VAT structure area 10430, a VAT 10431 and a VAT ICB 10432 are recorded. The VAT is a data structure defined by the UDF specification with the purpose of simplifying the updating process of the file structure in the write-once recording medium.

When the VAT is used, a recording position of the file structure data such as FE in the volume space is specified using virtual address in a virtual address space.

VAT holds a correspondence between a logical address, which is a recording position in a logical address space on the information recording medium, and the virtual address.

With such a structure, data can be rewritten virtually even in an information recording medium which is not rewritable, such as a DVD-R disc.

The recording position of the VAT on the information recording medium is specified by VAT ICB allocated to a last sector of an area on which data is recorded on the information recording medium.

Further, the lead-in area 10101 includes a physical format information area 10104. The physical format information is provided for recording management information of various areas allocated on the information recording medium 10100. The management information may be, for example, address information of a border-out area or the like. Immediately after the format process, only an area of the physical format information area 10104 is recorded, and data is not recorded yet in the area.

Next, with reference to FIG. 14, a procedure for recording directory (Dir-A) and data file (File-a) of the file and directory structure shown in FIG. 12 will be described.

When a process of recording the directory (Dir-A) and data file (File-a) to the information recording medium 10100 as shown in FIG. 13 is performed, a data file (File-a) 10501, a FE (File-a) 10502, a FE (Dir-A) 10503, and FE (ROOT) 10504 are recorded in the file structure/file area 10500 as shown in FIG. 14. In this example, the directory file is included in the FE (Dir-A) 10503.

In the VAT structure area 10520, a VAT 10521 to which the newly-recorded FE 10502, 10503, and 10504 are registered, and a VAT ICB 10522 are recorded.

When a close process is performed, first, predetermined data is recorded in the border-out area 10530 except for a next border marker 10531. Further, predetermined data is recorded in the physical format information area 10104 in the lead-in area 10101 which has remained unrecorded after the format process.

The close process is performed so as to allow the information reproduction apparatus to search for the latest volume file structure.

When such file recording process and close process is performed for the information recording medium 10100 having the data structure after the format process as shown in FIG. 13, the data structure as shown in FIG. 14 is formed in the information recording medium 10100.

Next, with reference to FIG. 15, a procedure for recording directory (Dir-B) and data file (File-b) of the file and directory structure shown in FIG. 12 will be described.

Herein, the data file (File-b) 10601 and the file structure related thereto, i.e., a file (File-b) 10601, a FE (File-b) 10602, a FE (Dir-B) 10603, and a FE (ROOT) 10604, are recorded in the file structure/file area 10600.

In a VAT structure area 106100, the latest VAT structure, i.e., a VAT 106101 and a VAT ICB 10602 are recorded.

At last, by performing the close process again, predetermined data is recorded in a border-out area 106200 except for a next border marker 106201. Further, the next border marker 10531 allocated in the border-out area 10530, and a border-in area 106300 including the physical format information area 106301 are recorded.

When such file recording process and close process are performed for the information recording medium 10100 having the data structure shown in FIG. 14, the data structure as shown in FIG. 15 is formed on the information recording medium 10100.

As described above, every time the close process performed, an area interposed between the lead-in area 10101 or the border-in area recorded in the volume space 10109 and the border-out area is formed. Hereinafter, such an area is called a bordered area. For example, in FIG. 15, there are bordered area #1 10700 and the bordered area #2 10701. The bordered area is a concept similar to a session in a CD-R disc.

Next, with reference to a flow chart for a reproduction process procedure shown in FIG. 16, a reproduction operation of a file will be described. Herein, an operation of reproducing the data file (File-a) 10501 will be described as an example.

First, data in the physical format information area 10104 in the lead-in area 10101 is reproduced, and the physical format information is obtained (step S11101).

Next, data of the next border marker is reproduced (step S11102).

The physical format information obtained in step S11101 (or step S11103) includes address information of the border-out area. Since the data of the next border marker is recorded at the predetermined position of the border-out area, the next border marker is reproduced from the position.

For example, in FIG. 15, the physical format information area 10104 includes address information of the border-out area 10530. Further, the physical format area 106301 included in the border-in area 106300 includes address information of the border-out area 106200.

When the next border marker included in physical format information obtained in step S11101 (or step S11103) has been already recorded, there is a newer bordered area. Thus, step S11103 and the following steps are performed.

In accordance with the address information of the border-in area included in the physical format information obtained in step S11101, reproduction of the next border-in area is performed (step S11103). The address information of the border-in area included in the physical format information can also be obtained in step S11104.

From the reproduced border-in area, the physical format information is obtained.

On the other hand, when the next border marker reproduced in step S11102 remains unrecorded, the current bordered area is the latest one. Thus, step S11104 and the following steps are performed.

When it reaches the latest bordered area, with reference to the latest obtained physical format information, an end physical address of the area which is accessible is obtained (step S11104).

In FIG. 15, the end of the bordered area #2 10701 is the end of the accessible area.

Then, at last, file reproduction is performed as follows.

At this time, the volume structure area 10410 is reproduced first (step S11105). The read out volume structure includes address information of file set descriptor 10421 and partition starting location. When the VAT method is employed, a virtual partition map defined by the UDF specification is included in the volume structure. Thus, based on the information, it is recognized that the VAT structure is recorded in the volume space.

The VAT ICB 106102 recorded at the end of the accessible area is reproduced (step S11106).

VAT recording position information is obtained from the read out VAT ICBP 106102, and the VAT 106101 is read out.

When a target file and/or management information thereof is managed using the virtual address, the VAT 106101 obtained in step S11106 is used for making reference to the VAT entry to which file entry of the target file and/or directory is registered (step S11107).

A translation process from the virtual address into the logical address is performed. Then, with having the file set descriptor 10421 in the file structure/file area 10420 as an origin, the FE (ROOT) 10604 in the file structure/file area 10600, ROOT directory recorded therein, the FE (Dir-A) 10503 in the file structure/file area 10500, directory (Dir-A) recorded in the FE, and the FE (File-a) 16502 are sequentially read out.

The recording position of the data file (File-a) 10501 is obtained from the FE (File-a) 10502, and the reproduction of the data file (File-a) 10501 is carried out.

A method for incremental recording to the DVD-R discs using the VAT method has been described above. However, the multiborder method is also known as an incremental recording method different from the VAT method. A similar method when used in the CD-R discs is called a multisession method.

In the multiborder method, data is incrementally recorded with having a bordered area as a unit, and the volume structure and the file structure are recorded for every bordered area.

In the multiborder method, a system of updating data using the virtual address such as VAT is not used. When the file structure is updated, the volume structure and the file structure are newly generated, and re-recorded in a new bordered area.

Reproduction using the multiborder method determines the latest bordered area, and reads out the latest volume structure therefrom.

Thereafter, a specific file can be reproduced by following data in accordance with the data structure defined by the UDF specification in steps. For example, data can be read out with a reproduction procedure similar to that for read-only discs like DVD-ROM.

Further, when the multiborder/multisession method is used, efficient data recording using the image data is performed. When all the files which are desired to be recorded are known, for example, when taking a backup of data, the data for all files which is desired to be recorded in a hard disc drive, and a file including all the volume structure and file structure thereof are produced. The file is image data. For recording the image data, one bordered area (or a session) is allocated, and the image data is continuously recorded in the area. Since recording is performed continuously, and the file structure has been already produced, overhead at recording becomes small. Thus, recording of the image data can be performed rapidly.

FIG. 33 is a block diagram showing a computer system 10200 and a drive apparatus 10300 disclosed in Japanese Patent No. 3005645.

The computer system 10200 includes a computer memory 10210 and temporary memory 10220, and transfer data to and from a write-once recording medium 10400. The temporary memory 10220 can transfer data to both a computer memory 10210 and the write-once recording medium 10400. The temporary memory 10220 includes a system file allocation area 10221, a medium directory area 10224, and a data file area 10225. The system file allocation area 10221 is an area for storing a file allocation table 10222, and an OS (operating system) directory 10225.

An operation of the computer system 10200 when recording a user file (user file including at least one of video data and audio data) in the write-once recording medium 10400 will be described.

FIG. 34 shows the data structure when the user file is recorded in the write-once recording medium 10400. In the file directory area 10510 of the write-once recording medium 10400, directory entry corresponding to the user file recorded in the file data area 10610 is recorded. The directory entry is a file structure in the write-once recording medium 10400, and includes the recording position on the write-once recording medium 10400 of the user file, file size, file name and the like.

An operation for recording a new user file in the write-once recording medium 10400 as shown in FIG. 34 will be described. Herein, the new user file is a user file generated by updating the user file recorded in the file data area 10610.

The computer system 10200 reads out all the directory entries from the write-once recording medium 10400, and stores in the medium directory area 10224. Then, the computer system 10200 exchanges the information of the directory entry in the medium directory area 10224, and forms the file allocation table 10222 and OS directory 10225 in the system file allocation area 10221. The file allocation table 10222 and the OS directory 10225 have the same structure as the file structure of a rewritable recording medium.

Next, the computer system 10200 transfers the new user file from the computer memory 10210 to the write-once recording medium 10400 via the data file area 10225. The new user file is recorded in, for example, a file data area 10620 shown in FIG. 35. In accordance with recording of the new user file, information in the system file allocation area 10221, i.e., the file allocation table 10222 and the OS directory 10225 are updated. In accordance with the update of the file allocation table 10222 and the OS directory 10225, the directory entry stored in the medium directory area 10224 is updated.

Finally, the updated directory entry is recorded in the write-once recording medium 10400. In FIG. 35, the updated directory entry is recorded in the file directory area 10520.

As described above, in the recording operation, the directory entry (file structure) on the write-once recording medium 10400 is read to the temporary memory 10220, and the directory entry is converted to a file structure similar to that of a rewritable recording medium. In accordance with the recording of the new user file, the file structure on the temporary memory 10220 is updated. The file structure of the rewritable recording medium is converted again into the file structure on the write-once recording medium 10400 and then is recorded on the write-once recording medium 10400.

In the reconversion process, all the directory entries are relocated from the file directory area 10510 to the file directory area 10520. For example, in FIG. 35, the directory entry 10511 is relocated in the directory entry 10521.

As shown in FIG. 35, the directory entry 10511 and the directory entry 10521 respectively have values such as '0' to 'C' and 'd' to 'g' as logical address values. Modification to the logical address values is directly reflected in the conversion process performed in the temporary memory 10220. For example, the logical address for making reference to the directory entry 10512 is 'b'. When the new user file is recorded, the logical value for making reference to the directory entry 10522 corresponding to the directory entry 10512 is 'f'. Similarly, all the information related to the logical address in the file directory area can be modified.

For incrementally recording data in the write-once recording medium 10400, methods of reading out and converting the file structure such as directory information and/or location information recorded on the medium are widely used. This is because data cannot be recorded in the recorded area in the write-once recording medium. Further, since the conversion process of the file structure is required, the conversion process specific to the write-once medium should be performed when data is reproduced and recorded.

However, in the method as described-above, the reproduction operation of the directory or the file specific to the write-once recording medium is required. Thus, there is a problem in that a system which can only perform a reproduction operation of a read-only medium of rewritable recording medium cannot reproduce data in the write-once recording medium.

For example, for reproducing a user file recorded on a write-once recording medium such as DVD-R discs by the recording method as shown in Japanese Patent No. 3005645, the recording position of the latest file structure (for example, the file directory area 10520 in FIG. 35) should be known. In the recording method as shown in Japanese Patent No. 3005645, the position of the file directory area 10520 cannot be determined uniquely. Thus, some kind of method is required for figuring out the position. As such a method, for example, the multiborder/multisession method can be used.

Specifically, a first bordered area is set, and a file directory area 10510 and a file data area 10610 are provided in the first bordered area. Further, a second bordered area is set, and a file directory area 10520 and a file data area 10620 are provided in the second bordered area. The file directory area is provided at a predetermined position in the respective bordered areas (for example, at headers of the areas). When the reproduction operation is performed, the position of the latest bordered area is obtained by reading out the physical format information in the lead-in area or the border-in area in steps. Accordingly, even when the recording method shown in Japanese Patent No. 3005645 is used, it is possible to know the position of the latest file directory area if the multiborder/multisession method is used. However, this example still does not solve the problem that the system which does not support the multiborder (for example, read-only system) cannot read out the information.

In view of the above-described problem, the object of the present invention is to provide: an information recording medium which is compatible with a system which can only perform a reproduction operation for a read-only medium or a rewritable recording medium; a recording apparatus, a host apparatus, a drive apparatus and a recording method for recording information on the information recording media; a reproducing apparatus, a drive apparatus and a reproducing method for reproducing the information recorded on the information recording media; and a program which instructs the apparatuses to execute a recording operation and a reproduction operation.

DISCLOSURE OF THE INVENTION

According to the present invention, a recording apparatus is provided for recording second address information and second information in an information recording medium to update first information recorded in the information recording medium to the second information by updating first address information recorded in the information recording medium to the second address information, wherein the first address information includes a first address indicating at least a part of locations of the information recording medium at which the first information is recorded, the second address information includes a second address indicating at least a part of locations of the information recording medium at which the second information is to be recorded. The recording apparatus includes a host apparatus and a drive apparatus, the host apparatus includes a system control section for controlling the drive apparatus. The drive apparatus includes a head section for performing a recording operation or a reproduction operation for the information recording medium and a drive control section for controlling the head section. The system control section generates an update instruction including a third address indicating at least a part of the locations of the information recording medium at which the first address information is recorded and the second address information as an update instruction for updating the first address information to the second address information, and outputs the update instruction to the drive apparatus. The drive control section receives the update instruction from the host apparatus. The drive control section, in accordance with the update instruction, controls the head section to record the second address information in the information recording medium, generates disc management information including correlation information which correlates the first address information with the second address information, and controls the head section to record the disc management information in the information recording medium. The drive control section controls the head section to record the second information in the information recording medium in accordance with the second address.

In one embodiment of the present invention, the information recording medium is a write-once information recording medium.

In one embodiment of the present invention, each of the first information and the second information includes at least a volume structure, the first address information includes at least an anchor volume descriptor pointer describing the first address, and the second address information includes at least an anchor volume descriptor pointer describing the second address.

In one embodiment of the present invention, the update instruction includes a record instruction and a generation instruction, and the drive control section controls the head section to record the second address information in the information recording medium in accordance with the record instruction, generates the disc management information including the correlation information and controls the head section to record the disc management information in the information recording medium in accordance with the generation instruction.

In one embodiment of the present invention, third address information including the first address is further recorded in the information recording medium.

In one embodiment of the present invention, the record instruction for the second address information is issued for ECC block basis.

In one embodiment of the present invention, the drive control section generates duplication information of the second address information, and controls the head section to record the duplication information of the second address information in the information recording medium.

In one embodiment of the present invention, the location at which the duplication information of the second address information is recorded is at an inner location than the location at which the second address information is recorded.

In one embodiment of the present invention, the disc management information further includes status information indicating whether the correlation information is valid or invalid, and the drive control section sets the status information to indicate that the correlation information is valid when the first address information has been updated to the second address information.

In one embodiment of the present invention, the correlation information includes instruction information which instructs the drive control section to reproduce the second address information in response to the receipt of a reproduction instruction for the first address information.

In one embodiment of the present invention, the first information includes a first metadata file, the second information includes a second metadata file, the first address information includes a file entry of the first metadata file, and the second address information includes a file entry of the second metadata file.

In one embodiment of the present invention, the first information includes a first file structure, the second information includes a second file structure, the first address information includes a first logical volume descriptor, and the second address information includes a second logical volume descriptor.

According to the present invention, a host apparatus is provided for use in a recording apparatus which records second address information and second information in an information recording medium to update first information recorded in the information recording medium to the second information by updating first address information recorded in the information recording medium to the second address information, wherein the first address information includes a first address indicating at least a part of locations of the information recording medium at which the first information is recorded, the second address information includes a second address indicating at least a part of locations of the information recording medium at which the second information is to be recorded. The host apparatus includes a system control section for controlling the drive apparatus including a head section for performing a recording operation or a reproduction operation for the information recording medium and a drive control section for controlling the head section. The system control section generates an update instruction including a third address indicating at least a part of the locations of the information recording medium at which the first address information is recorded and the second address information as an update instruction for updating the first address information to the second address information, and outputs the update instruction to the drive apparatus.

According to the present invention, a drive apparatus is provided for use in a recording apparatus which records second address information and second information in an information recording medium to update first information recorded in the information recording medium to the second information by updating first address information recorded in the information recording medium to the second address information, wherein the first address information includes a first address indicating at least a part of locations of the information recording medium at which the first information is recorded, the second address information includes a second address indicating at least a part of locations of the information recording medium at which the second information is to be recorded. The drive apparatus includes a head section for performing a recording operation or a reproduction operation for the information recording medium and a drive control section for controlling the head section. The drive control section receives an update instruction including a third address indicating at least a part of the locations of the information recording medium at which the first address information is recorded and the second address information. The drive control section, in accordance with the update instruction, controls the head section to record the second address information in the information recording medium, generates disc management information including correlation information which correlates the first address information with the second address information, and controls the head section to record the disc management information in the information recording medium. The drive control section controls the head section to record the second information in the information recording medium in accordance with the second address.

According to the present invention, a semiconductor integrated circuit is provided for use in a recording apparatus which records second address information and second information in an information recording medium to update first information recorded in the information recording medium to the second information by updating first address information recorded in the information recording medium to the second address information, wherein the first address information includes a first address indicating at least a part of locations of the information recording medium at which the first information is recorded, the second address information includes a second address indicating at least a part of locations of the information recording medium at which the second information is to be recorded, the semiconductor integrated circuit is configured to control a head section for performing a recording operation or a reproduction operation for the information recording medium. The semiconductor integrated circuit receives an update instruction including a third address indicating at least a part of the locations of the information recording medium at which the first address information is recorded and the second address information. The semiconductor integrated circuit, in accordance with the update instruction, controls the head section to record the second address information in the information recording medium, generates disc management information including correlation information which correlates the first address information with the second address information, and controls the head section to record the disc management information in the information recording medium. The semiconductor integrated circuit controls the head section to record the second information in the information recording medium in accordance with the second address.

According to the present invention, a recording method is provided for recording second address information and second information in an information recording medium to update first information recorded in the information recording medium to the second information by updating first address information recorded in the information recording medium to the second address information, wherein the first address information includes a first address indicating at least a part of locations of the information recording medium at which the first information is recorded, the second address information includes a second address indicating at least a part of locations of the information recording medium at which the second information is to be recorded. The recording method includes the steps of: generating an update instruction including a third address indicating at least a part of the locations of the information recording medium at which the first address information is recorded and the second address information as an update instruction for updating the first address information to the second address information; in accordance with the update instruction, recording the second address information in the information recording medium, generating disc management information including correlation information which correlates the first address information with the second address information, and recording the disc management information in the information recording medium; and recording the second information in the information recording medium in accordance with the second address.

According to the present invention, a method implemented in a host apparatus is provided for use in a recording apparatus which records second address information and second information in an information recording medium to update first information recorded in the information recording medium to the second information by updating first address information recorded in the information recording medium to the second address information, wherein the first address information includes a first address indicating at least a part of locations of the information recording medium at which the first information is recorded, the second address information includes a second address indicating at least a part of locations of the information recording medium at which the second information is to be recorded. The method includes the steps of: generating an update instruction including a third address indicating at least a part of the locations of the information recording medium at which the first address information is recorded and the second address information as an update instruction for updating the first address information to the second address information; and outputting the update instruction.

According to the present invention, a method implemented in a drive apparatus is provided for use in a recording apparatus which records second address information and second information in an information recording medium to update first information recorded in the information recording medium to the second information by updating first address information recorded in the information recording medium to the second address information, wherein the first address information includes a first address indicating at least a part of locations of the information recording medium at which the first information is recorded, the second address information includes a second address indicating at least a part of locations of the information recording medium at which the second information is to be recorded. The method includes the steps of: receiving an update instruction including a third address indicating at least a part of the locations of the information recording medium at which the first address information is recorded and the second address information; in accordance with the update instruction, recording the second address information in the information recording medium, generating disc management information including correlation information which correlates the first address information with the second address information, and recording the disc management information in the information recording medium; and recording the second information in the information recording medium in accordance with the second address.

According to the present invention, a program implemented in a host apparatus is provided for use in a recording apparatus which records second address information and second information in an information recording medium to update first information recorded in the information recording medium to the second information by updating first address information recorded in the information recording medium to the second address information, wherein the first address information includes a first address indicating at least a part of locations of the information recording medium at which the first information is recorded, the second address information includes a second address indicating at least a part of locations of the information recording medium at which the second information is to be recorded. The program includes the steps of: generating an update instruction including a third address indicating at least a part of the locations of the information recording medium at which the first address information is recorded and the second address information as an update instruction for updating the first address information to the second address information; and outputting the update instruction.

According to the present invention, a program implemented in a drive apparatus is provided for use in a recording apparatus which records second address information and second information in an information recording medium to update first information recorded in the information recording medium to the second information by updating first address information recorded in the information recording medium to the second address information, wherein the first address information includes a first address indicating at least a part of locations of the information recording medium at which the first information is recorded, the second address information includes a second address indicating at least a part of locations of the information recording medium at which the second information is to be recorded. The program includes the steps of: receiving an update instruction including a third address indicating at least a part of the locations of the information recording medium at which the first address information is recorded and the second address information; in accordance with the update instruction, recording the second address information in the information recording medium, generating disc management information including correlation information which correlates the first address information with the second address information, and recording the disc management information in the information recording medium; and recording the second information in the information recording medium in accordance with the second address.

According to the present invention, a reproducing apparatus is provided for reproducing information recorded in an information recording medium, wherein first information, second information, first address information, second address information and disc management information at least, are recorded in the information recording medium, the second information is update information of the first information, the first address information includes a first address indicating at least a part of locations of the information recording medium at which the first information is recorded, the second address information is update information of the first address information, the second address information includes a second address indicating at least a part of locations of the information recording medium at which the second information is recorded, and the disc management information includes correlation information which correlates the first address information with the second address information. The reproducing apparatus includes a host apparatus and a drive apparatus, wherein the host apparatus includes a system control section for controlling the drive apparatus, the drive apparatus includes a head section for performing a recording operation or a reproduction operation for the information recording medium and a drive control section for controlling the head section, the system control section generates a first reproduction instruction including a third address indicating at least a part of the locations of the information recording medium at which the first address information is recorded as a first reproduction instruction for reproducing the first address information, and outputs the first reproduction instruction to the drive apparatus, the drive control section receives the first reproduction instruction from the host apparatus, controls the head section to reproduce the second address information correlated with the first address information by referring to the correlation information in accordance with the first reproduction instruction, and outputs the reproduced second address information to the host apparatus, the system control section receives the second address information from the drive apparatus, generates a second reproduction instruction including the second address as a second reproduction instruction for reproducing the second information, and outputs the second reproduction instruction to the drive apparatus, and the drive control section receives the second reproduction instruction from the host apparatus, controls the head section to reproduce the second information recorded in the information recording medium in accordance with the second reproduction instruction, and outputs the reproduced second information to the host apparatus.

In one embodiment of the present invention, the disc management information further includes status information indicating whether the correlation information is valid or invalid, and the drive control section determines whether the correlation information is valid or invalid by referring to the status information corresponding to the correlation information in accordance with the first reproduction instruction, controls the head section to reproduce the second address information correlated with the first address information and outputs the reproduced second address information to the host apparatus when it is determined that the correlation information is valid, and controls the head section to reproduce the first address information and outputs the reproduced first address information to the host apparatus when it is determined that the correlation information is invalid.

According to the present invention, a drive apparatus is provided for use in a reproducing apparatus for reproducing information recorded in an information recording medium, wherein first information, second information, first address information, second address information and disc management information at least, are recorded in the information recording medium, the second information is update information of the first information, the first address information includes a first address indicating at least a part of locations of the information recording medium at which the first information is recorded, the second address information is update information of the first address information, the second address information includes a second address indicating at least a part of locations of the information recording medium at which the second information is recorded, and the disc management information includes correlation information which correlates the first address information with the second address information. The drive apparatus includes: a head section for performing a recording operation or a reproduction operation for the information recording medium; and a drive control section for controlling the head section, wherein the drive control section receives a first reproduction instruction including a third address indicating at least a part of the locations of the information recording medium at which the first address information is recorded, controls the head section to reproduce the second address information correlated with the first address information by referring to the correlation information in accordance with the first reproduction instruction, and outputs the reproduced second address information to a host apparatus, the drive control section receives a second reproduction instruction including the second address, controls the head section to reproduce the second information recorded in the information recording medium in accordance with the second reproduction instruction, and outputs the reproduced second information to the host apparatus.

According to the present invention, a semiconductor integrated circuit is provided for use in a reproducing apparatus for reproducing information recorded in an information recording medium, wherein first information, second information, first address information, second address information and disc management information at least, are recorded in the information recording medium, the second information is update information of the first information, the first address information includes a first address indicating at least a part of locations of the information recording medium at which the first information is recorded, the second address information is update information of the first address information, the second address information includes a second address indicating at least a part of locations of the information recording medium at which the second information is recorded, and the disc management information includes correlation information which correlates the first address information with the second address information, the semiconductor integrated circuit is configured to control a head section for performing a recording operation or a reproduction operation for the information recording medium. The semiconductor integrated circuit receives a first reproduction instruction including a third address indicating at least a part of the locations of the information recording medium at which the first address information is recorded, controls the head section to reproduce the second address information correlated with the first address information by referring to the correlation information in accordance with the first reproduction instruction, and outputs the reproduced second address information to a host apparatus, the semiconductor integrated circuit receives a second reproduction instruction including the second address, controls the head section to reproduce the second information recorded in the information recording medium in accordance with the second reproduction instruction, and outputs the reproduced second information to the host apparatus.

According to the present invention, a reproducing method is provided for reproducing information recorded in an information recording medium, wherein first information, second information, first address information, second address information and disc management information at least, are recorded in the information recording medium, the second information is update information of the first information, the first address information includes a first address indicating at least a part of locations of the information recording medium at which the first information is recorded, the second address information is update information of the first address information, the second address information includes a second address indicating at least a part of locations of the information recording medium at which the second information is recorded, and the disc management information includes correlation information which correlates the first address information with the second address information. The reproducing method includes the steps of: generating a first reproduction instruction including a third address indicating at least a part of the locations of the information recording medium at which the first address information is recorded as a first reproduction instruction for reproducing the first address information; reproducing the second address information correlated with the first address information by referring to the correlation information in accordance with the first reproduction instruction; generating a second reproduction instruction including the second address as a second reproduction instruction for reproducing the second information; and reproducing the second information recorded in the information recording medium in accordance with the second reproduction instruction.

According to the present invention, a method implemented in a drive apparatus is provided for use in a reproducing apparatus for reproducing information recorded in an information recording medium, wherein first information, second information, first address information, second address information and disc management information at least, are recorded in the information recording medium, the second information is update information of the first information, the first address information includes a first address indicating at least a part of locations of the information recording medium at which the first information is recorded, the second address information is update information of the first address information, the second address information includes a second address indicating at least a part of locations of the information recording medium at which the second information is recorded, and the disc management information includes correlation information which correlates the first address information with the second address information. The method includes the steps of: receiving a first reproduction instruction including a third address indicating at least a part of the locations of the information recording medium at which the first address information is recorded; reproducing the second address information correlated with the first address information by referring to the correlation information in accordance with the first reproduction instruction; receiving a second reproduction instruction including the second address; and reproducing the second information recorded in the information recording medium in accordance with the second reproduction instruction.

According to the present invention, a program implemented in a drive apparatus is provided for use in a reproducing apparatus for reproducing information recorded in an information recording medium, wherein first information, second information, first address information, second address information and disc management information at least, are recorded in the information recording medium, the second information is update information of the first information, the first address information includes a first address indicating at least a part of locations of the information recording medium at which the first information is recorded, the second address information is update information of the first address information, the second address information includes a second address indicating at least a part of locations of the information recording medium at which the second information is recorded, and the disc management information includes correlation information which correlates the first address information with the second address information. The program includes the steps of: receiving a first reproduction instruction including a third address indicating at least a part of the locations of the information recording medium at which the first address information is recorded; reproducing the second address information correlated with the first address information by referring to the correlation information in accordance with the first reproduction instruction; receiving a second reproduction instruction including the second address; and reproducing the second information recorded in the information recording medium in accordance with the second reproduction instruction.

According to the present invention, an information recording medium is provided to have first information, second information and disc management information recorded thereon, wherein the second information is update information of the first information, the disc management information includes correlation information which correlates first address information with second address information, the first address information includes a first address indicating at least a part of locations of the information recording medium at which the first information is recorded, and the second address information includes a second address indicating at least a part of locations of the information recording medium at which the second information is further recorded.

In one embodiment of the present invention, the information recording medium further having duplication information of the second address information recorded thereon, wherein the disc management information further includes status information indicating whether the correlation information is valid or invalid, the status information is set to indicate that the correlation information is valid when the first address information has been updated to the second address information.

According to the present invention, even when efficient file incremental recording using the image data is performed, information in a predetermined area can be rewritten by a replacement mechanism. Thus, it has a file structure the same as read-only file structure in the logical space, and reproduction compatibility can be implemented.

According to the present invention, correlation information for correlating first information and second information is recorded in an information recording medium. By performing reproduction based on the correlation information, the second information, i.e., information updated from the information recording medium, can be correctly reproduced even when the reproduction system is a system which can only perform a reproduction operation for a read-only medium or a rewritable recording medium.

These and other advantages of the present invention will become apparent to those skilled in the art upon reading and understanding the following detailed description with reference to the accompanying figures.

BRIEF DESCRIPTION OF THE DRAWINGS

FIG. 2 is a diagram showing the data structure of the information included in the disc management information area in an embodiment according to the present invention.

FIG. 4B is a diagram showing the data structure of the information on the information recording medium in an embodiment according to the present invention.

FIG. 7B is a diagram showing the data structure of the information on the information recording medium in an embodiment according to the present invention.

FIG. 17 is a diagram showing the data structure of the replacement management information list in an embodiment according to the present invention.

FIG. 19 is a diagram showing the data structure of the disc structure information list in an embodiment according to the present invention.

FIG. 21 is a diagram showing the data structure of the image data in an embodiment according to the present invention.

FIG. 22 is a diagram showing the data structure of the volume structure area in an embodiment according to the present invention.

FIG. 23 is a diagram showing the data structure of the information on the information recording medium in an embodiment according to the present invention.

FIG. 36 is a diagram showing the data structure of the information on the information recording medium in an embodiment according to the present invention.

FIG. 47 is a diagram showing the data structure of the mapping management information list on the information recording medium in an embodiment according to the present invention.

| | |
|---|---|
| 100 | information recording medium |
| 101 | lead-in area |
| 102 102a | data area |
| 103, 103a | lead-out area |
| 104a, 104a 105, 105a | disc management information area |
| 106, 106a, 107, 107a | spare area |
| 108, 108a | user area |
| 109 | volume space |
| 110, 122 | unrecorded area |
| 120 | last recorded address |
| 121 | last recorded address in track |
| 210 | track management information |
| 211 | session start information |
| 212 | track start location information |
| 213 | last recorded address information |
| 220 | space bitmap management information |
| 222 | managed area information |
| 223 | space bitmap information |
| 300B | information recording/reproduction apparatus |
| 301 | system control section |
| 302 | memory circuit |
| 303 | I/O bus |
| 304 | magnetic disc apparatus |
| 305 | host apparatus |
| 310 | drive apparatus |
| 311 | drive control section |
| 312 | memory circuit |
| 313 | internal bus |
| 314 | recording/reproduction section |
| 410 | volume structure area |
| 600, 800 | AVDP |
| 601 | logical volume descriptor |
| 602 | partition map (type 2) |
| 440, 620 | metadata file |
| 450, 613 | metadata mirror file |
| 500, 650, 740, 750 | image data |
| 1000 | replacement management information list |
| 1010 | replacement management information |
| 1100 | disc structure information |
| 1401, 1402, 1501, 1502, 1503 | track |

BEST MODE FOR CARRYING OUT THE INVENTION

Hereinafter, embodiments of the present invention will be described with reference to the drawings.

Embodiment 1

Figure 1:
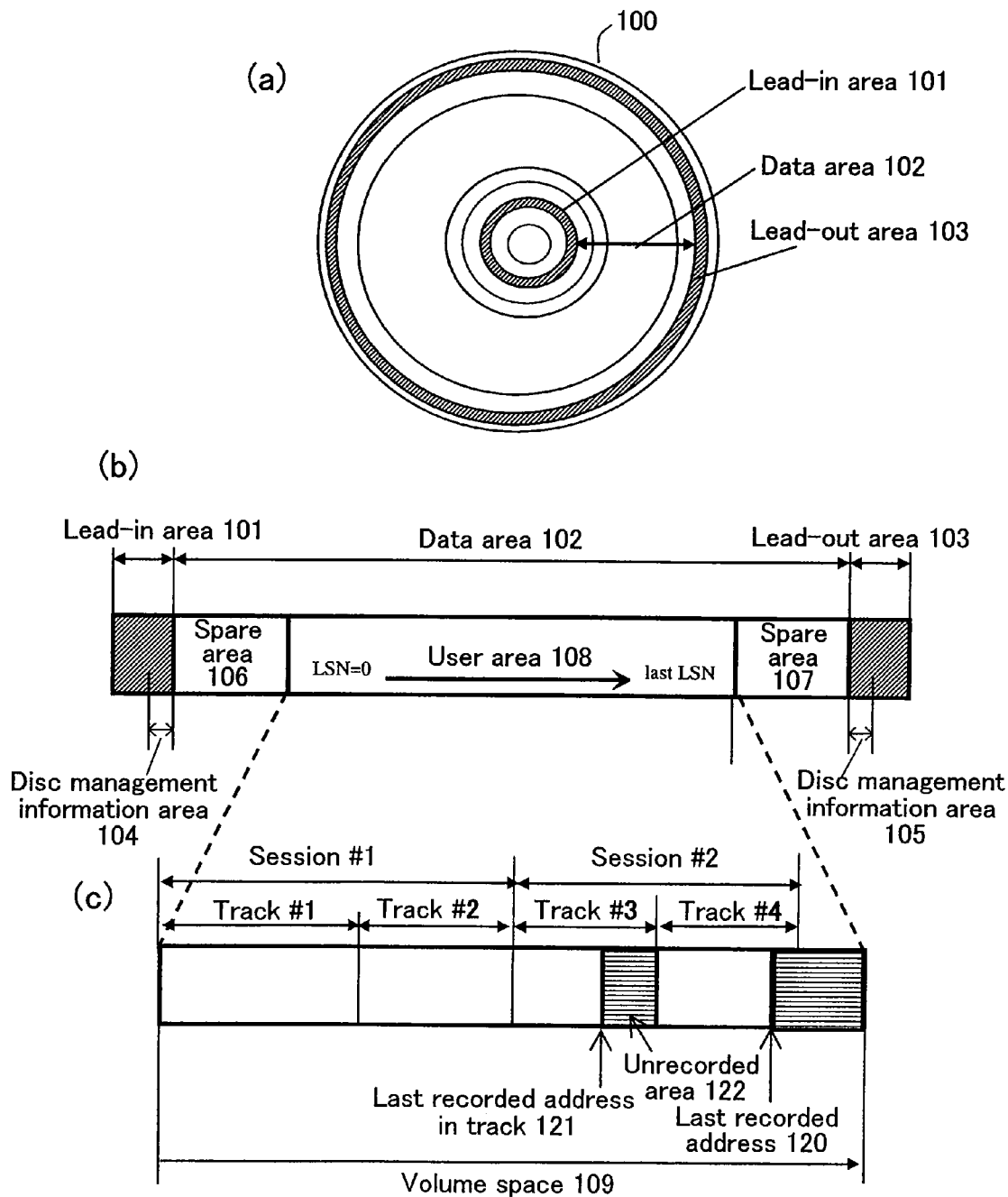
FIG. 1 is a diagram showing an appearance of an information recording medium and the data structure on the information recording medium in an embodiment according to the present invention.

FIG. 1 is a diagram showing an appearance of an information recording medium 100 and a data structure in one embodiment according to the present invention.

Portion (a) of FIG. 1 shows an exemplary information recording area of the recording medium 100. In the example shown in portion (a) of FIG. 1, a lead-in area 101 is located in an inner-most periphery, a data area 102 is located to the area next to it, and a lead-out area 103 is located at the outer-most periphery.

In the lead-in area 101, reference information necessary for an optical pickup to access the information recording medium 100, information for identifying from other recording media, and the like are recorded. In the lead-out area 103, similar information as those in the lead-in area 101 are recorded.

The data area 102 is separated into sectors, i.e., the smallest units for access. Data is recorded/reproduced with ECC blocks (or, ECC clusters) including a plurality of sectors as the smallest units.

Portion (b) of FIG. 1 illustrates the lead-in area 101, the data area 102 and the lead-out area 103, which are shown in concentric circles in portion (a) of FIG. 1, in a traverse direction.

The lead-in area 101 and the lead-out area 103 include disc management information areas 104 and 105 therein. The disc management information area includes replacement information, session management information, unrecorded area management information and the like as disc management information.

The replacement information refers to a replacement management information list including original location information indicating a position of a sector (or ECC block) which has a defect on the information recording medium, and replacement location information indicating where in a spare area, which will be described below, a sector which replaces the defective sector locates, and the like.

The data area 102 has spare areas 106 and 107 and user area 108 therein.

The spare areas 106 and 107 are used when there is a defective area in the user area, at least partially, to replace the defective area. For example, when there is a defective sector in the user area, the spare areas 106 and 107 are used as replacement sectors. In the spare areas, information related to the information recorded in the user area is recorded.

An additional disc management information area can be provided in an inner spare area 106 or an outer spare area 107 in order to record the updated disc management information.

Replacement recording combining the replacement information and spare areas is performed with a verify process. The verify process is a process of reproducing the data immediately after the data is recorded and comparing with the data recorded to check whether the data is correctly recorded.

When there is an error in the verify process, i.e., when the data is not correctly recorded, replacement recording is performed (that is, the data is re-recorded in the spare area). This method is also referred to as a linear replacement.

The present invention implements pseudo-overwrite recording in the write-once information recording media by using the replacement mechanism formed of the replacement information and spare area.

It is possible to reduce recording time by not performing the verify process when the image data is recorded. On the other hand, in the pseudo-overwrite recording, when the data is recorded in the spare area, the reliability of data recording can be improved by performing the verify process.

Hereinafter, with reference to FIG. 17, the replacement information and the pseudo-overwrite recording will be described.

The pseudo-overwrite recording is a method of mapping a physical address where data is actually recorded to another place without changing an apparent logical address where the data is recorded. For performing such a mapping, a replacement management information list 1000 shown in portion (a) of FIG. 17 is used as the replacement information.

The replacement management information list 1000 includes header information 1001 and a list of the replacement management information. The header information 1001 includes the number of the replacement management information included in the replacement management information list 1000 and the like. Each replacement management information includes information indicating a mapping.

Portion (b) of FIG. 17 shows a data structure of the replacement management information 1010. The replacement management information 1010 includes status information 1011, original location information 1012, and replacement location information 1013.

The status information 1011 includes status information regarding the mapping, and indicates, for example, valid/invalid status of the replacement location information 1013.

The mapping is performed by the original location information 1012 indicating the information before replacement and the replacement location information 1013 indicating the information after replacement.

When it is instructed to overwrite data to the recorded logical address, new data is recorded in a sector at a physical address different from the physical address where the data has been recorded before the overwriting, and the replacement information is updated so as to maintain the original logical address. In this way, it becomes possible to implement a state that the data is apparently overwritten. Specifically, by adding new replacement management information 1011 to the replacement management information list 1000, mapping of new data to the original logical address is performed.

Hereinafter, such a recording method is referred to as pseudo-overwrite recording. Next, an information recording/reproduction system for implementing such a pseudo-overwrite recording will be described.

Figure 3A:
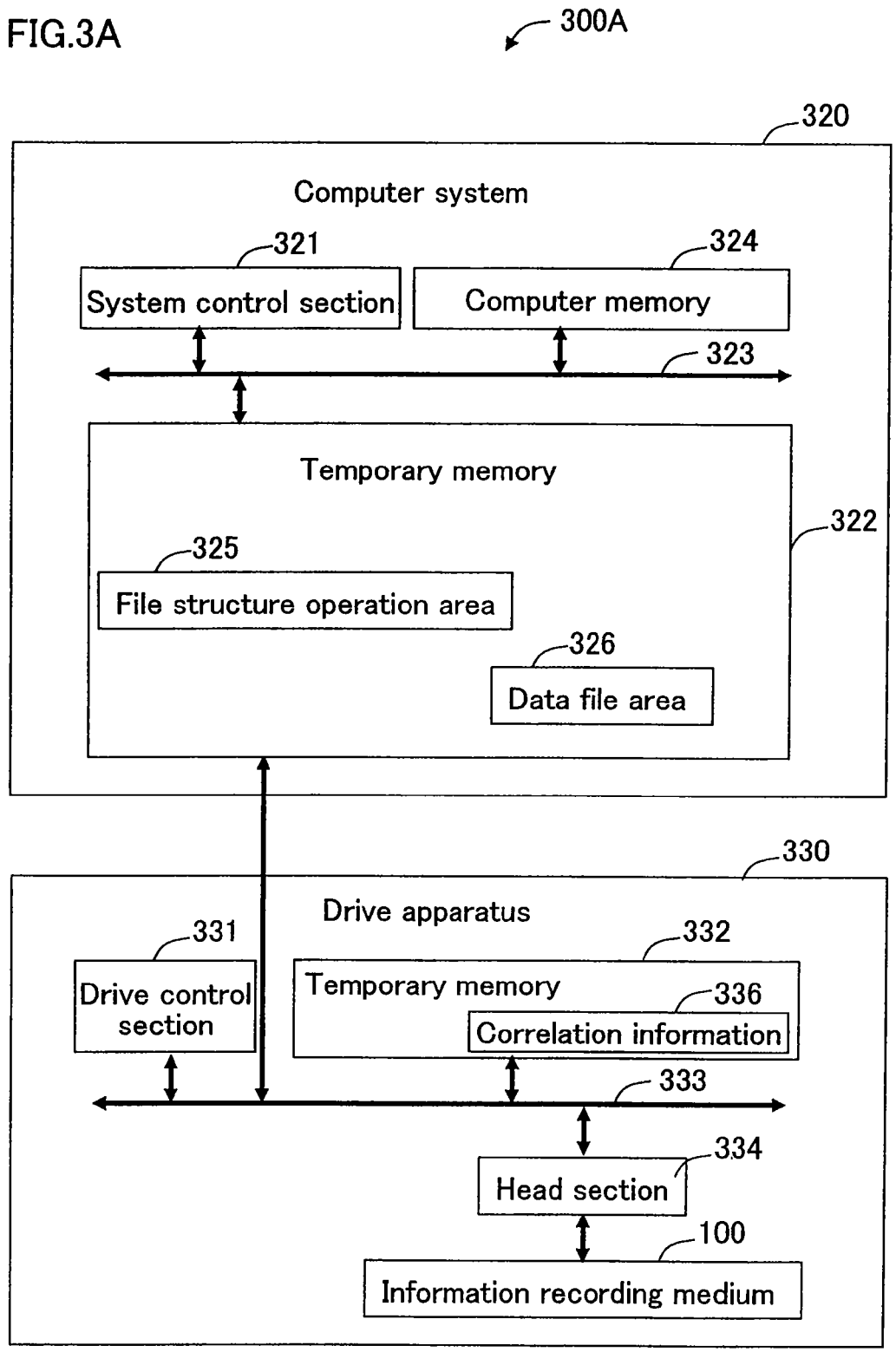
FIG. 3A is a block diagram showing an information recording/reproduction system in an embodiment according to the present invention.

FIG. 3A shows an information recording/reproduction system 300A according to one embodiment of the present invention.

The information recording/reproduction system 300A includes a computer system 320 and a drive apparatus 330. The computer system 320 may be a host apparatus (for example, a personal computer). The drive apparatus 330 may be a recording apparatus, reproduction apparatus, or recording/reproduction apparatus. The entire information recording/reproduction system 300A may be called recording apparatus, reproduction apparatus, or recording/reproduction apparatus.

The computer system 320 includes a system control section 321, a temporary memory 322, a computer memory 324, and I/O bus 323, and transfers data from to the information recording medium 100 via the drive apparatus 330. The system control section 321 controls operations of the computer system 320. The temporary memory 322 can transfer data to both the computer memory 324 and the drive apparatus 330. The temporary memory 322 includes a file structure operation area 325 and a data file area 326. The drive apparatus 330 includes a drive control section 331, a temporary memory 332, an internal bus 333, and a head section 334. The information recording medium 100 is mounted on the drive apparatus 330. In one embodiment of the present invention, the information recording medium 100 is a write-once information recording medium. The drive control section 331 controls operations of the drive apparatus 330 (for example, operation of recording information to the information recording medium 100 using the temporary memory 332 and the head section 334, and reproducing information from the information recording medium 100, and the like). The head section 334 performs recording information to the information recording medium 100 and reproducing information from the information recording medium 100 by being controlled by the drive control section 331. In this way, the drive apparatus 330 performs data transfer to and from the information recording medium 100 using the temporary memory 332 and the head section 334.

Figure 4A:
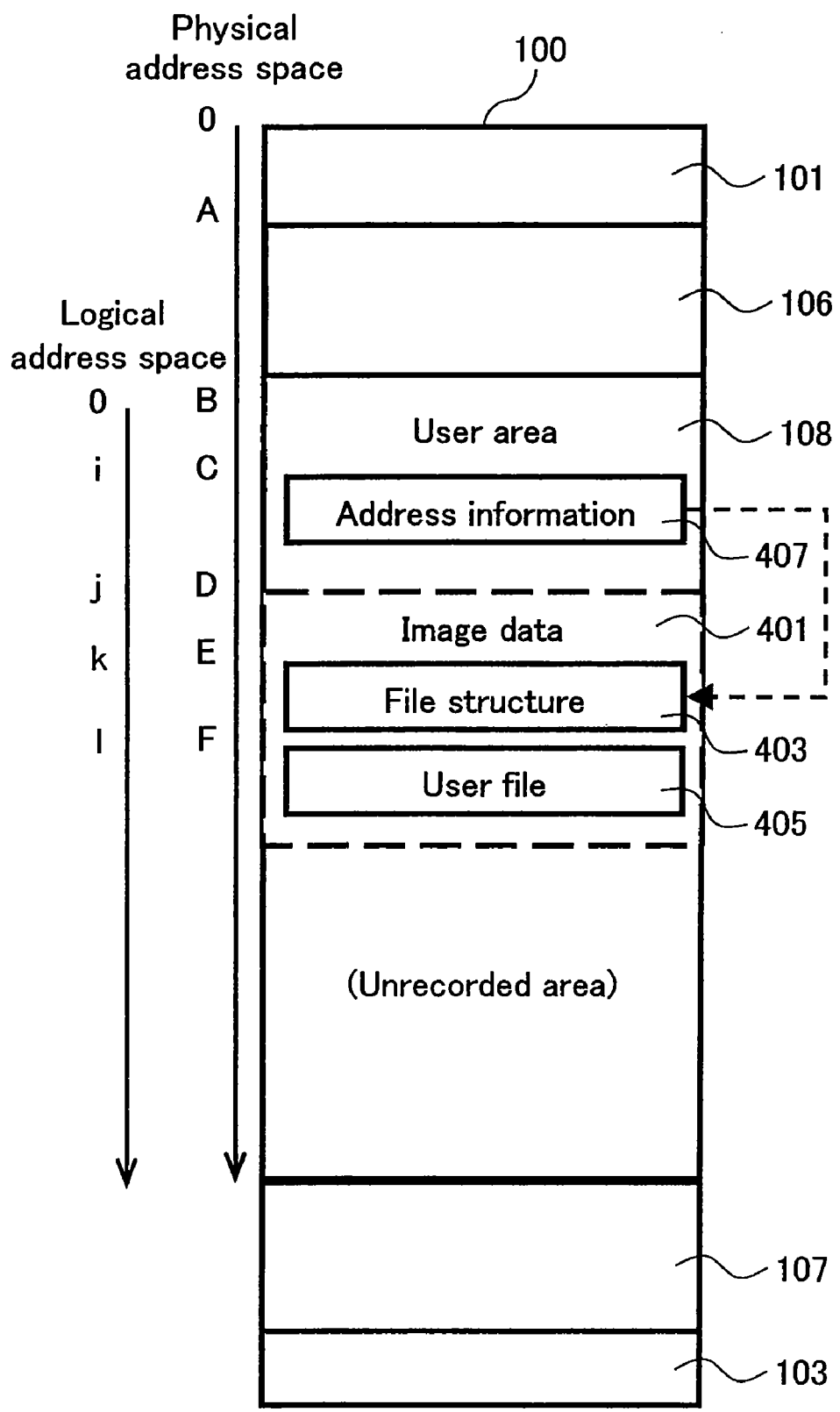
FIG. 4A is a diagram showing the data structure of the information on the information recording medium in an embodiment according to the present invention.

FIG. 4A shows a status where image data 401 is recorded in the user area 108 of the information recording medium 100.

The image data 401 includes a file structure 403 and a user file 405. The user file includes video data, audio data, and the like. At a predetermined position in the logical address space of the user area 108 ('i' in FIG. 4A), address information 407 including location information indicating the location of the file structure 403 is recorded. The file structure 403 is a file structure for the user file 405. The file structure 403 includes recording position, file size, file name and the like on the information recording medium 100 of the user file 405. An area where the file structure is recorded is, for example, metadata partition in the UDF specification. In this case, the file structure 403 is, for example, data to be recorded in a metadata partition, such as FID, FE, and the like. By using the file structure, information is located, or a reference is made based on the address information within the logical address space.

Figure 6A:
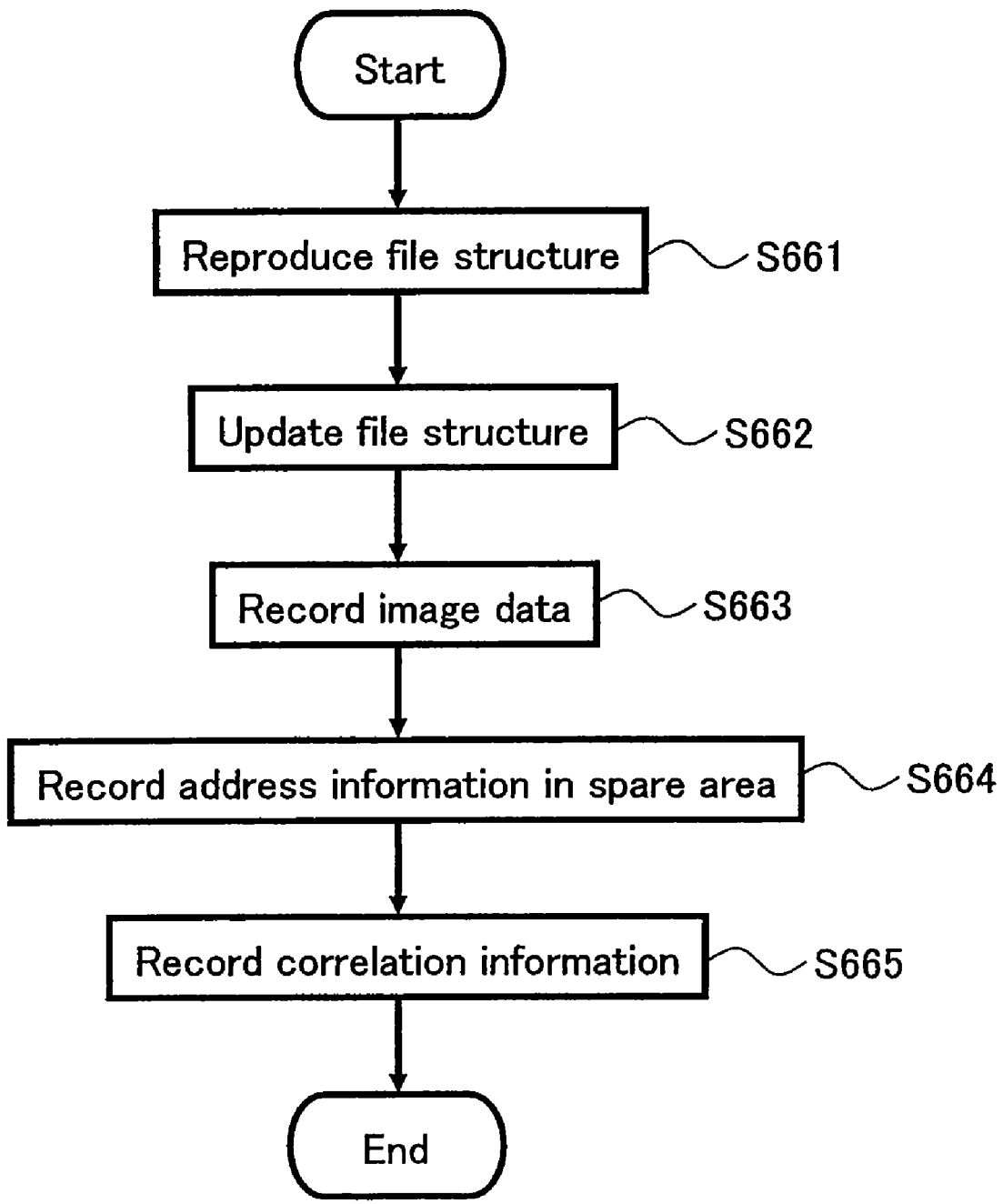
FIG. 6A is a flowchart showing a recording processing in an embodiment according to the present invention.

A method for recording a user file to the information recording medium 100 performed by such an information recording/reproduction system 300A will be described with reference to FIG. 4A, the data structure shown in FIG. 7A and a flowchart shown in FIG. 6A. When the new user file 406 is recorded in the information recording medium 100 shown in FIG. 4A, the following process is performed. Herein, the image data 402 is updated information obtained by updating the image data 401. A user file is added to or updated in, or the file structure is updated in the image data 401 to obtain image data 402.

The system control section 321 of the computer system 320 commands the drive control section 331 to reproduce the file structure 403, and receives the file structure 403 reproduced by the drive control section 331 to store in the file structure operation area 325 in the temporary memory 322 (S661).

The system control section 321 prepares a user file 406 generated by editing work and the like by the user, and updates the information of the file structure 403 related to recording of the user file 406 (S662). The update process is performed with respect to the file structure 403 in the file structure operation area 325. The system control section 321 generates the file structure 404 by updating the file structure 403.

Next, the system control section 321 generates the image data 402 including the file structure 404 and the user file 406 in the temporary memory 322, and transfer it from the computer memory 324 to the temporary memory 332 of the drive control section 331 via the data file area 326. The drive control section 331 records the image data 402 in the unrecorded area of the information recording medium 100 using the head section 334 (S663).

The computer system 320 updates the address information 407 as the image data 401 is updated to the image data 402, and generates the updated address information 407 (i.e., address information including the location information indicating the location of the file structure 404) in the temporary memory 322. Then, the computer system 320 instructs the drive apparatus 330 to perform overwrite recording of the updated address information 407. Specifically, the computer system 320 instructs the drive apparatus 330 to record the address information 407 updated to position 'i' of the logical address of the address information 407 before update. In the instructed recording position (position 'i' of the logical address), the address information 407 before update has been recorded. Thus, drive apparatus 330 records the updated address information 407 in the spare area 106 as the address information 408 (S664).

Figure 7A:
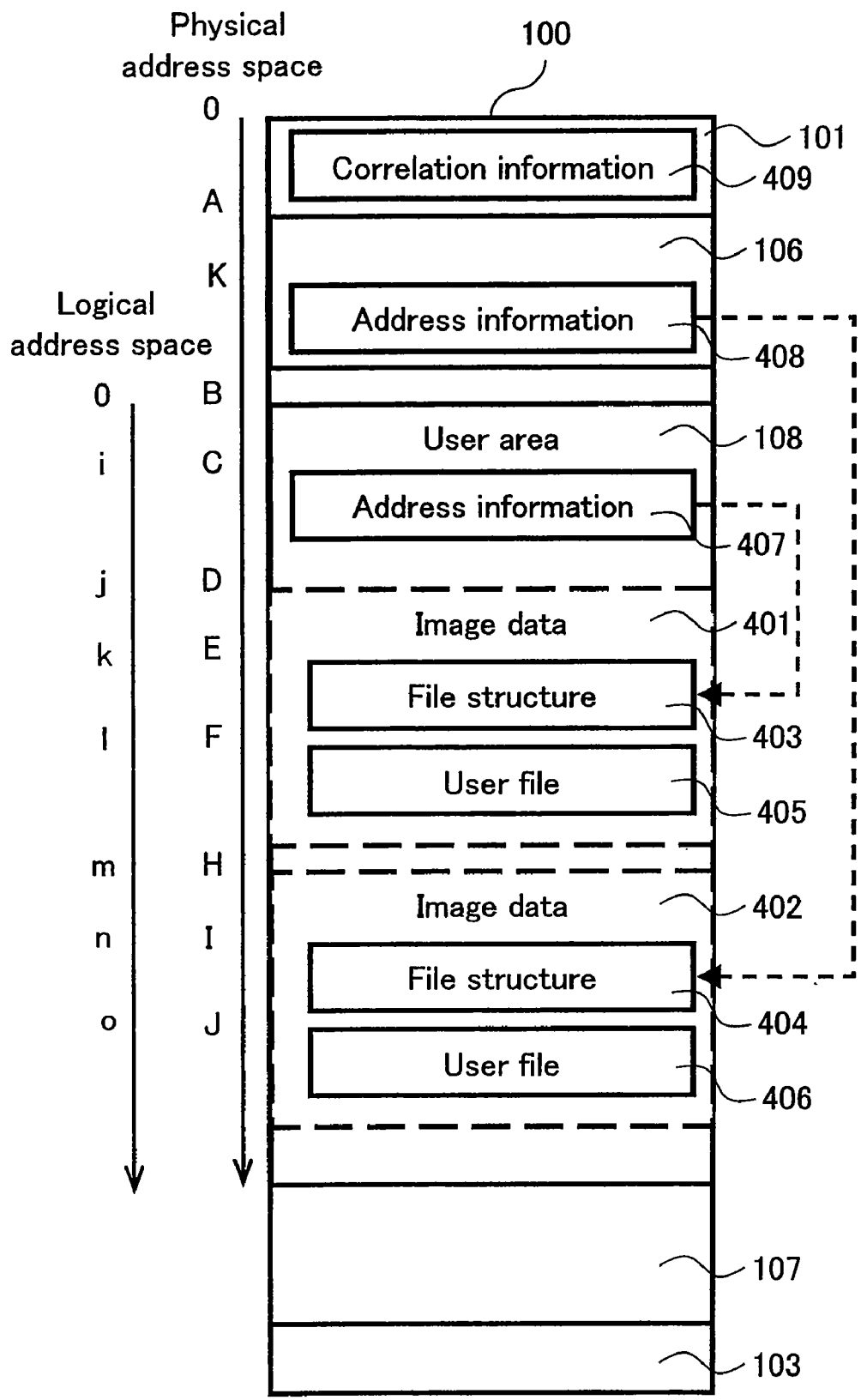
FIG. 7A is a diagram showing the data structure of the information on the information recording medium in an embodiment according to the present invention.

The drive control section 331 generates correlation information 409 for correlating the address information 407 and the address information 408 in the temporary memory 332, and, as shown in FIG. 7A, the correlation information 409 is recorded in the lead-in area 101 of the recording medium 100 (S665). The correlation information 409 may be recorded as a part of the above-described replacement information. The correlation information 331 is instruction information for instructing the drive control section 331 to instruct to reproduce the address information 408 when it receives the instruction to reproduce information recorded at position 'i' of the logical address (i.e., reproduction instruction of the address information 407). The correlation information 409 indicates, for example, physical address 'C' corresponding to logical address 'i' where the address information 407 is recorded, and physical address 'K' where the address information 408 is recorded are correlated to each other. Alternatively, it may be indicated that logical address 'i' and physical address 'K' are correlated. Since logical address 'i' of the address information 407 and physical address 'K' of the address information 408 are correlated to each other, the correlation information 409 may also be regarded as the information correlating the address information 407 and address information 408 in such an example. The reproduction process based on the content of the correlation information 409 will be described later.

In the above-described recording process, the file structure 403 to which logical addresses are assigned are read from the information recording medium 100 to the file structure operation area 325 of the temporary memory 322. Accordingly, it is no longer necessary for the computer system 320 to perform a process to translate the file structure to which the physical addresses are assigned to the file structure to which the logical addresses are assigned. Thus, even when the computer system 320 does not have a function to perform such a translation, the file structure can be updated and rewritten.

Thus, the information recording/reproduction system 300A is operable to record second address information (e.g. the address information 408) and second information (e.g. the file structure 404) in the information recording medium 100 to update first information (e.g. the file structure 403) recorded in the information recording medium 100 to the second information (e.g. the file structure 404) by updating first address information (e.g. the address information 407) recorded in the information recording medium 100 to the second address information (e.g. the address information 408). Herein, each of the first information and the second information can be an arbitrary information.

The first address information includes a first address indicating at least part of the locations of the information recording medium 100 at which the first information is recorded.

The first address is not required to indicate all of the locations of the information recording medium 100 at which the first information is recorded. For example, the first address may indicate a leading location of the locations of the information recording medium 100 at which the first information is recorded.

The second address information includes a second address indicating at least part of the locations of the information recording medium 100 at which the second information is recorded.

The second address is not required to indicate all of the locations of the information recording medium 100 at which the second information is recorded. For example, the second address may indicate a leading location of the locations of the information recording medium 100 at which the second information is recorded.

The system control section 321 of the computer system 320 generates an update instruction including a third address indicating at least part of the locations of the information recording medium 100 at which the first address information is recorded and the second address information as an update instruction for updating the first address information to the second address information. The generation of the update instruction is performed, for example, by an update instruction generating section (not shown) in the system control section 321.

The third address is not required to indicate all of the locations of the information recording medium 100 at which the first address information is recorded. For example, the third address may indicate a leading location of the locations of the information recording medium 100 at which the first address information is recorded.

The update instructions generated by system control section 321 is output to the drive apparatus 330. The output of the update instruction is performed, for example, by an outputting section (not shown) in the system control section 321.

The drive control section 331 of the drive apparatus 330 receives the update instruction from the system control section 321 of the computer system 320. In accordance with the update instruction, the drive control section 331 controls the head section 334 to record the second address information in the information recording medium 100, generates disc management information including correlation information 409, and controls the head section 334 to record the disc management information in the information recording medium 100. The correlation information correlates the first address information with the second address information. The second address information can be correlated with the first address information in an arbitrary manner. The generation of the disc management information including the correlation information is performed, for example, by a generating section (not shown) in the drive control section 331.

The second address information may be generated in the drive apparatus 330 (for example, the drive control section 331 may generate the second address information in response to the update instruction) or may be generated in the computer system 320 (for example, the system control section 321 may generate the second address information by modifying the first address information. In this case, the system control section 321 may generate the update instruction including the second address information).

The drive control section 331 of the drive apparatus 330 controls the head section 334 to record the second information in the information recording medium 100 in accordance with at least the second address.

Thus, the second information and the disc management information including the correlation information 409 are recorded in the information recording medium 100. The control of the head section 334 is performed, for example, by a recording control section (not shown) in the drive control section 331.

Figure 8A:
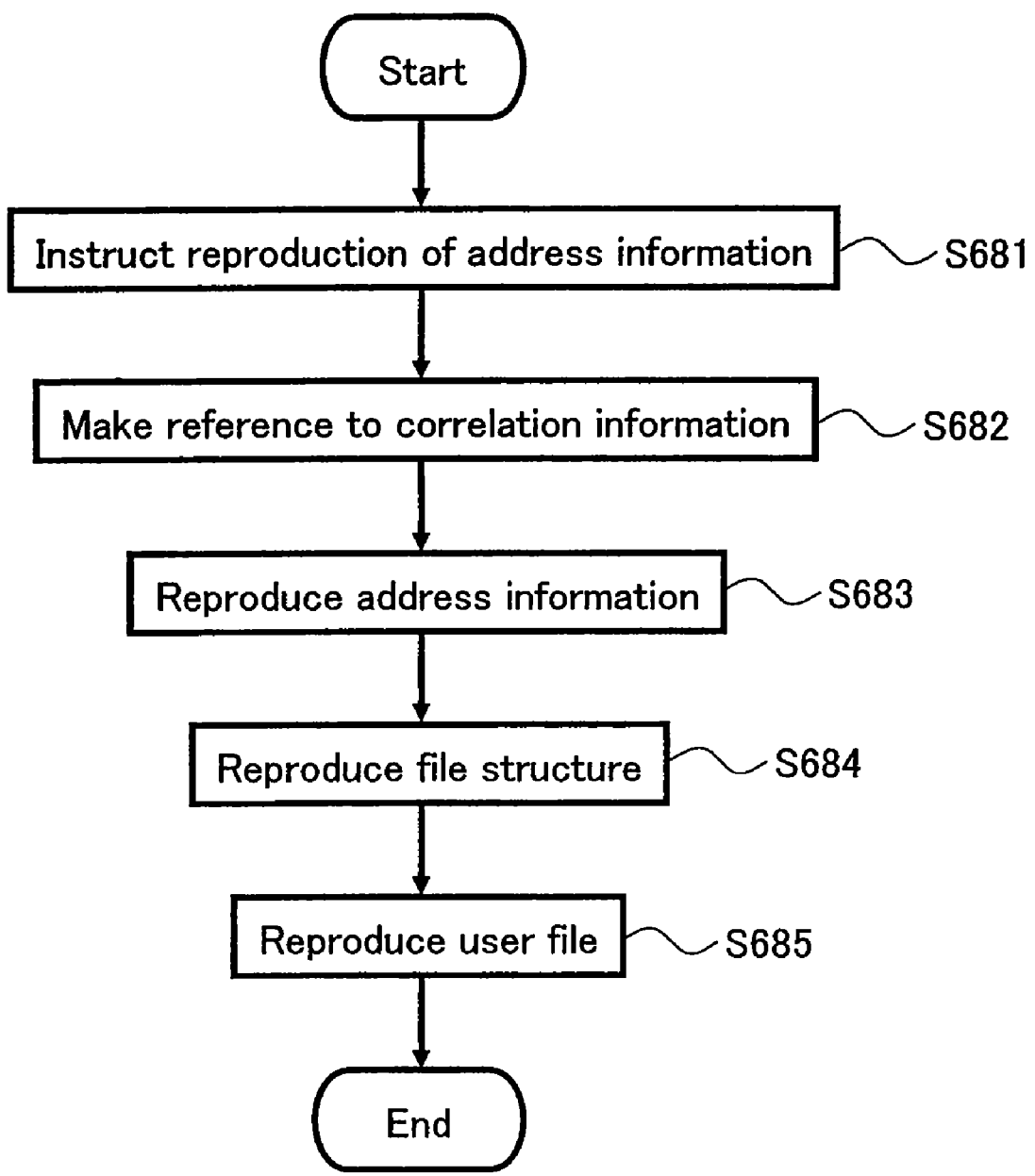
FIG. 8A is a flowchart showing a reproduction processing in an embodiment according to the present invention.

Next, a procedure of a reproduction process for a user file recorded by the above-described recording procedure of the present embodiment will be described with reference to a flow chart shown in FIG. 8A. When the user file 406 is recorded from the information recording medium 100 in the recording status shown in FIG. 7A, the following process is performed.

The system control section 321 included in the computer system 320 specifies logical address 'i' of the address information 407 to instruct reproduction of the address information to the drive apparatus 330 (S681).

The drive control section 331 converts logical address 'i' to the corresponding physical address value 'C'. Then, the drive control section 331 reads out and makes reference to the correlation information 409, and checks whether there is a physical address value correlated to the physical address value 'C' (S682). In the example shown in FIG. 7A, the drive control section 331 makes reference to the correlation information 409, and detects that the physical address value 'K' is correlated to the physical address value 'C' (S682). If logical address 'i' directly corresponds to physical address value 'K', the conversion from logical address 'i' to physical address value 'C' is not necessary.

The drive control section 331 reproduces information recorded in physical address value 'K', i.e., the address information 408, and transfers to the computer system 320 (S683).

The system control section 321 obtains a logical address value ('n') indicating the recording position of the file structure 404 from the transferred address information 408, and instructs the drive apparatus 330 to reproduce the file structure 404. The drive control section 331 receives the instruction and reproduces the file structure 404 using the head section 334 to transfer to the computer system 320. The transferred file structure 404 is stored in the file structure operation area 325 (S684).

The system control section 321 obtains the recording position of the user file 406 from the file structure 404 stored in the file structure operation area 325, and instructs the drive apparatus 330 to reproduce the user file 406. The drive control section 331 receives the instruction and reproduces the user file 406, using the head section 334 to transfer to the computer system 320 (S685). The computer system 320 stores the received user file 406 in the temporary memory 322 or the computer memory 324, and, for example, displays images, outputs sounds or the like using video data and audio data included in the user file 406. Alternatively, the computer system 320 performs editing or the like of the video data and the audio data.

In the above-described reproduction process, from the viewpoint of the computer system 320, by just making reproduction instructions of the address information 407 recorded in a predetermined logical address ('i') all the time, the address information having the position of the latest file structure (in this example, the address information 408 indicating the position of the file structure 404).

The computer system 320 instructs the drive apparatus 330 to update and overwrite the address information 407 for recording the user file 406. For reproducing the user file 406, first, logical address value 'i' of the address information 407 is instructed to the drive apparatus 330. However, actually, the drive apparatus 330 which makes reference to correlation information 409 can obtain the address information 408. Based on the address information 408, the user file 406 can be reproduced. In other words, pseudo-overwrite recording in which the address information, i.e., update information, is overwritten at the recording position of the address information 407 for the computer system 320 can be implemented.

As described above, the drive apparatus 330 reads out the correlation information 409 from the information recording medium 100 and makes reference thereto. In this way, the computer system 320 can correctly reproduce the user file 406 which is the latest information from the information recording medium 100 even when it is a system which can only reproduce read-only media, or rewritable recording media. By processing the correlation information 409 within the drive apparatus 330, the reproduction procedure for directories and/or files in the computer system 320 can be completely the same as the read-only or rewritable reproduction procedure, and, thus, broad compatibility with the computer system 320 can be realized. As described above, according to the present invention, the write-once information recording media has reproduction compatibility with a system which can only reproduce read-only media, or rewritable recording media.

Furthermore, according to the present invention, the pseudo-overwrite recording is performed not for all the data recorded in the logical address space, but for specific information such as management information for the files and directory information and the like. Thus, a capacity of the correlation information 409 required for pseudo-overwrite recording can be limited to a certain capacity, and implementation at the drive apparatus 330 becomes convenient.

Further, as an additional use, when recording cannot be performed in an area where attempts are being made to record data due to factors such as a defect, a scratch, and the like, provided that the it is immediately after the recording process, the data can be re-written correctly using the pseudo-overwrite recording. This additional benefit provides a significant merit in the industrial aspect. In a conventional medium such as a CD-R disc or the like, if there is an error in writing, the disc cannot be re-used. However, according to the present invention, it is possible to correct the error in writing. This means that the cost of manufacturing the discs can be reduced. Conventionally, it has been required that there is no defect on discs when the discs are manufactured. However, by utilizing the present invention, the quality of the discs upon manufacturing can be lowered, and thus, the cost of manufacturing can be further reduced.

Thus, the information recording/reproduction system 300A is operable to reproduce information recorded in an information recording medium 100.

The system control section 321 of the computer system 320 generates a first reproduction instruction including a third address as a first reproduction instruction for reproducing the first address information. The generation of the first reproduction instruction is performed, for example, by a reproduction instruction generating section (not shown) in the system control section 321. The first reproduction instruction generated by the system control section 321 is output to the drive apparatus 330. The output of the first reproduction instruction is performed, for example, by an outputting section (not shown) in the system control section 321.

The drive control section 331 of the drive apparatus 330 receives the first reproduction instruction from the system control section 321 of the computer system 320, controls the head section 334 to reproduce the second address information correlated with the first address information by referring to the correlation information 409 in accordance with the first reproduction instruction, and outputs the reproduced second address information to the computer system 320. The second address information is reproduced, for example, by a reproduction section (not shown) in the drive control section 331.

Thus, the second address information, which is update information of the first address information, can be reproduced.

The system control section 321 of the computer system 320 receives the second address information from the drive apparatus 330, generates a second reproduction instruction including the second address as a second reproduction instruction for reproducing the second information. The generation of the second reproduction instruction is performed, for example, by the reproduction instruction generating section (not shown) in the system control section 321. The second reproduction instruction generated by the system control section 321 is output to the drive apparatus 330. The output of the second reproduction instruction is performed, for example, by the outputting section (not shown) in the system control section 321.

The drive control section 331 of the drive apparatus 330 receives the second reproduction instruction from the system control section 321 of the computer system 320, controls the head section 334 to reproduce the second information recorded in the information recording medium 100 in accordance with the second reproduction instruction, and outputs the reproduced second information to the computer system 320. The control of the head section 334 is performed, for example, by a reproducing control section (not shown) in the drive control section 331.

Thus, the second information, which is update information of the first information, can be reproduced.

Next, an unrecorded area management on the user area 108 will be described below. First, an unrecorded area management according to a sequential recording method is described with reference to portion (c) of FIG. 1 and then an unrecorded area management according to a random recording method is described with reference to FIG. 18.

Portion (c) of FIG. 1 is a diagram showing unrecorded area management on the user area 108 shown in portion (b) of FIG. 1 as a unit of track or session. Each session includes a plurality of tracks.

Each track is formed as a contiguous area on the information recording medium 100. The start location of each track and the area at which information has been recorded last, are managed by track management information, which will be described later.

Each session includes a plurality of tracks which are continuously arranged on the information recording medium 100. Each session is managed by session management information, which will be described later.

Portions (a) and (b) of FIG. 2 shows the data structure of session management information 200 and the track management information 210 included in the disc management information area, respectively.

The session management information 200 shown in portion (a) of FIG. 2 includes a header information 201 and a plurality of track management information.

The header information 201 includes general information such as an identifier of the session management information 200 and the number of the track management information shown in portion (b) of FIG. 2.

Each track management information shown in portion (a) of FIG. 2 includes information corresponding to a track shown in portion (c) of FIG. 1. Specifically, the track management information #N shown in portion (a) of FIG. 2 corresponds to the track #N shown in portion (b) of FIG. 2, where N is an integer greater than or equal to 1.

The track management information 210 shown in portion (b) of FIG. 2 includes the following information: session start information 211 indicating whether a corresponding track is a leading track of the session; track start location information 212 indicating start location of the track; and last recorded address information 213 indicating a location at which data has been lastly recoded within the track. The track management information 210 for managing these tracks is recorded on the lead-in area by the control section.

If a track managed by the track management information is located at a leading position of the session, information having a value indicating such (e.g. "1") is set to the session start information 211. Otherwise, information having a different value (e.g. "0") is set to the session start information 211.

The start location of the corresponding track is recorded on the track start location information 212 by the use of physical addresses.

The last recorded physical address at which data has been recorded last within the corresponding track is recorded on the last recorded address information 213. In portion (c) of FIG. 1, the last recorded address in track 121 is one example of the last recorded address information 213.

In the present embodiment, it is possible to record data for each track. The data recording is performed from a leading position of each track. The data is continuously allocated within the track. Once the data has been recorded, the last recorded address information 213 is updated to indicate the last recorded address.

When the data recording is performed next time, the latest value of the last recorded address information 213 is checked. As a result, it is possible to know the next recording start location. In general, the next recording start location is a physical sector which is next to the physical sector indicated by the last recorded address information 213. Alternatively, when the data recording is made as a minimum unit of ECC block with respect to the information recording medium 100, the next recording start location may be within an ECC block which is next to the ECC block including the physical sector indicated by the last recorded address information 213.

In one embodiment of the present invention, there is a method for avoiding the consumption of the spare area during recording data. When the data recording is performed as a unit of a sector on the write-once recording medium having a pseudo overwrite function, the actual data recording is performed as a unit of an ECC block. For example, when the data recording for one sector is performed in a case where one ECC block includes 32 sectors, one ECC block is consumed. Specifically, one ECC block including the sector to be recorded is read, and then one ECC block, to which data is to be recorded is added, is instructed to be pseudo overwritten. As a result, the data of this ECC block is recorded in the spare area. In the present invention, the data is recorded from a leading position of an ECC block which is the next to the ECC block including the last recorded location so that the ECC block at which the data has been already recorded is not used. Thus, the consumption of the spare area can be avoided.

In an example shown in portion (c) of FIG. 1, in the session #2, unrecorded area 122 next to the last recorded address information 213 is an empty area. The data can be recorded in the unrecorded area 122.

The track having a state where data can be recorded is called an open track. The track number of the open track (i.e. recordable track) is stored in the header information 201 of the session management information 200 shown in portion (a) of FIG. 2 (for example, in the form of a first open track number 203 and a second open track number 204).

On the other hand, the track number of the track having a state where data cannot be recorded (i.e. non-recordable track or closed track) for some reason (for example, there does not exist any unrecorded area or due to an instruction from a user) is not stored in the header information 201.

It is possible to know an empty area on the information recording medium 100 by checking the open track number and the last recoded address information 213.

Figure 18:
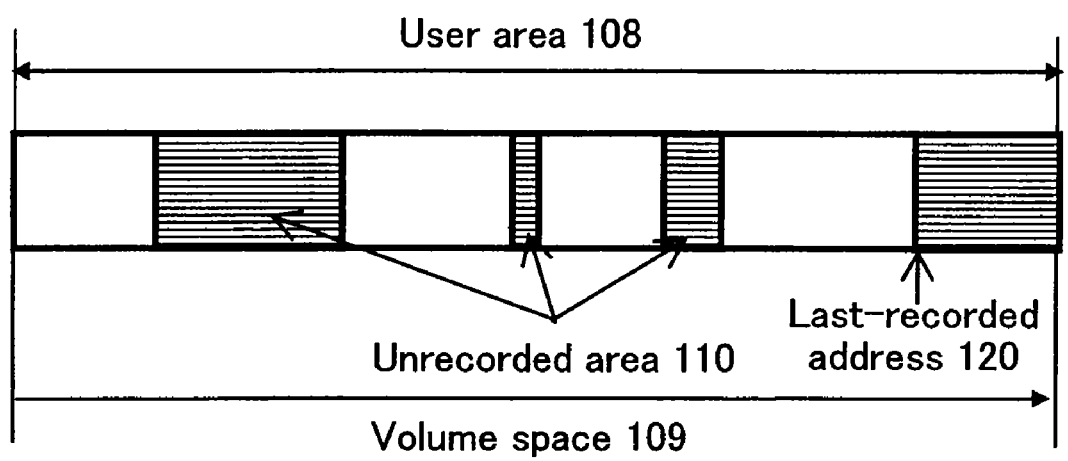
FIG. 18 is a diagram showing an example of the unrecorded area and the latest recorded address in an embodiment according to the present invention.

FIG. 18 is a diagram showing unrecorded area management on the user area 108 shown in portion (b) of FIG. 1 according to a random recording method.

In the write-once information recording medium 100, it is possible to perform a kind of random recording which records data at an arbitrary position (physical address) on the information recording medium, by managing sectors (or ECC blocks) at which data has been recorded. In FIG. 18, an unrecorded area 110 is an area where data has not been recorded. Any area other than the unrecorded area 110 and which is located at an inner side from the position indicated by the last recorded address 120 is an area where data has been recorded.

In order to realize such a random recording, it is necessary to manage the unrecorded area and the last recorded address on the information recording medium 100. In the present embodiment, such a management can be realized using the disc management information recorded in the disc management information areas 104 and 105. Hereinafter, the detailed description of the disc management information recorded in the disc management information area 105 will be omitted, since it may be duplication of the disc management information recorded in the disc management information area 104 for the purpose of improving the reliability of the information recording medium 100 or an extension area for recording data which cannot be stored in the disc management information area 104.

The disc management information recorded in the disc management information area 104 includes disc structure information 1110 shown in FIG. 19. The last recorded address information 1107 indicating the last recorded address 120 is recorded in the disc structure information 1110.

The space bitmap management information 220 shown in portion (c) of FIG. 2 is also recorded in the disc management information recorded in the disc management information area 104.

The space bitmap management information 220 includes header information 221, managed area information 222 and space bitmap information 223.

The header information 221 includes general information such as an identifier of the space bitmap management information 220.

The managed area information 222 includes information which specifies an area in the user area 108, wherein the unrecorded/recorded status of each sector included in the area is managed by the space bitmap management information 220. For example, the information includes a start location or length of the managed area in the user area 108.

The space bitmap information 223 includes information indicating the unrecorded/recorded status of each sector (or ECC block) included in the managed area in the user area 108. For example, one bit of data is assigned to each sector. If the sector is in the unrecorded status, a specific value (e.g. "0") is set to the bit for the sector. If the sector is in the recorded status, a specific value (e.g. "1") is set to the bit for the sector. Thus, it is possible to manage the unrecorded/recorded status for every sector in the managed area.

As described above, it is possible to manage the unrecorded/recorded status for each sector on the information recording medium 100 by the use of either the session management information 200 or the space bitmap management information 220. Accordingly, either one of the session management information 200 or the space bitmap management information 220 can be selectively used according to the purpose of use. Alternatively, both these information can be used. The information regarding the space bitmap management method is recorded in the recording mode information 1106 of the disc structure information 1100.

The disc structure information 1100 further includes general information 1101 concerning the general nature of the disc structure information 1100; replacement management information list location information 1102 indicating location of the latest replacement management information list 1000 in the disc management information areas 104 and 105; user area start location information 1103 indicating start location of the user area 108; user area end location information 1104 indicating end location of the user area 108; and spare area information 1105 and spare area management information 1108 which indicates the capacity of the spare areas 106, 107 and the area available for replacement.

By using spare area information 1105, it is possible to change the capacity of a spare area for each information recording medium. For example, it is possible to set the capacity of the spare area 106 or the spare area 107 to zero.

The disc structure information 1100 further includes session management information location information 1109 indicating location of the latest session management information 200 in the disc management information areas 104, 105; and space bitmap management information location information 1110 indicating location of the latest location of the space bitmap management information 220 in the disc management information areas 104, 105.

The user data recorded on the user area managed as shown in portion (c) of FIG. 1 and FIG. 18 is managed by a file system. A space managed by the file system is referred to as a volume space 109.

Hereinafter, it is assumed that the descriptor and the pointer and the like recorded on the information recording medium 100 as the volume file structure of the file system has a data structure defined by ISO/IEC13346 standard or UDF (Universal Disc Format) specification, so long as there is no specific detailed descriptions.

Further, it is assumed that the metadata partition and the metadata file which will be described later has a data structure defined by version 2.5 of the UDF specification.

The information recording medium 100 shown in FIG. 1 has a single recording surface. However, there exists an information recording medium having two or more recording surfaces.

Figure 20:
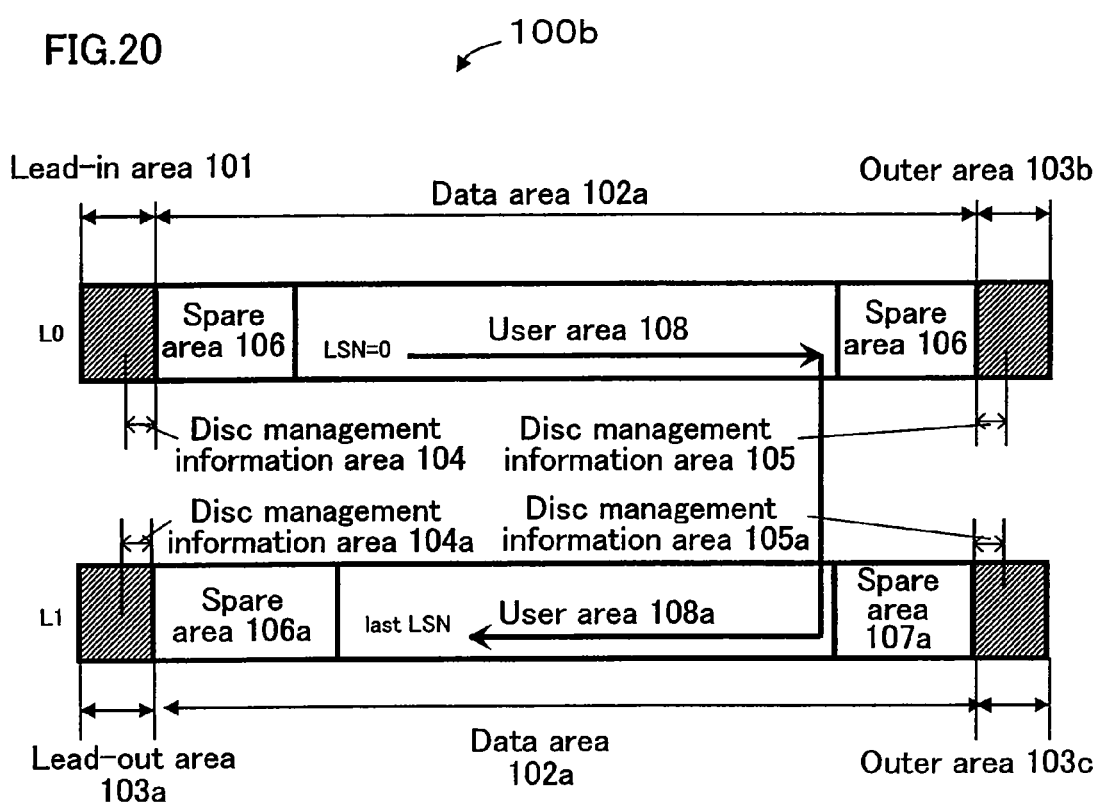
FIG. 20 is a diagram showing the data structure on the information recording medium in an embodiment according to the present invention.

FIG. 20 is a diagram showing a data structure of the information recording medium 100b having two layers. Each layer has a recording surface. In FIG. 20, L0 denotes a first layer and L1 denotes a second layer. Each layer has substantially the same structure as the information recording medium 100. The lead-in area 101 is located in an inner-most periphery of the first layer. The lead-out area 103a is located in an inner-most periphery of the second layer. The outer areas 103b, 103c are located in an outer-most periphery of the respective layers. The lead-in area 101, the outer area 103b, the lead-out area 103a and the outer area 103c includes disc management information areas 104, 105, 104a and 105a, respectively.

Further, as shown in FIG. 20, the spare areas 106, 106a, 107 and 107a are located. As described above, the capacity of each spare area can be changed for each information recording medium. The user areas 108 and 108a are handled by a single volume space having logically contiguous addresses.

Thus, in a logical sense, the information recording medium having a plurality of recording surfaces can be handled in a similar manner as the information recording medium having a single recording surface. Hereinafter, the information recording medium having a single recording surface will be described. However, it should be understood that such a description directed to the information recording medium having a single recording surface is also applicable to the information recording medium having a plurality of recording surfaces. The information recording medium having a plurality of recording surfaces will be specifically referred to only if any additional/supplemental explanations are required.

Figure 3B:
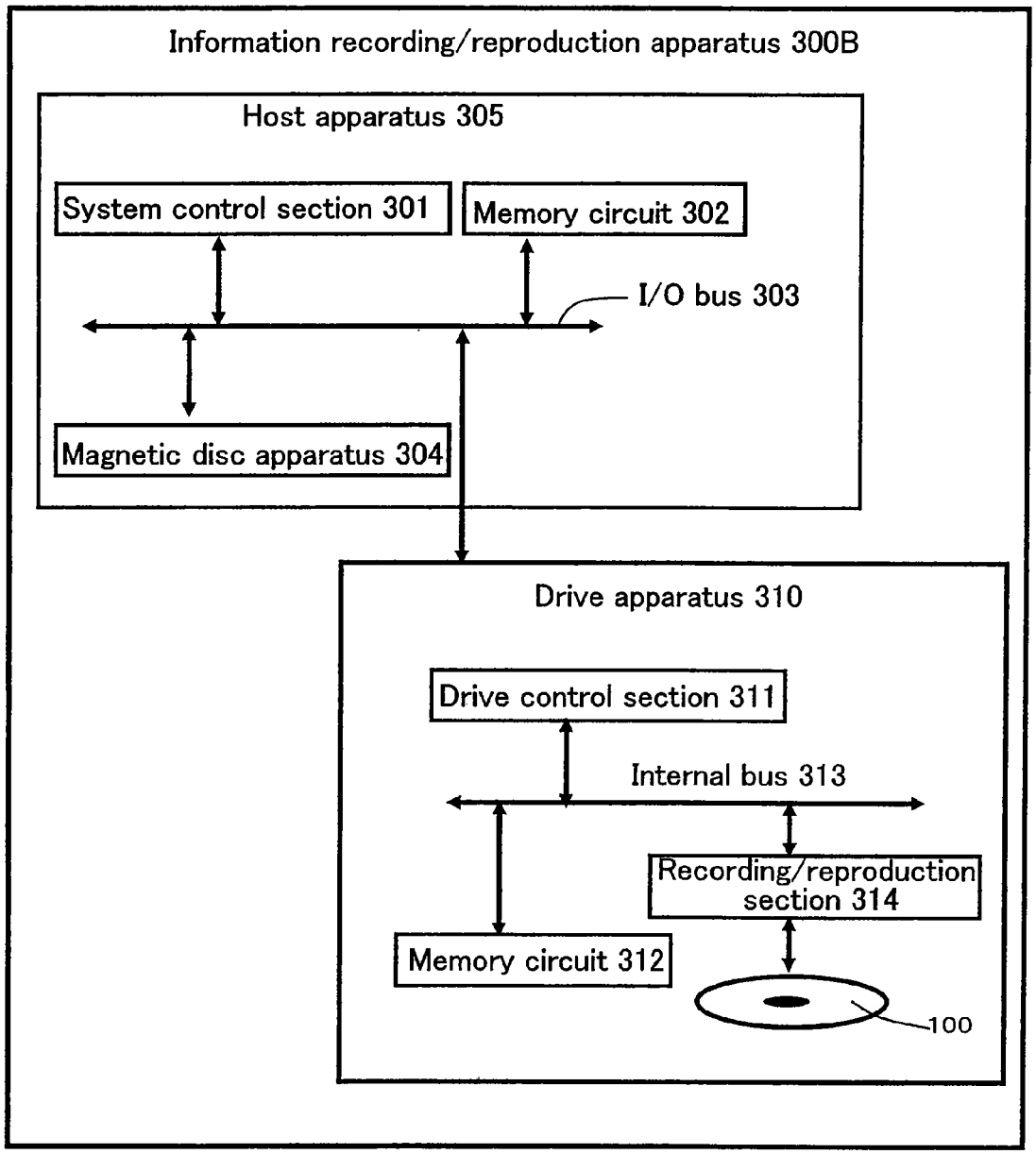
FIG. 3B is a block diagram showing an information recording/reproduction system in an embodiment according to the present invention.

FIG. 3B shows a structure of an information recording/reproduction apparatus 300B according to the present embodiment of the present invention.

The information recording/reproduction apparatus 300B includes a host apparatus 305 and a drive apparatus 310.

The host apparatus 305 can be, for example, a computer system or a personal computer. The drive apparatus can be any of a recording apparatus, a reproduction apparatus or a recording/reproduction apparatus. The information recording/reproduction apparatus 300B, as a whole, can be called a recording apparatus, a reproduction apparatus or a recording/reproduction apparatus.

The host apparatus 305 includes a system control section 310, a memory circuit 302, an I/O bus 303 and a magnetic disc apparatus 304.

The system control section 301 can be implemented, for example, by a microprocessor including a system control program and a memory for calculation. The system control section 301 performs control of processing and calculation such as recording/reproduction of the volume structure/file structure of the file system, recording/reproduction of the metadata partition/file structure which will be described later, recording/reproduction of the file, recording/reproduction of the lead-in area and the lead-out area.

The memory circuit 302 is used to calculate or temporarily store the volume structure, file structure, metadata partition/file structure and file.

The drive apparatus 310 includes a drive control section 311, a memory circuit 312, an internal bus 313, a recording/reproduction section 314 and an information recording medium 100.

The drive control section 311 can be implemented, for example, by a microprocessor including a drive control program and a memory for calculation. The drive control section 311 performs control of processing and calculation such as recording/reproduction of the disc management area and the spare area, pseudo overwrite recording/reproduction.

The system control sections 301, 321 and the drive control sections 311, 331 shown in FIGS. 3A and 3B can be implemented by an integrated circuit such as an LSI. Alternatively, they can be implemented by a general processor and a memory (e.g. ROM). In the memory (e.g. ROM), a program executable by the processor (e.g. the general processor) is stored. This program represents a reproduction processing and a recording processing according to the present invention which is described above or will be described below. The computer (e.g. the general computer) executes the reproduction processing and the recording processing in accordance with this program.

The memory circuit 312 is used to calculate or temporarily store data relating to the disc management information area and the spare area, and data transferred to the drive apparatus 310.

Next, with reference to FIG. 4B, the data structure on the information recording medium 100 after a first time data recording will be described.

Figure 12:
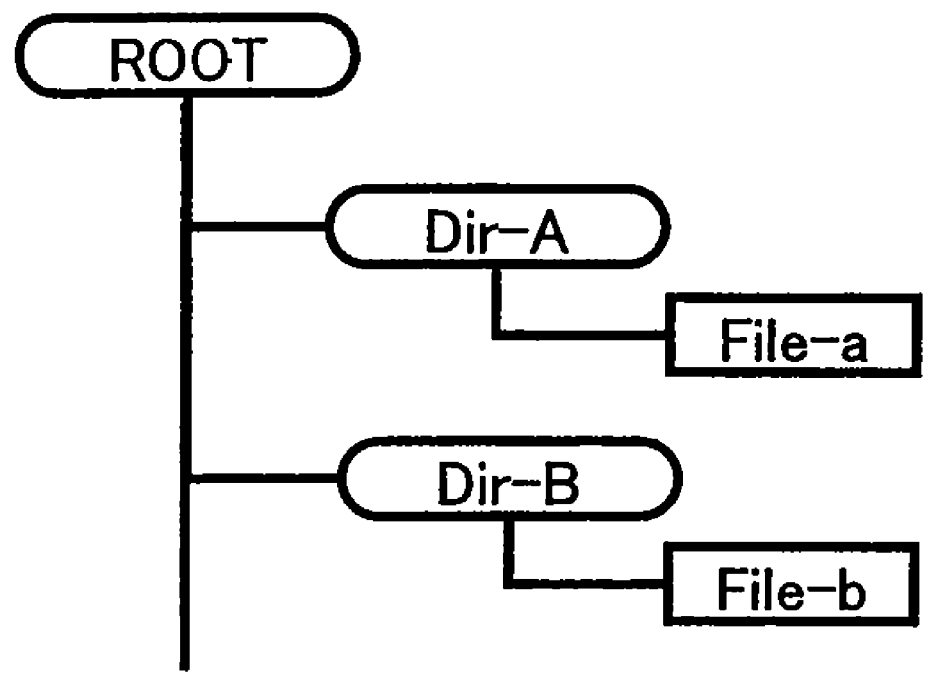
FIG. 12 is a diagram showing the tree structure of directories and files recorded on the information recording medium in an embodiment according to the present invention.
Figure 13:
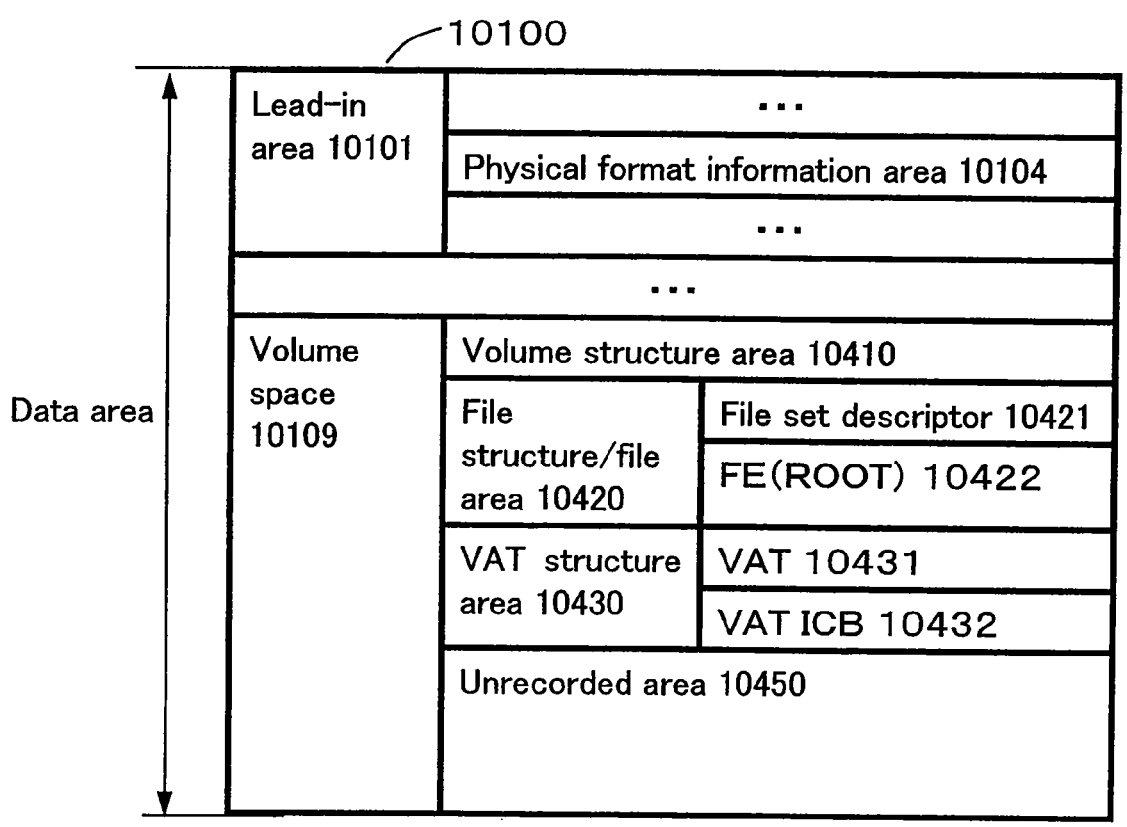
FIG. 13 is a diagram showing the data structure of the information on the information recording medium according to the conventional technique.
Figure 14:
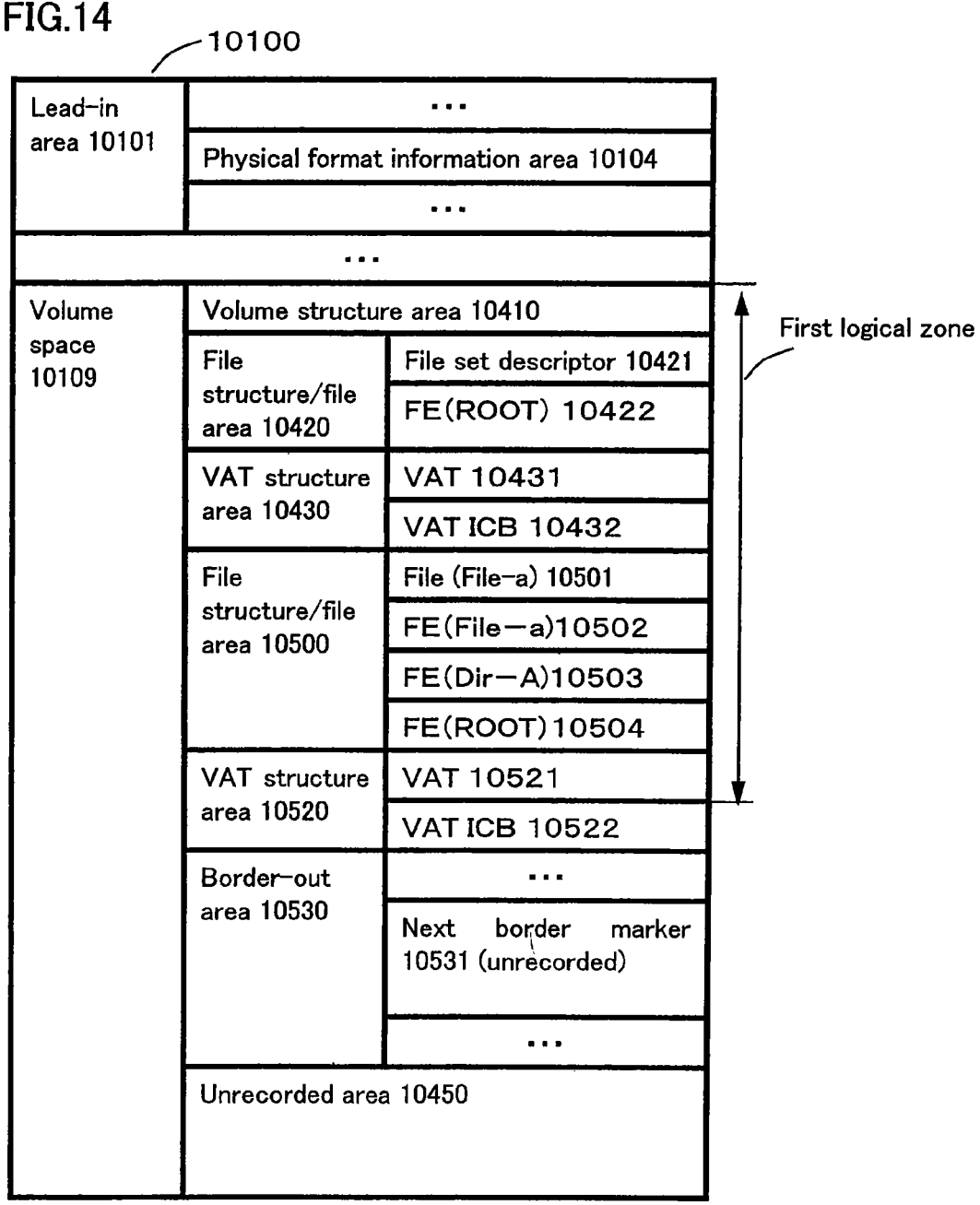
FIG. 14 is a diagram showing the data structure of the information on the information recording medium according to the conventional technique.
Figure 15:
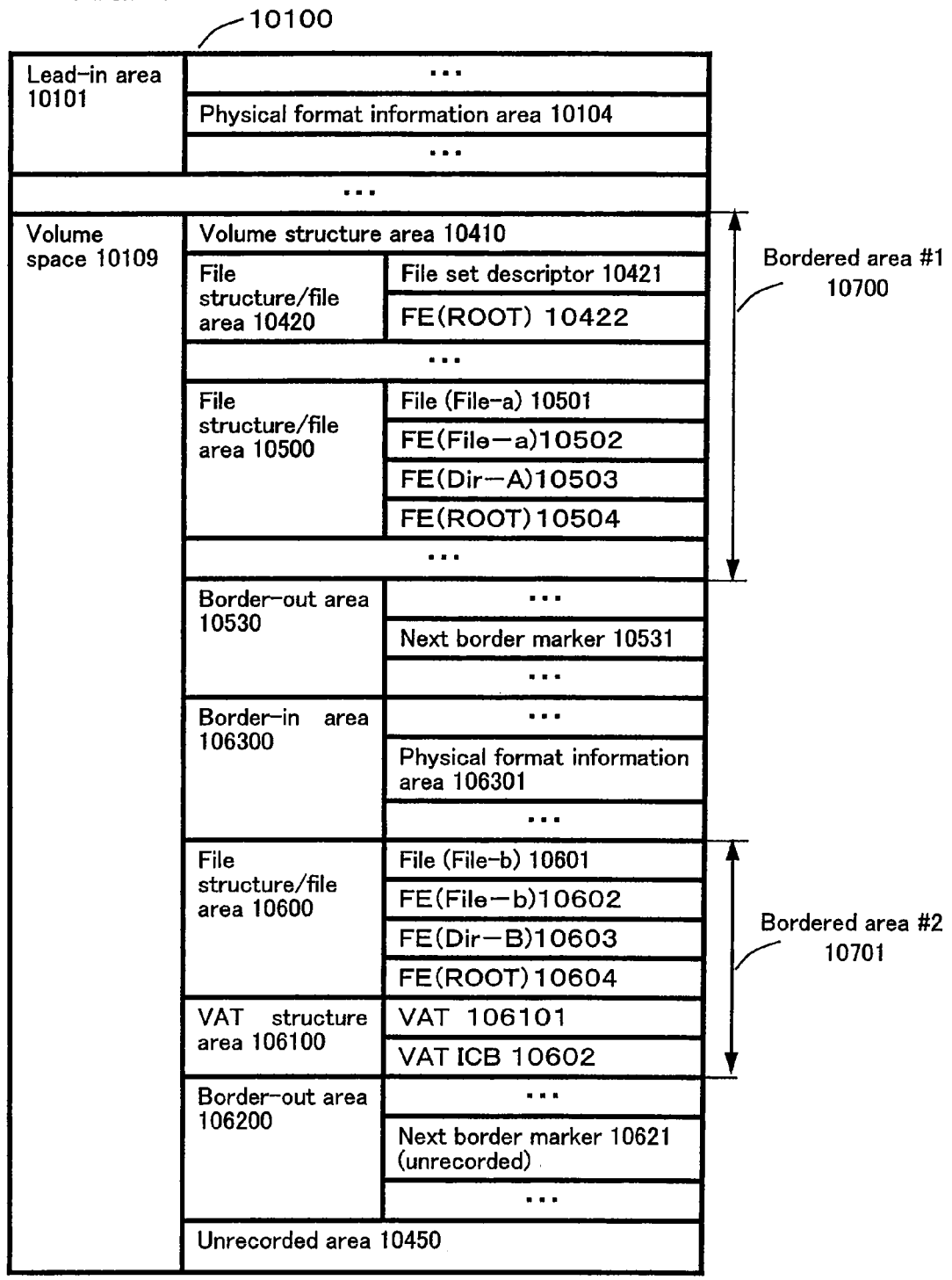
FIG. 15 is a diagram showing the data structure of the information on the information recording medium according to the conventional technique.
Figure 16:
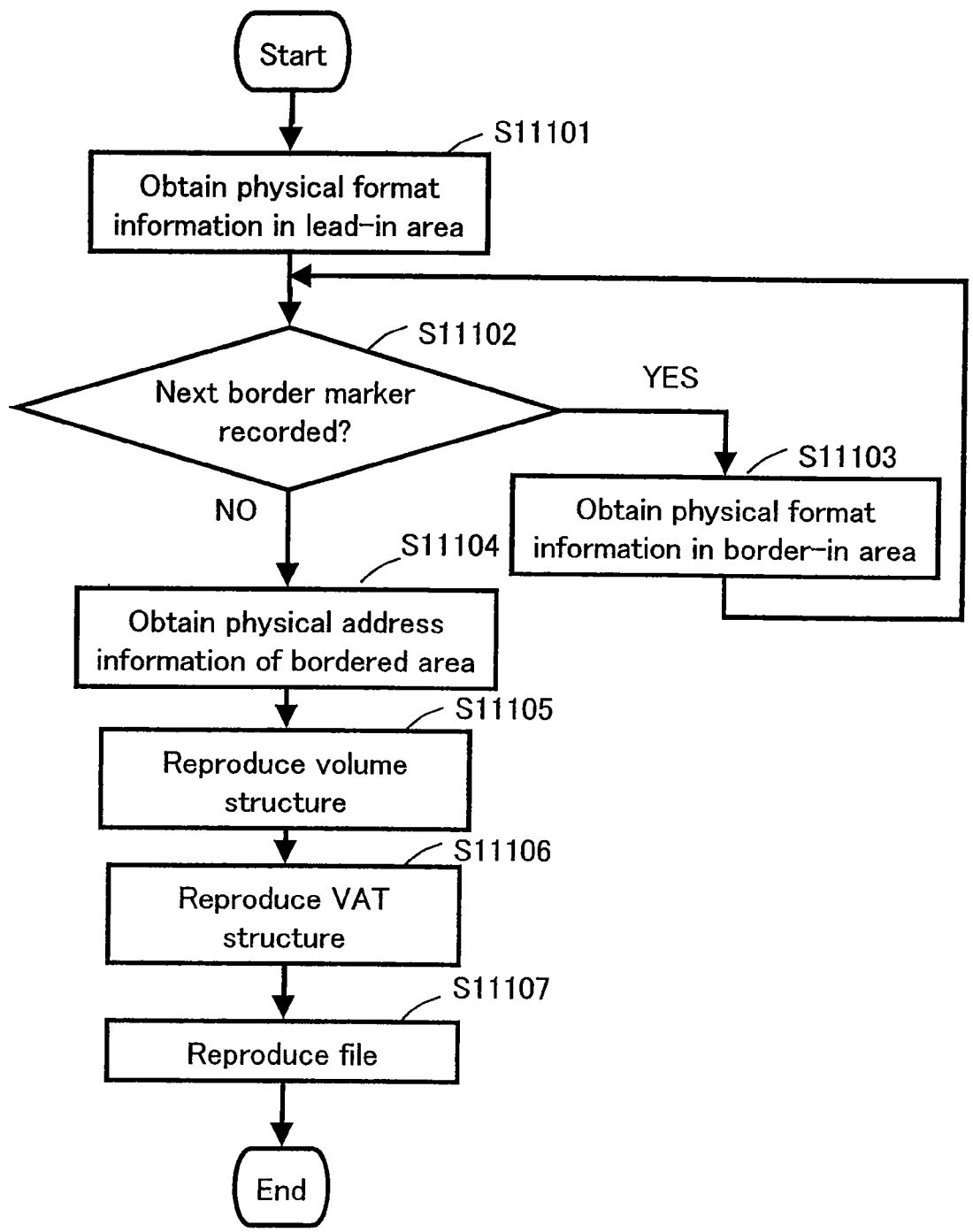
FIG. 16 is a flowchart showing a reproduction processing according to the conventional technique.

In an example shown in FIG. 4B, the file and directory tree structure shown in FIG. 12 is recorded on the information recording medium 100.

The volume structure area 410 and the physical partition 420 are recorded in the volume space 109.

The metadata partitions 430, 431 defined by version 2.5 of the UDF specification are included in the physical partition 420.

Further, the metadata file 440 and the metadata mirror file 450 which is a duplication of the metadata file 440 are recorded in the physical partition 420. In FIG. 4B, FE denotes a file entry indicating recording location of the file in the physical partition 420. The FE (Metadata file) 441 and the FE (Metadata mirror file) 451 are recorded in the physical partition 420. The data file (File-a) 460 and the data file (File-b) 470 are also recorded in the physical partition 420. The FE (Metadata file) 441 is address information indicating recording location of the metadata file 440.

Any information relating to the file structure such as FE and the directory file are located in the metadata partition (i.e. in the metadata file).

In order to record such data, image data corresponding to image data 500 shown in FIG. 4B is produced in advance, for example, on the magnetic disc apparatus 304. After recording the volume structure area 410 and the volume structure area 411, the image data 500 is recorded on the volume space 109. Thus, the data structure shown in FIG. 4B can be obtained.

The volume structure area 411 may be recorded after recording the image data 500.

With reference to portion (a) of FIG. 21, the data structure of image data 500 will be described below. The image data 500 can be obtained by integrating the file and directory tree structure and the latest file management information for managing the file and directory tree structure as one file.

The image data 500 includes, in the order from the top of thereof, FE (Metadata file) 441, a metadata file 440, a data file (File-a) 460, a data file (File-b) 470, FE (Metadata mirror file) 451 and a metadata mirror file 450.

It is preferable to locate the metadata file and the metadata mirror file apart from each other in order to avoid the destruction of the file management information due to some reason (e.g. any scratch on the information recording medium).

Each of the metadata file 440 and the metadata mirror file 450 includes, as the file management information, a file set descriptor 433, FE (ROOT) 442, FE (Dir-A) 443, FE (Dir-b) 444, FE (File-a) 445 and FE (File-b) 445. In order to simplify the explanation, it is assumed that the directory file is included in each FE.

The order of the data in the metadata file 440 may be an order shown in portion (b) of FIG. 21. In portion (b) of FIG. 21, the file management information is arranged in view of the directory tree. Specifically, the directory (Dir-A) is followed by the data file (File-a) under the directory, and the directory (Dir-B) is followed by the data file (File-b) under the directory.

The arrangement of data mentioned above makes it possible to efficiently access the data in a particular application. For example, in a particular application such as TV program recording, it is possible that the directory tree for recording data is first determined and then any file and any directory under the directory are located within the neighborhood.

In the data structure of the image data, each of the FE (metadata file) and the metadata file can be located at a leading position of an ECC block. In this case, padding data (e.g. data having all zeros) is recorded between the FE (metadata file) and the metadata file. Similarly, padding data (e.g. data having all zeros) may be recorded between the FE (metadata mirror file) and the metadata mirror file.

Figure 5:
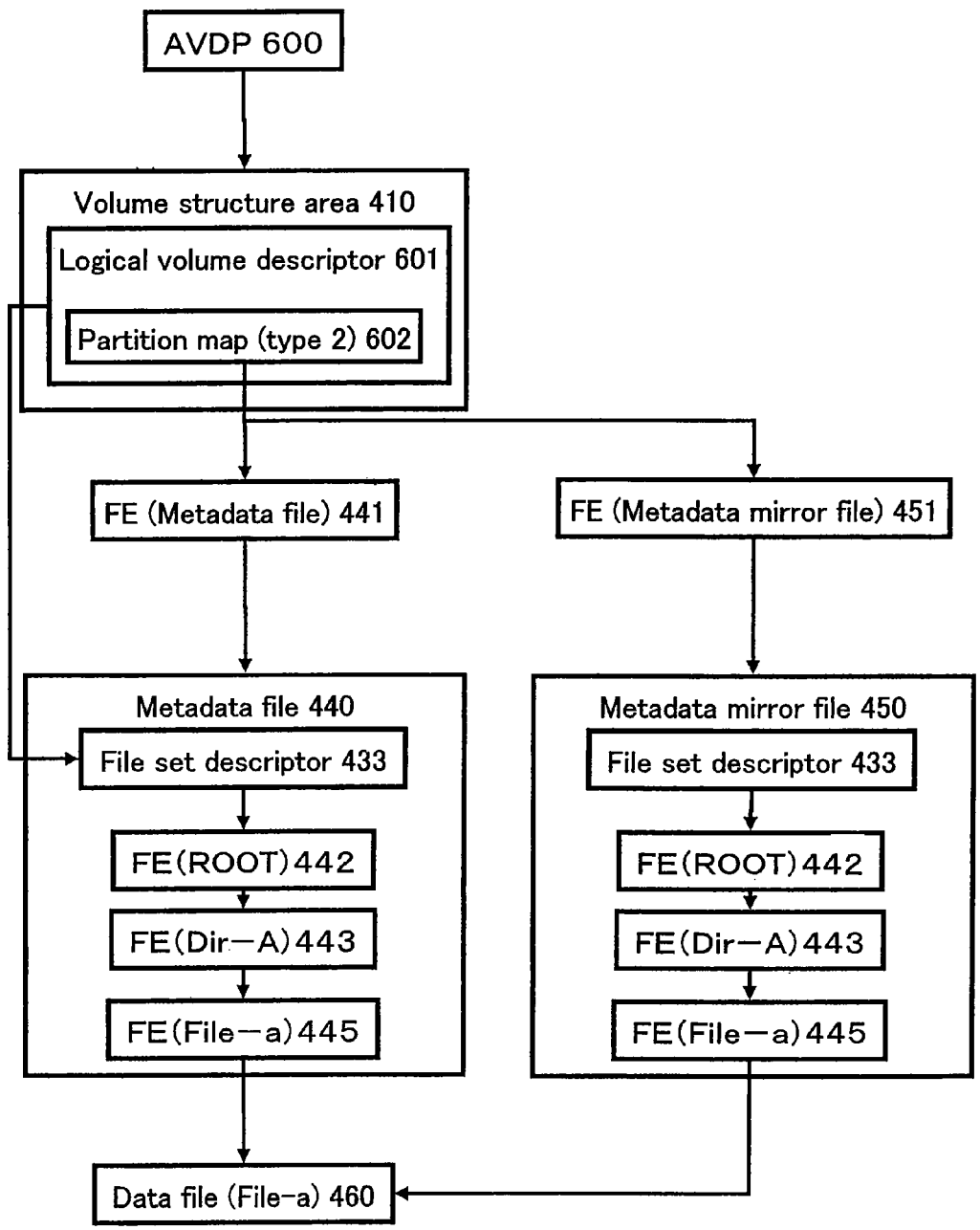
FIG. 5 is a diagram showing the data structure relating to the metadata file defined by version 2.5 of the UDF standard.

Next, with reference to FIG. 5, the reference relationship between data of the volume structure and the data of the file structure when the metadata file is used will be described below. The volume structure and the file structure defined by the UDF specification has an anchor volume descriptor pointer 600 (hereinafter, referred to as AVDP 600) as a start point. By reading the AVDP 600 recorded in a predetermined location of the information recording medium 100, it is possible to know the recording location of the volume structure area 410. The anchor volume descriptor pointer indicates location of address information.

The volume structure area 410 includes a logical volume descriptor 601. From the logical volume descriptor 601, it is possible to know the recording location of the file set descriptor 433 in the metadata partition 430.

The logical volume descriptor 601 further includes a partition map (type 2) 602. From the partition map (type 2) 602, it is possible to know the recording location of the FE (metadata file) 441 and the FE (metadata mirror file) 451.

The metadata file 440 is also a kind of file managed by the FE. From the FE (metadata file) 441, it is possible to know the recording location of the metadata file 440 on the physical partition 420 (i.e. the recording location of the metadata partition 430).

At this time, by using the recording location information of the file set descriptor 433 obtained above, the file structure can be retrieved in steps so as to access the data file (File-a) 460, for example.

In the metadata mirror file 450, the duplication of the metadata file 440 is recorded. Accordingly, by using the metadata mirror file 450, it is possible to read the data file (File-a) 460.

Portion (a) of FIG. 22 shows an example of the data arrangement of the volume structure information in the volume structure area 410. The volume structure area 410 includes a logical volume descriptor 601 and a first anchor volume descriptor pointer 600.

The logical volume descriptor 601 includes a partition map (type 1) 1200, a metadata file location 1201, a metadata mirror file location 1202 and a flag 1203.

The partition map (type 1) 1200 is information for managing the physical partition. The metadata file location 1201 is information indicating location of the FE (metadata file) 441 in the physical partition. The metadata mirror file location 1202 is information indicating location of the FE (metadata mirror file) 451 in the physical partition. The flag 1203 is information indicating whether or not there exists a metadata mirror file 450 on the information recording medium 100, wherein the metadata mirror file 450 is an optional function of the UDF specification.

Portion (b) of FIG. 22 shows an example of the data arrangement in the volume structure area 411.

The volume structure area 411 includes information similar to the information included in the volume structure area 410. For example, the volume structure area 411 includes a second anchor volume descriptor pointer and a third anchor volume descriptor pointer.

In each data structure mentioned above, if necessary, it is possible to locate dummy data (e.g. 00h) so that the data arrangement matches with the boundary of the ECC blocks. For example, it is possible to locate each anchor volume descriptor pointer, the primary volume descriptor, the logical volume descriptor 601 and the logical volume integrity descriptor from a leading position of the ECC block.

When the user area includes a plurality of tracks, the plurality of anchor volume descriptor pointers described above can be included in the respective tracks.

Figure 6B:
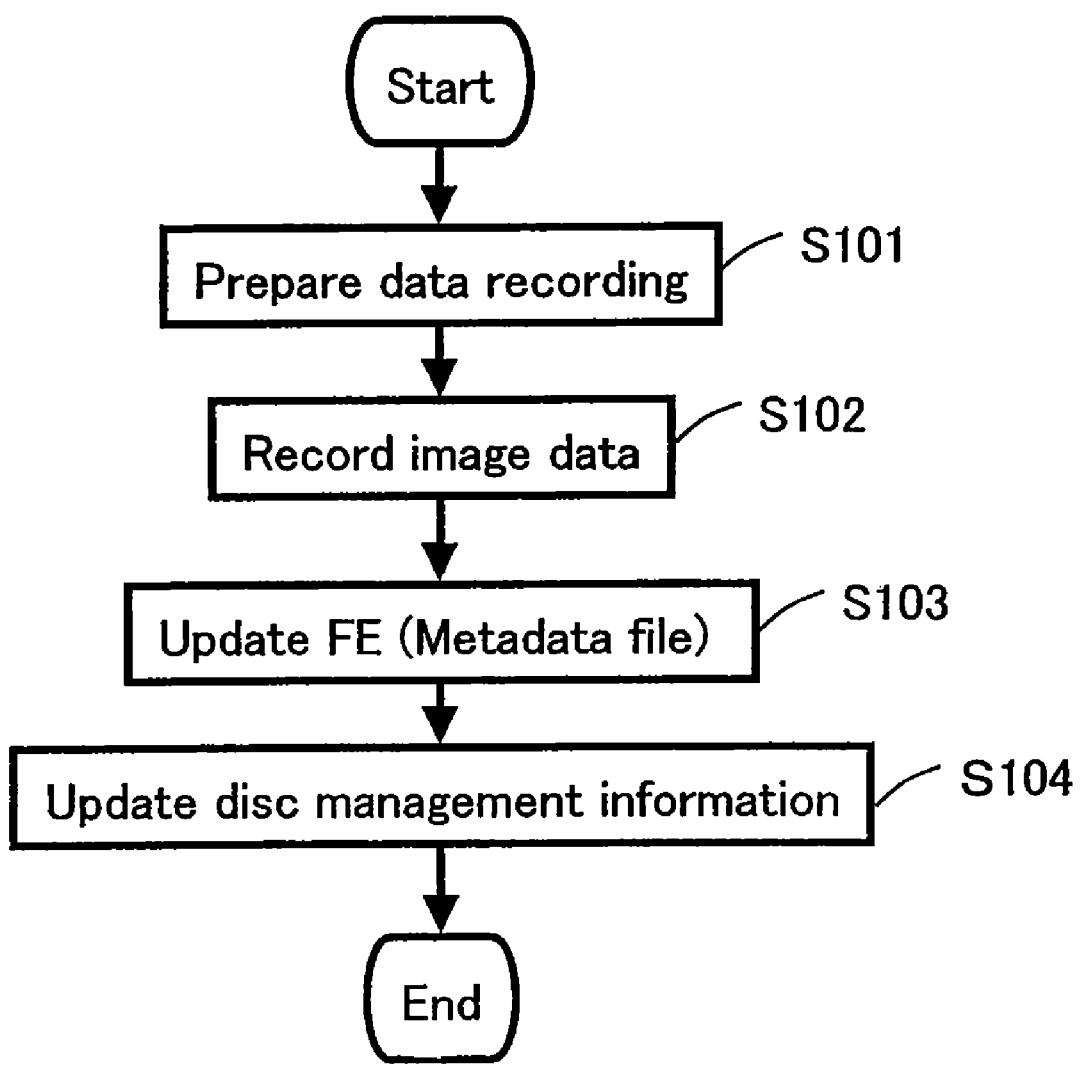
FIG. 6B is a flowchart showing a recording processing in an embodiment according to the present invention.

Next, with reference to the flowchart shown in FIG. 6B and an example of the data structure on the information recording medium 100 shown in FIG. 7B, the procedure for incremental recording of a new data file using image data when the information recording medium is in the status shown in FIG. 4B.

Herein, it is assumed that image data corresponding to the image data 650 is produced as new image data on the magnetic disc apparatus 304 and the new image data is recorded on the information recording medium 100.

Portion (a) of FIG. 23 shows a new data file to be incrementally recorded and its directory structure. Portion (a) of FIG. 23 shows the status where the directory (Dir-C) and, under its directory, the data file (File-c) and the data file (File-d) are recorded with respect to the status shown in FIG. 12.

Portion (b) of FIG. 23 shows a data structure of the image data 650 generated as the result of incremental recording. The image data 650 includes FE (metadata file) 621, a metadata file 620, a data file (file-c) 630, a data file (file-d) 631, FE (metadata mirror file) 612 and a metadata mirror file 613.

The file management information for the directory (Dir-C), the data file (File-c) and the data file (File-d) described above have been added to the metadata file 620. That is, the FE (Dir-C) 622, the FE (File-c) 623 and the FE (File-d) 624 have been added to the metadata file 440.

The metadata mirror file 613 includes duplication data of the metadata file 620.

Prior to recording the image data 650, the system control section 301 and the drive control section 311 read data required to record/reproduce data from the disc management area and the like of the information recording medium 100.

When the recording of the image data 650 is started, the system control section 301 reads the image data 650 from the magnetic disc apparatus 304 and transfer the read image data 650 to the memory circuit 302 (step S101).

Further, the system control section 301 holds a part of the FE (metadata file) 621 separately in the memory circuit 302.

Next, the system control section 301 instructs the drive apparatus 310 to record the image data 650 (step S102).

With reference to the session management information 200 (or space bitmap management information 220), the image data 650 is recorded on unrecorded contiguous areas of the information recording medium 100.

Next, the system control section 301 instructs the drive apparatus 310 to pseudo overwrite the information of the FE (metadata file) 621 held in the memory circuit 302 on the FE (metadata file) 441 (step S103).

The drive apparatus 310 records the data of the FE (metadata file) 621 transferred from the memory circuit 302 in the spare area 106 as the FE (metadata file) 640. Further, the drive apparatus 310 updates replacement information included in the disc management information recorded in the disc management information area 104 so as to map the FE (metadata file) 441 to the FE (metadata file) 640. The FE (metadata file) 640 is address information indicating the recording location of the metadata file 620.

New replacement management information 1010 is generated. The location information of the FE (metadata file) 441 is set to the original location information 1012. The location information of the FE (metadata file) 640 is set to the replacement location information 1013. The new replacement management information 1010 is added to the replacement management information list 1000.

Further, the pseudo overwrite is performed with respect to the FE (metadata mirror file) 451. As a result, the FE (metadata mirror file) 651 is mapped to the FE (metadata mirror file) 451.

It is desirable to record the FE (metadata mirror file) 640 and the FE (metadata mirror file) 651 in the different spare areas, respectively. The FE (metadata mirror file) 651 is duplication data of the FE (metadata mirror file) 640 for the purpose of improving the resistance against the destruction of data. By locating those two FEs physically apart from each other, it is possible to enhance the resistance against the destruction of data. In order to realize such a pseudo overwrite recording, it is desirable that the capacity of the spare area 107 is equal to or greater than that of the spare area 106. The capacity of each spare area is managed by the spare area information 1105.

According to the processing mentioned above, the reference from the partition map (type 2) 602 is changed from the FE (metadata file) 441 to the FE (metadata file) 621, as described with reference to FIG. 5.

The disc management information is updated to reflect the result of the processing mentioned above (step S104).

For example, the last recorded address information 1107 is updated. The session management information 200 (or space bitmap management information 200) is updated to the latest status depending on the recording of the image data 650. The replacement management information list 1000 may be updated at this time.

Figure 8B:
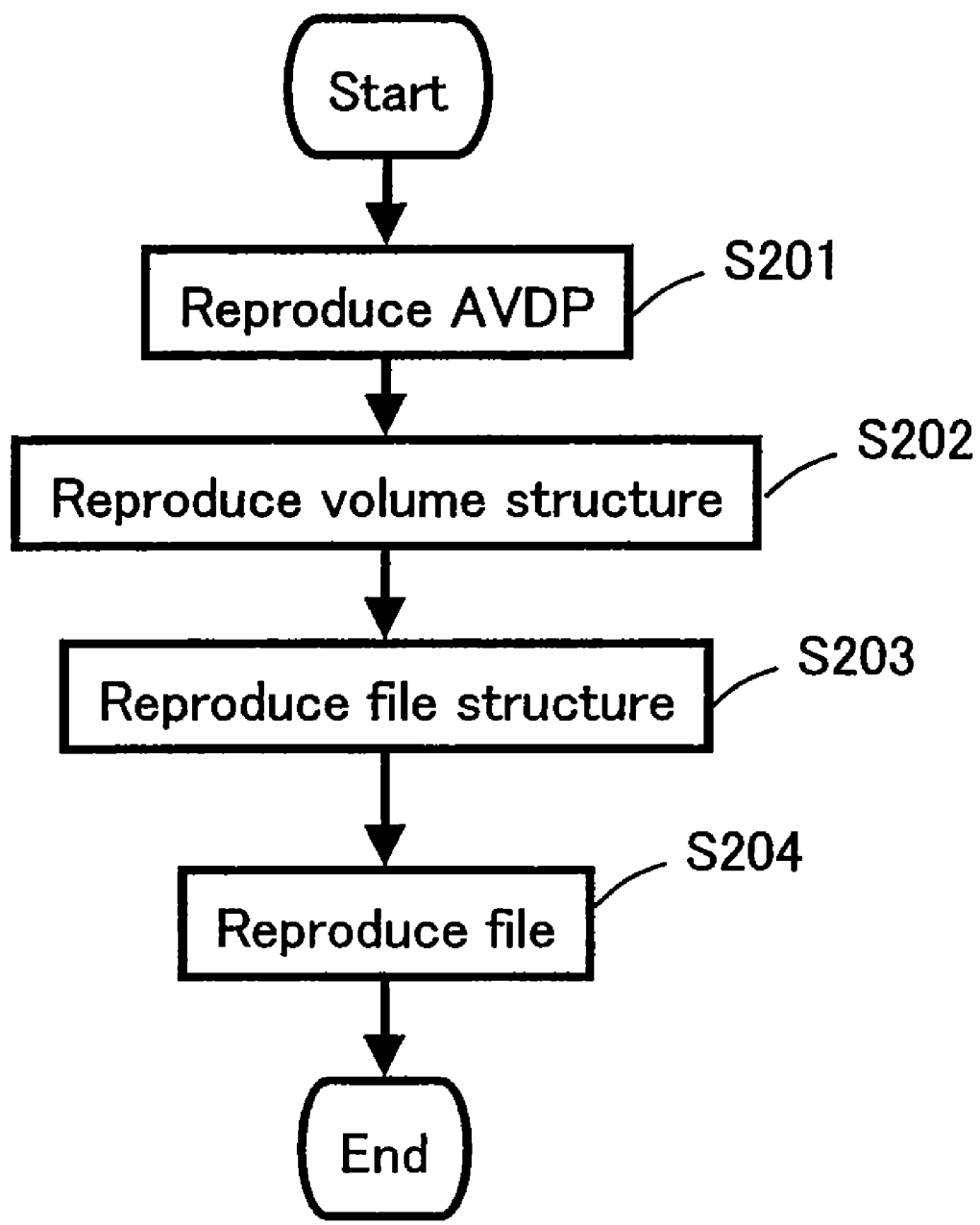
FIG. 8B is a flowchart showing a reproduction processing in an embodiment according to the present invention.

After completing the processing for recording such a file, the processing for reproducing the file is performed. With reference to the flowchart shown in FIG. 8B, the processing for reproducing the file will be described below. Herein, an operation of reproducing the data file (File-a) 460 will be described as an exemplary reproduction operation.

The system control section 301 outputs an instruction to the drive apparatus 310 so as to reproduce the AVDP 600 recorded in a predetermined location (e.g. logical address=256) of the information recording medium 100 (step S201).

Next, the system control section 301 obtains the location information of the volume structure 410 from the AVDP 600, and outputs an instruction to the drive apparatus 310 so as to reproduce the volume structure 410 (step S202).

The system control section 301 further obtains the location information (logical address) of the FE (metadata file) 441 from the volume structure 410.

Next, the system control section 301 reproduces the file structure (step. S203).

In order to reproduce the file structure, the system control section 301 outputs a reproduction instruction to the drive apparatus 310 based on the location information (logical address) of the obtained FE (metadata file) 441.

Upon the receipt of the instruction, the drive apparatus 310 refers to the replacement management information list 1000, retrieves the replacement management information 1010 holding the original location information 1012 corresponding to the location information (logical address) of the FE (metadata file) 441. When the drive apparatus 310 retrieves the replacement management information 1010, it obtains the replacement location information 1013 included in the replacement management information 1010. As a result, the location information of the FE (metadata file) 640 is obtained. The drive apparatus 310 reproduces the FE (metadata file) 640 and returns it back to the system control section 301.

As described above, the FE (metadata file) 640 includes the same information as the FE (metadata file) 621.

Accordingly, the system control section 301 obtains the location information of the metadata file 620 from the information of the obtained FE (metadata file) 640. Thus, it is possible to access the metadata file 620 included in the latest file management information.

Then, the data file (File-a) 460 is reproduced in accordance with the normal reproduction procedure of the UDF specification (step S204).

In the description above, the description of reproduction of the metadata mirror file is omitted. However, it is understood that, if necessary, the metadata mirror file can be recorded/ reproduced in a similar manner as the metadata file.

According the structure mentioned above, it is possible to pseudo overwrite the information in a pre-determined area using a replacement mechanism including a replacement information and a replacement area. As a result, on the logical space, the file structure for pseudo overwrite is the same as the file structure for reproduction only. Thus, it is possible to reproduce data recorded in a write-once recording medium, even in the system which is not capable of performing the reproduction operation for the read-only medium or the rewritable recording medium.

Moreover, efficient incremental recording of data can be performed using the image data, and it becomes possible to rapidly access the latest file structure without performing the search for the lead-in (border-in) area, lead-out (border-out) area and the like.

Furthermore, only the minimum data is updated by pseudo-overwriting. Thus, the burden of the replacement process can be alleviated, and the consumption of the spare area can be suppressed.

Embodiment 2

In this embodiment, an example of recording image data 650 from the state as shown in FIG. 4B by using a recording process different from that in the above-described embodiment will be described.

Figure 9:
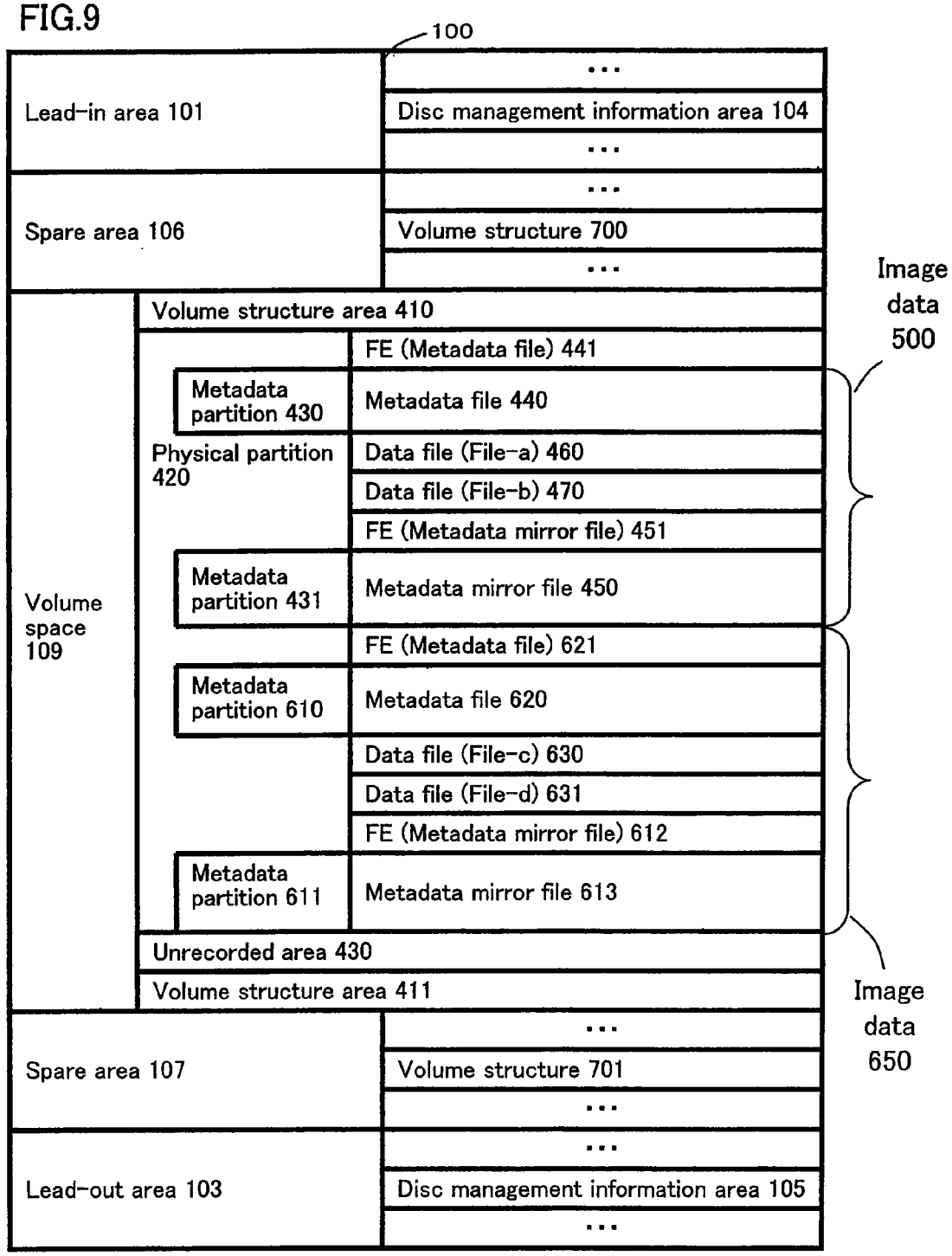
FIG. 9 is a diagram showing the data structure of the information on the information recording medium in an embodiment according to the present invention.

FIG. 9 shows a data structure after a recording process according to the present embodiment is performed. A difference between FIGS. 9 and 7B is that, in the example shown in FIG. 7B, FE (metadata file) is a target of pseudo-overwrite recording when recording the image data 650, while in the present embodiment, a volume structure is a target of pseudo-overwrite recording. In a recording procedure illustrated in FIG. 6B, FE (metadata file) 441 is updated by pseudo-overwrite recording in step S103. In the present embodiment, a logical volume descriptor 601 including a partition map (type 2) 602 in FIG. 5 is updated by pseudo-overwrite recording.

More specifically, the logical volume descriptor 601 included in a volume structure area 411 in FIG. 9 is pseudo-overwrite recorded and mapped to a volume structure 700.

Figure 24:
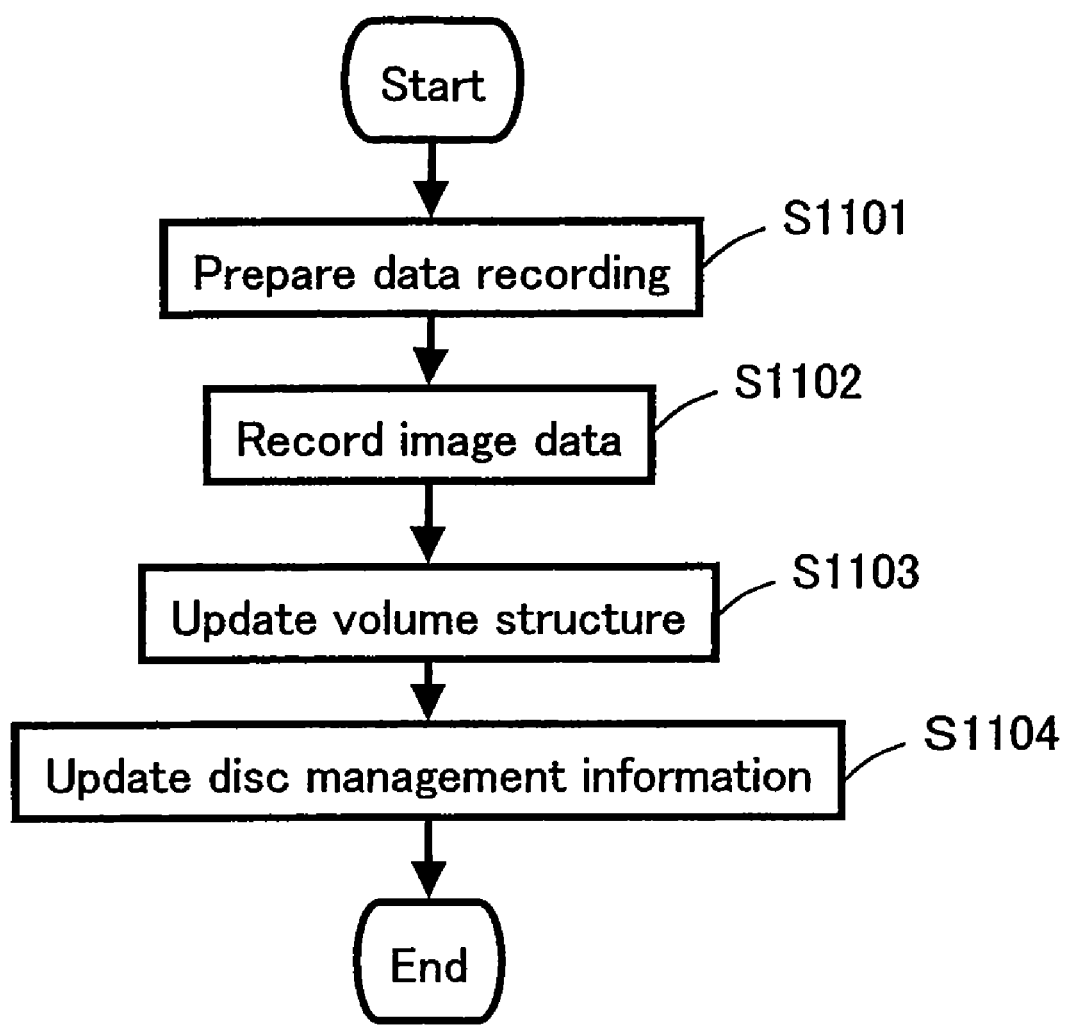
FIG. 24 is a flowchart showing a recording processing in an embodiment according to the present invention.

The recording procedure used in such an example will be described with reference to FIG. 24.

Before recording the image data 650, a system control section 301 and a drive control section 311 read out data necessary for recording/reproducing data from a disc management area, and the like, of the information recording medium 100.

When recording of the image data 650 is started, the system control section 301 reads out the image data 650 from a magnetic disc apparatus 304, and transfers this to a memory circuit 302 (step S1101).

Next, the system control section 301 instructs a drive apparatus 310 to record the image data 650 (step 1102).

At this time, with reference to session management information 200 (or space bitmap management information 220), the image data 650 is recorded in unrecorded contiguous areas of the information recording medium 100.

Next, the system control section 301 updates the volume structure (step S1103). The system control section 301 reproduces data from a volume structure area 410, and holds the data in the memory circuit 302. Further, the system control section 301 updates information of the partition map (type 2) 602 in the memory circuit 302, and updates such that metadata file location 1201 indicates FE (metadata file) 621, and metadata mirror file location 1202 indicates FE (metadata mirror file) 612.

The system control section 301 instructs the drive apparatus 310 to perform pseudo-overwrite recording of the updated information to the volume structure area 410.

The drive apparatus 310 receives the instruction, and records the updated data transferred from the memory circuit 302 in a spare area 106 as a volume structure 700.

Further, the drive apparatus 310 updates replacement information included in disc management information recorded in a disc management information area 104, and maps the volume structure area 410 to the volume structure 700.

More specifically, new replacement management information 1010 is generated. Location information of the volume structure area 410 is set to original location information 1012, and location information of the volume structure 700 is set to replacement location information 1013. This new replacement management information 1010 is added to a replacement management information list 1000.

Further, the volume structure area 411 is similarly updated and pseudo-overwrite recorded. At this time, with respect to the volume structure area 411, a volume structure 701 is mapped.

It is desirable that the volume structure 700 and the volume structure 701 are recorded in different spare areas. The volume structure 701 is duplication data which provides for data corruption of the volume structure 700. The tolerance to data corruption is stronger when they are located in physically distinct areas.

In order to realize such pseudo-overwrite recording, the capacity of a spare area 107 is preferably equal to or larger than that of the spare area 106. The capacity of the respective spare regions is managed by spare area management information 1105.

With the above-described process, as described with reference to FIG. 5, the partition map (type 2) 602 which has been making reference to the FE (metadata file) 441 becomes to make reference to FE (metadata file) 621.

Then, for reflecting the results of the above-described procedure, the disc management information is updated (step S1104).

For example, last recorded address information 1107 is updated. Furthermore, in accordance with recording of the image data 650, the session management information 200 (or space bitmap management information 200) is updated to the latest state.

A reproduction process for a file after such a recording process for a file is performed will be described by using a flow chart shown in FIG. 10.

First, the system control section 301 instructs the drive apparatus 310, and reproduces an AVDP 600 recorded in a predetermined location of the information recording medium 100 (for example, logical address=256) (step S301).

Next, the system control section 301 obtains location information (logical address of the volume structure 410 from the AVDP 600), and instructs the drive apparatus 310 for reproduction (step S302). The drive apparatus 310 receives the instruction, and, with reference to the replacement management information list 1000, searches for replacement management information 1010 held as the original location information 1012 which corresponds to the location information (logical address) of the logical volume descriptor 601. When the corresponding replacement management information 1010 is found, the replacement location information 1013 included therein is obtained. As a result, the location information of the volume structure 700 is obtained, and thus, the volume structure 700 is reproduced and sent back to the system control section 301.

When the system control section 301 receives the volume structure 700, the system control section 301 obtains location information of the FE (metadata file) 621 from the partition map (type 2) included in the volume structure 700.

Next, the system control section 301 reproduces a file structure (step S303).

For reproducing the file structure, the system control section 301 instructs the drive apparatus 310 to reproduce the FE (metadata file) 621 based on the obtained location information of FE (metadata file) 621.

Then, the control section 301 obtains the location information of metadata file 620 from the reproduced FE (metadata file) 621. Thus, it becomes possible to access the metadata file 620 which includes the latest file management information.

Thereafter, files are reproduced with a normal reproduction procedure of the UDF specification (step S304).

In the above description, handling of the metadata mirror file is omitted. However, it can be recorded and/or reproduced similarly as the metadata file as necessary.

Figure 25:
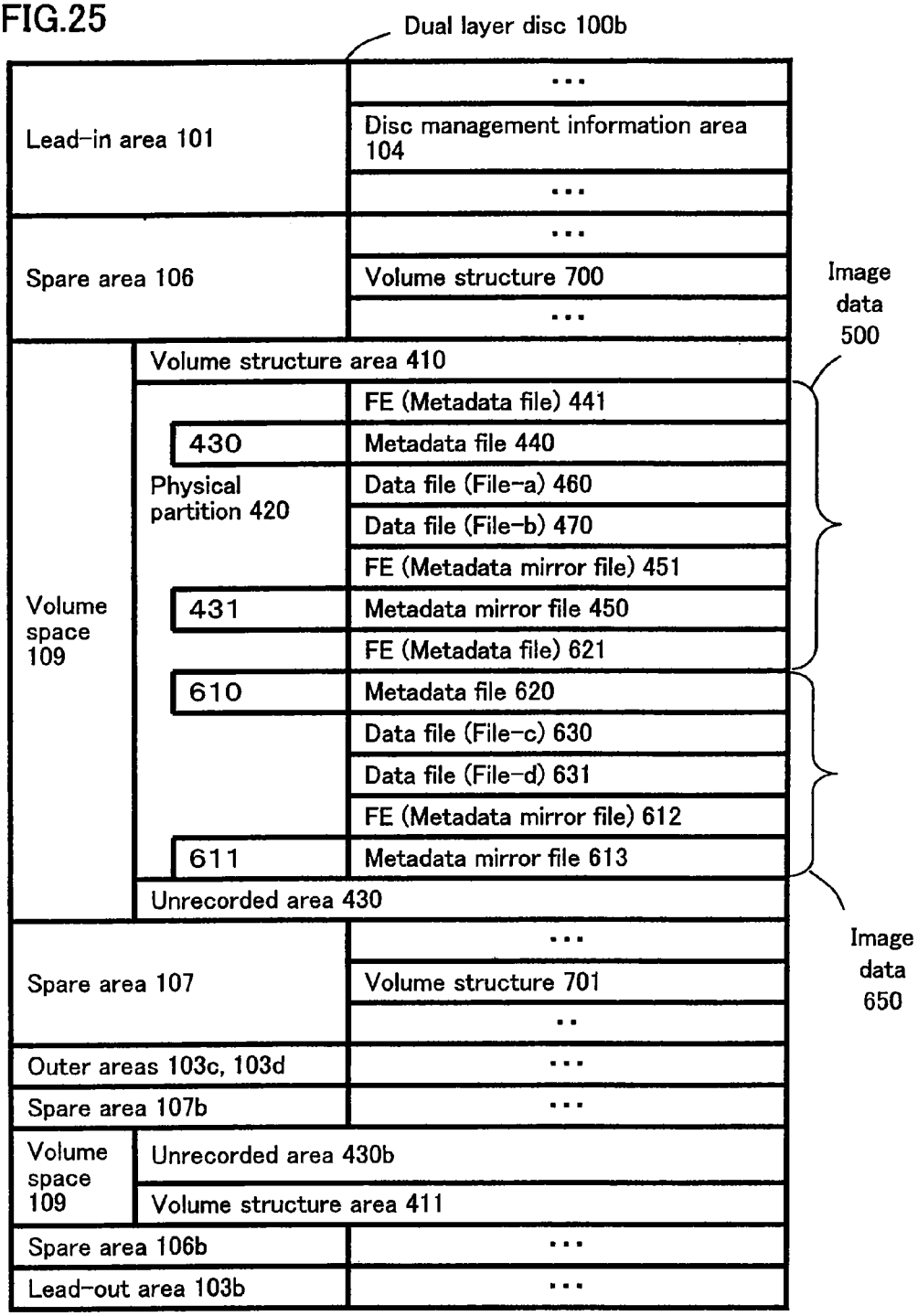
FIG. 25 is a diagram showing the data structure of the information on the information recording medium in an embodiment according to the present invention.

FIG. 25 shows a data structure obtained by recording the image data 650 to the information recording medium 100b having a recording surface of a dual layer shown in FIG. 20 by the recording procedure according to the present embodiment.

In this example, the volume structure area 410 is recorded on a user area 108 on a first layer (L0). On the other hand, the volume structure area 411 is recorded on a user area 108a on a second layer (L1). As a result of pseudo-overwrite recording to the volume structure areas 410 and 411, the volume structure 700 and the volume structure 701 are respectively recorded in the spare area 106 and 107.

Alternatively, the volume structure 700 and the volume structure 701 may be respectively recorded in spare areas 106a and 107a.

The reproduction procedure for the information recording medium 100b is performed similarly as that for the information recording medium 100.

Furthermore, other embodiments according to the present invention are also applicable to the information recording medium 100b having the dual layer recording surface.

With such a structure, information of predetermined area can be rewritten by a replacement mechanism formed of replacement information and spare areas. Thus, it becomes the same as the read-only file structure in the logical space, and it becomes possible to reproduce data of the write-once recording medium even in systems which can only reproduce read-only mediums or rewritable recording mediums.

Further, the partition map (type 2) included in the logical volume descriptor includes the recorded address information of FE of the metadata mirror file, and/or management information regarding other metadata files (for example, flag 1203 indicating the presence/absence of the metadata mirror file). Therefore, according to the present embodiment, by updating the logical volume descriptor, a plurality of information related to the metadata file and the metadata mirror file can be updated to the latest state at the same time. This allows to realize a more simple and superior structure.

Moreover, efficient incremental recording of data can be performed using the image data, and it becomes possible to rapidly access the latest file structure without performing the search for the lead-in (border-in) area, lead-out (border-out) area and the like.

Furthermore, only the minimum data is updated by pseudo-overwriting. Thus, the burden of the replacement process can be alleviated, and the consumption of the spare area can be suppressed.

Embodiment 3

In this embodiment, the example of recording the image data from the state shown in FIG. 4B with a recording process different from those in the above-described embodiments will be described.

Figure 11:
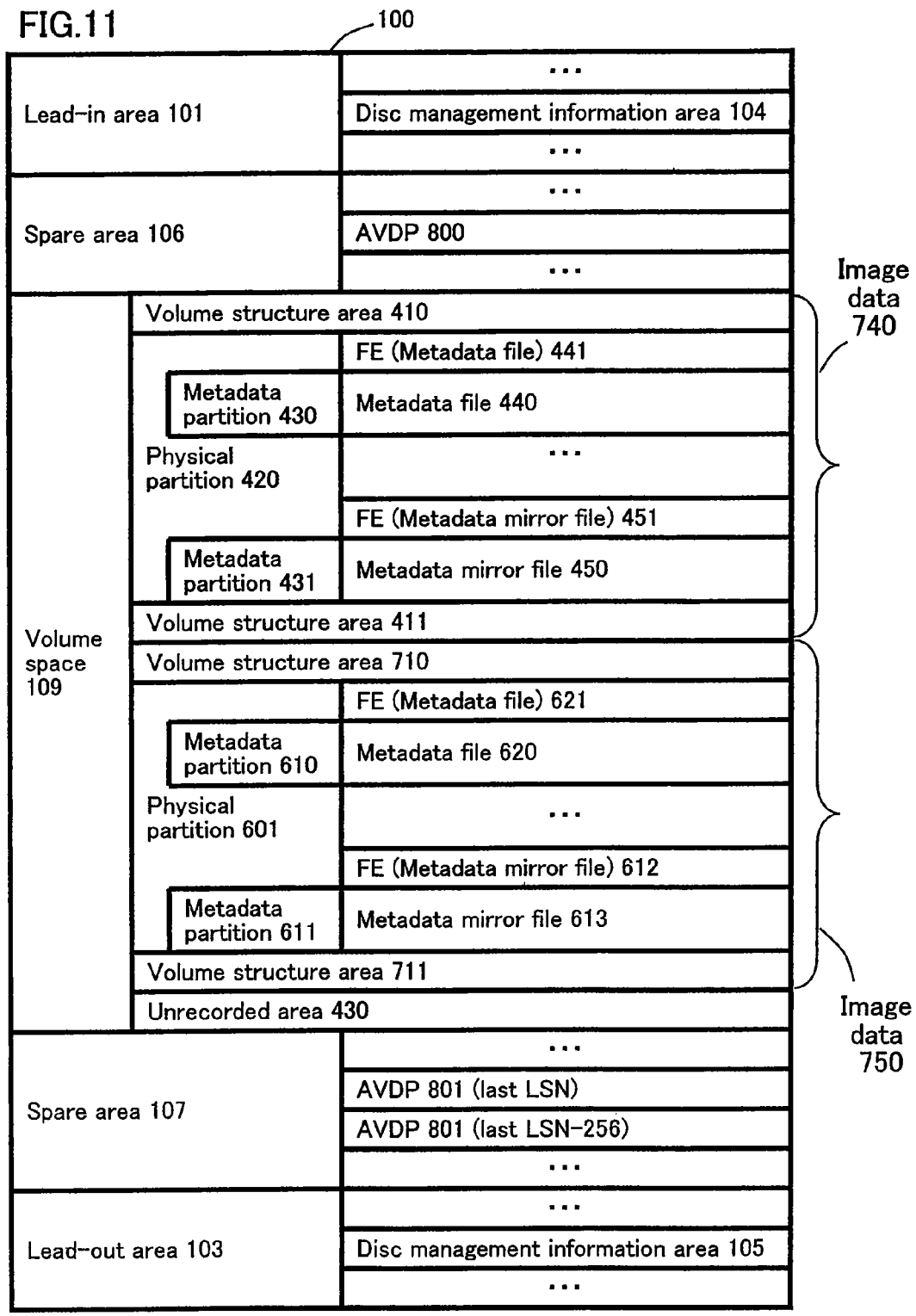
FIG. 11 is a diagram showing the data structure of the information on the information recording medium in an embodiment according to the present invention.

FIG. 11 shows a data structure after the recording process according to the present embodiment is performed. A difference between FIGS. 11 and 7B is that, in the example shown in FIG. 7B, FE (metadata file) 441 is a target of pseudo-overwrite recording when new image data 750 is incrementally recorded, while in the present embodiment, an AVDP 600 is a target of pseudo-overwrite recording. Further, the image data 740 and 750 are different from the image data 650 on the point that corresponding volume structure area 410 and the like are included.

In the recording procedure described with reference to FIG. 6B, FE (metadata file) 441 is updated by pseudo-overwrite recording in step S103. In the present embodiment, the AVDP 600 is updated by pseudo-overwrite recording. More specifically, the AVDP 600 included in the volume structure area 711 in FIG. 11 is pseudo-overwrite recorded, and mapped to an AVDP 800.

Similarly, an AVDP included in the volume structure area 411 is mapped to an AVDP 801 (last LSN). Furthermore, there may be two AVDPs in the volume structure area 411. In such a case, an AVDP 801 (last LSN-256) is mapped.

In order to realize such pseudo-overwrite recording, it is desirable that the capacity of a spare area 107 is equal to or larger than that of the spare area 106.

Particularly, when there are two AVDPs in the volume structure area 411, the capacity of the spare area 107 is desirably twice as large as that of the spare area 106 or larger. The capacity of the respective spare areas is managed by spare area management information 1105.

Further, the AVDP (last LSN) may be mapped to the location indicated by the last recorded address information 1107. In this way, the AVDP can be readily detected.

A reproduction process for a file after such a recording process for a file is performed will be described below.

Similar to the above-described embodiment, the system control section 301 instructs the drive apparatus 310 to reproduce with respect to the logical address of the AVDP 600.

The drive apparatus 310 makes reference to a replacement management information list 1000, and replies to the reproduction instruction of the AVDP 600 with reproduction of the AVDP 800.

Since the AVDP 800 includes the information of the recorded address of the latest volume structure area 710, files can be reproduced using a procedure similar to that in the above-described embodiment in the subsequent part of the process.

With such a structure, information of predetermined area can be rewritten by a replacement mechanism formed of replacement information and spare areas. Thus, it becomes the same as the read-only file structure in the logical space, and it becomes possible to reproduce data of the write-once recording medium even in systems which can only reproduce read-only mediums or rewritable recording mediums.

Further, according to the present embodiment, the AVDPs have fixed logical address in accordance with rules of the UDF specification. Thus, the structure of the system control section 301 can be more simplified.

Moreover, efficient incremental recording of data can be performed using the image data, and it becomes possible to rapidly access the latest file structure.

Furthermore, only the minimum data is updated by pseudo-overwriting. Thus, the burden of the replacement process can be alleviated, and the consumption of the spare area can be suppressed.

Embodiment 4

In this embodiment, the example in which the image data is recorded by a recording procedure which is different from those in the above-described embodiments will be described.

Figure 26:
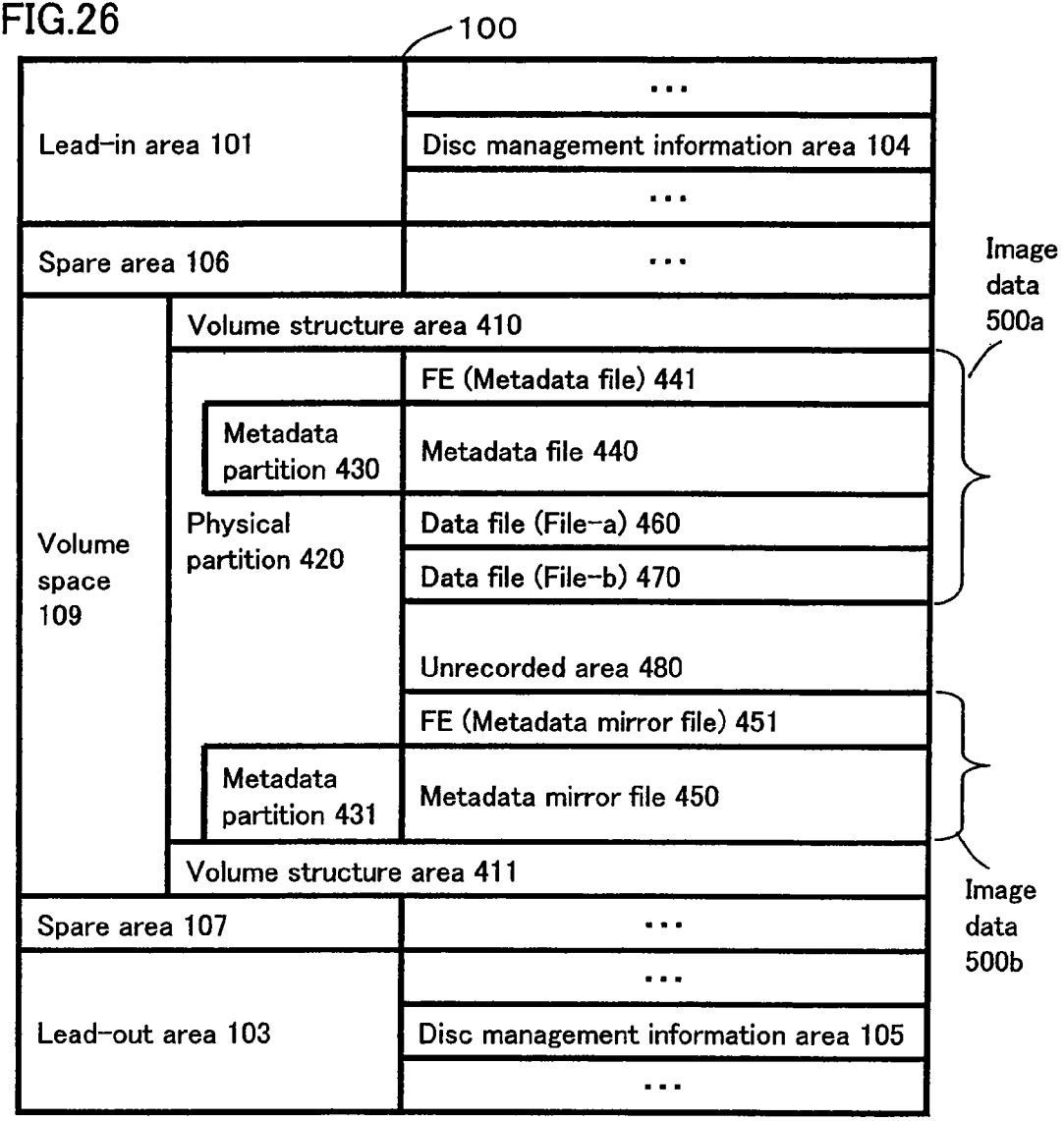
FIG. 26 is a diagram showing the data structure of the information on the information recording medium in an embodiment according to the present invention.

FIG. 26 shows an example of a data structure on an information recording medium 100 after a first data recording in the present embodiment is performed.

With reference to FIG. 26, an example in which a file and directory tree structure shown in FIG. 12 is being recorded in the information recording medium 100 will be described.

In the example shown in FIG. 26, image data 500a, which is a portion of the image data 500 from FE (metadata file) 441 to a data file (File-b) 470, is recorded from a head of a volume space 109. Image data 500b, which is FE (metadata mirror file) 451 and metadata mirror file 450, is recorded at the end of the volume space 109.

Figure 27:
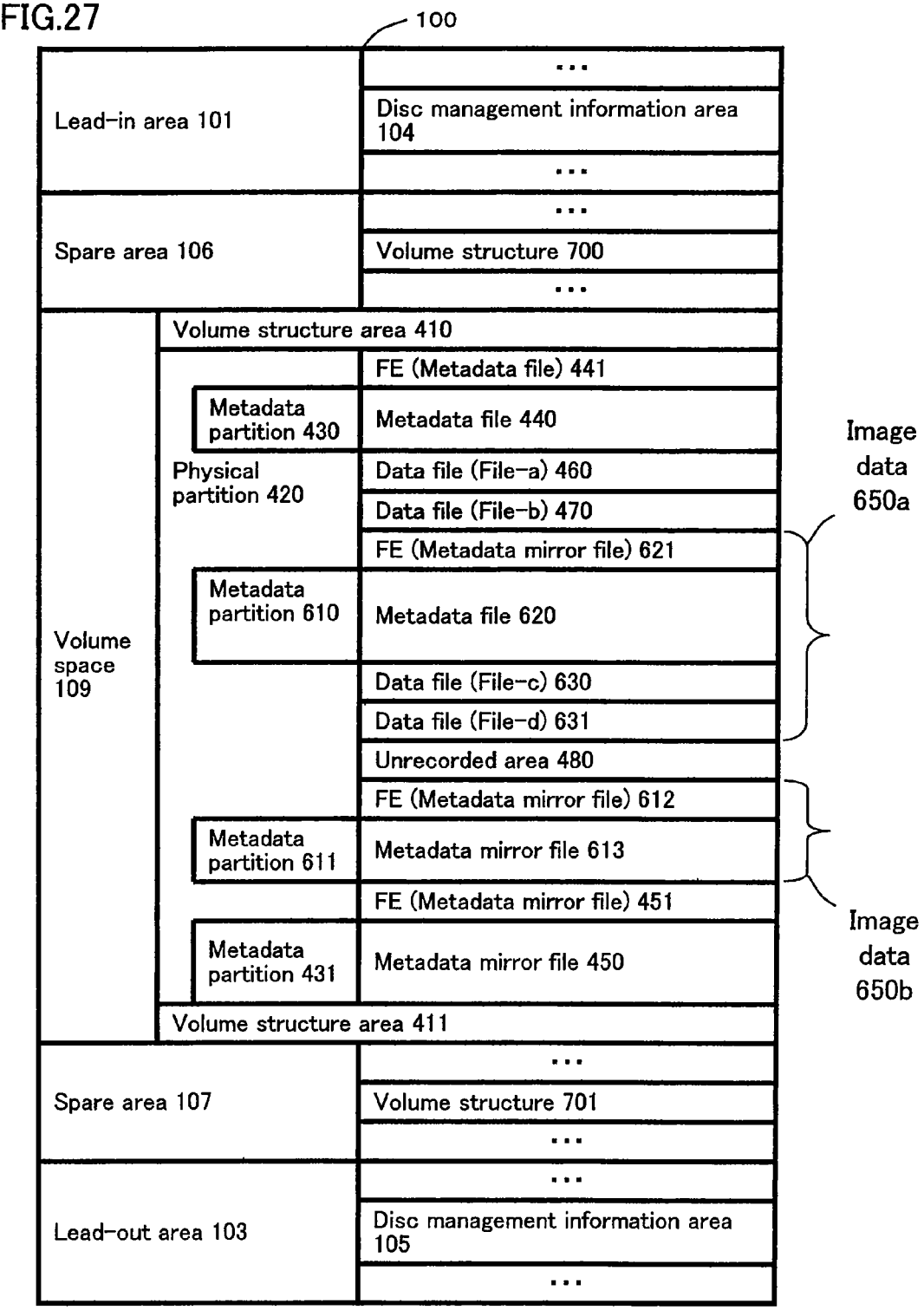
FIG. 27 is a diagram showing the data structure of the information on the information recording medium in an embodiment according to the present invention.

FIG. 27 shows a data structure after image data 650 is further recorded from such a state. In this example, image data 650a, which is a portion of the image file 650 from FE (metadata file) 621 to data file (File-d) 631, is recorded following the image data 500a. Image data 650b, which is FE (metadata mirror file) 612 and metadata mirror file 613, is recorded immediately before the image data 500b.

In this embodiment, the image data 650 can be recorded similarly as in the above-described embodiments. For example, as shown in FIG. 27, the volume structure area 410 is pseudo-overwrite recorded to obtain the volume structure 700. In this way, effects similar to those achieved in other embodiments can be obtained, for example, it becomes possible to read the latest file structure, and the like.

Moreover, as an effect specific to the present embodiment, the relationship between the physical locations of the metadata file and the corresponding metadata mirror file can be made more distant. This improves the possibility of avoiding a situation in which the metadata file and the metadata mirror file are destroyed at the same time due to a scratch on the information recording medium 100, and the like. Thus, reliability of the information recording medium 100 increases.

Embodiment 5

A data recording method different from those in the above-described embodiments will be further described.

Figure 28:
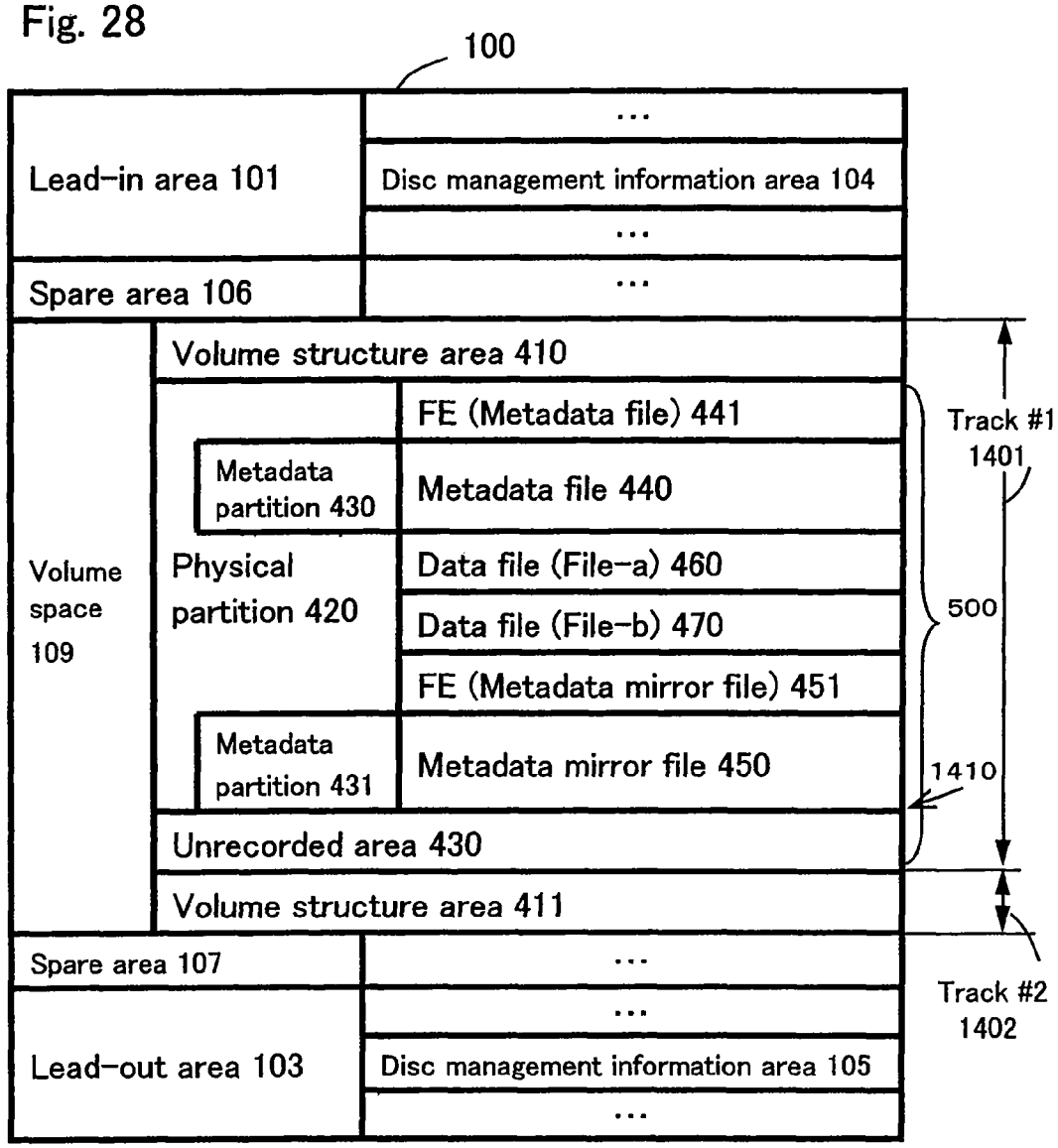
FIG. 28 is a diagram showing the data structure of the information on the information recording medium in an embodiment according to the present invention.

FIG. 28 shows an example of a data structure on an information recording medium 100 after first data recording in the present embodiment is performed.

With reference to FIG. 28, an example where a file and directory tree structure shown in FIG. 12 is recorded in the information recording medium 100 will be described.

Similar to the above-described embodiments, image data 500 is recorded in a volume space 109.

Further, as shown in FIG. 28, a plurality of tracks are allocated in the volume space 109. A track #1 1401 is allocated as a track for recording a volume structure 410 and the image data 500.

Track #2 1402 is allocated as a track for recording the volume structure 411.

Allocation of the tracks is performed when, for example, the information recording medium 100 is formatted, and the like, as appropriate.

The track #1 1401 is an open track including an unrecorded area 430 at the location indicated by the last recorded address 1410 or below.

Figure 29:
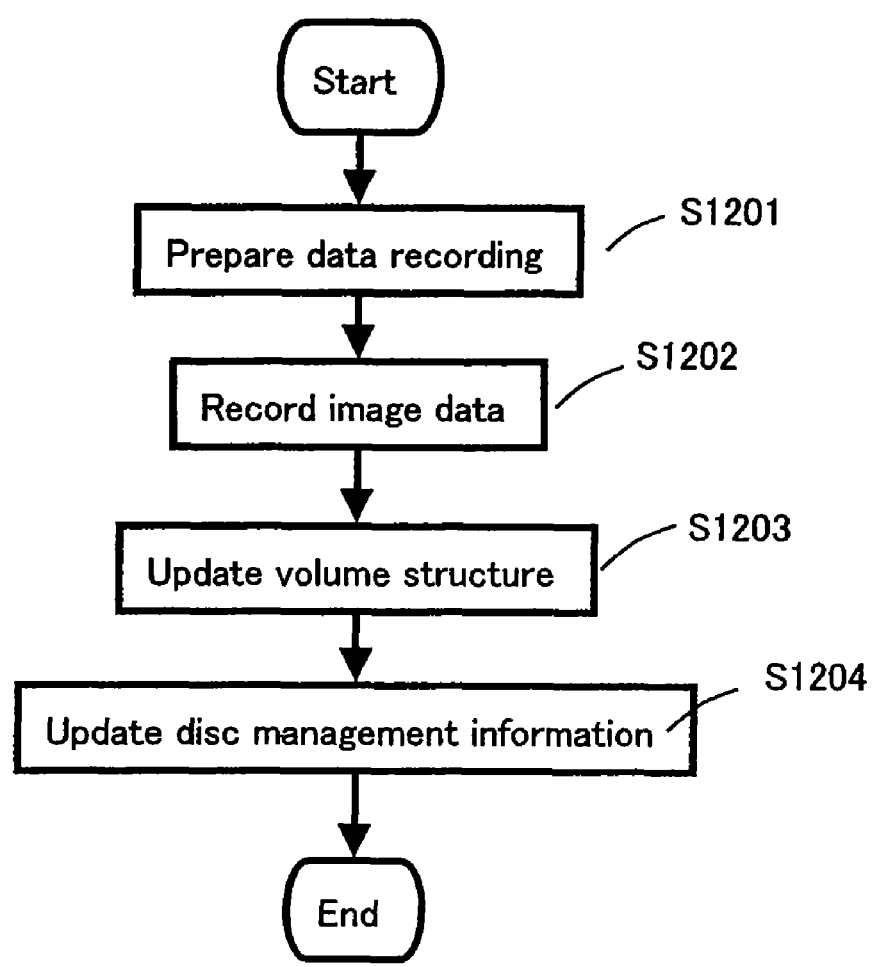
FIG. 29 is a flowchart showing a recording processing in an embodiment according to the present invention.

Next, with reference to a flow chart of FIG. 29 and an illustrative data structure on the information recording medium 100 shown in FIG. 30, a procedure for incrementally recording new image data 650 in the state shown in FIG. 28 will be described.

Before recording the image data 650, a system control section 301 and a drive control section 311 read out data necessary for recording/reproducing data from a disc management area and the like of the information recording medium 100.

When recording of the image data 650 is started, the system control section 301 reads out the image data 650 from a magnetic disc apparatus 304, and transfers this to a memory circuit 302 (step S1201).

Next, the system control section 301 instructs a drive apparatus 310 to record the image data 650 (step S1202).

At this time, by referring to track management information 210 for managing the track #1 1401, last recorded address information 213 is obtained. Here, last recorded address 1410 shown in FIG. 28 is obtained. Thus, the image data 650 is recorded in an area at the last recorded address 1410 or below.

Next, the system control section 301 updates the volume structure (step S1203). The system control section 301 reproduces data from a volume structure area 410, and holds the data in the memory circuit 302. Further, the system control section 301 updates information of the partition map (type 2) 602 in the memory circuit 302, and updates such that metadata file location 1201 indicates FE (metadata file) 621, and metadata mirror file location 1202 indicates FE (metadata mirror file) 612.

The system control section 301 instructs the drive apparatus 310 to perform pseudo-overwrite recording of the updated information to the volume structure area 410.

The drive apparatus 310 receives the instruction, and records the updated data transferred from the memory circuit 302 in a spare area 106 as a volume structure 700.

Further, the drive apparatus 310 updates replacement information included in disc management information recorded in a disc management information area 104, and maps the volume structure area 410 to the volume structure 700.

More specifically, new replacement management information 1010 is generated. Location information of the volume structure area 410 is set to original location information 1012, and location information of the volume structure 700 is set to replacement location information 1013. This new replacement management information 1010 is added to a replacement management information list 1000.

Further, the volume structure area 411 is similarly updated and pseudo-overwrite recorded. At this time, with respect to the volume structure area 411, a volume structure 701 is mapped.

It is desirable that the volume structure 700 and the volume structure 701 are recorded in different spare areas. The volume structure 701 is duplication data which provides for data corruption of the volume structure 700. The tolerance to data corruption is stronger when they are located in physically distinct areas.

In order to realize such pseudo-overwrite recording, the capacity of a spare area 107 is preferably equal to or larger than that of the spare area 106. The capacity of the respective spare regions is managed by spare area management information 1105.

With the above-described process, as described with reference to FIG. 5, the partition map (type 2) 602 which has been making reference to the FE (metadata file) 441 becomes to make reference to FE (metadata file) 621.

Then, for reflecting the results of the above-described procedure, the disc management information is updated (step S1204).

Figure 30:
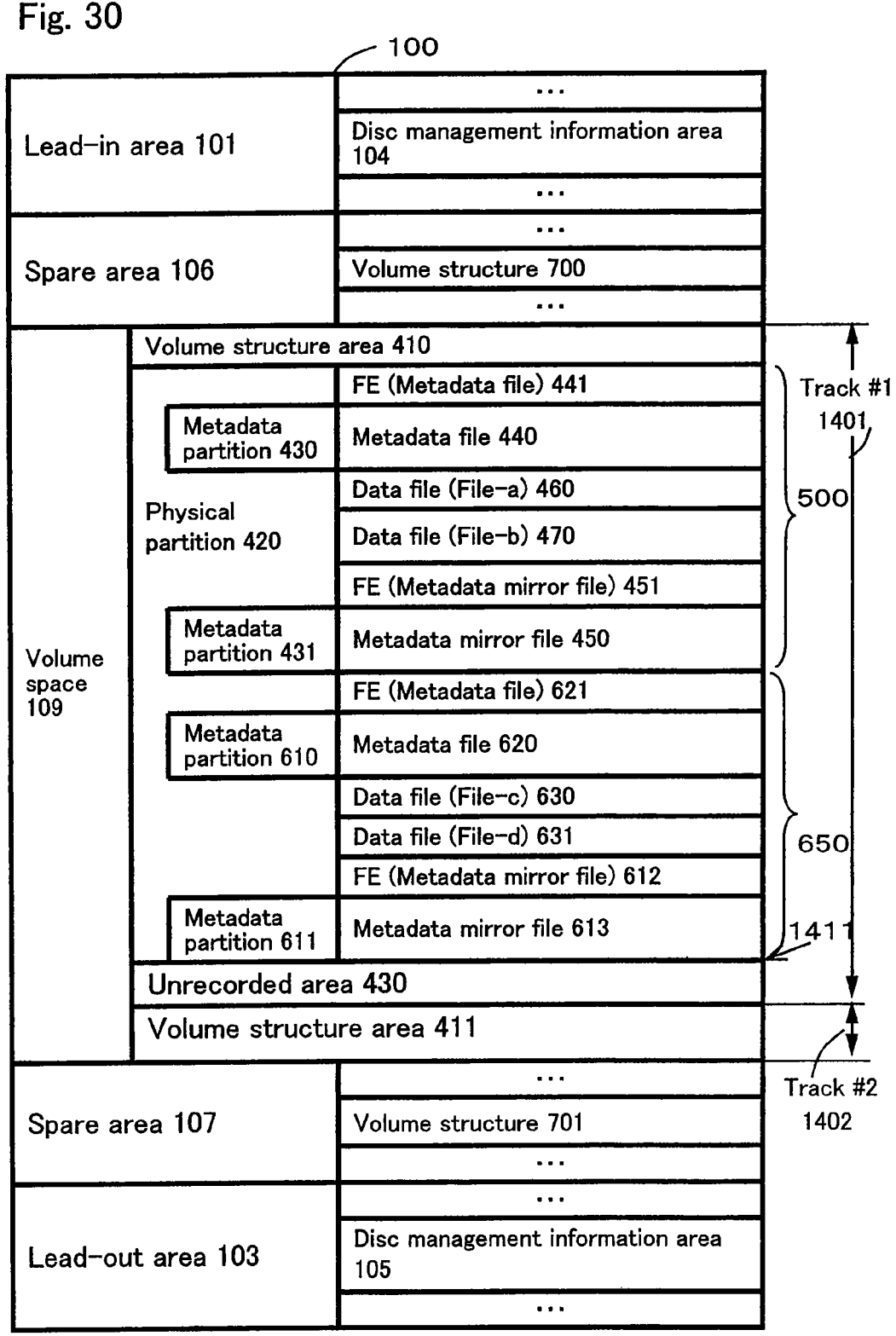
FIG. 30 is a diagram showing the data structure of the information on the information recording medium in an embodiment according to the present invention.

For example, the last recorded address 1410 is changed to last recorded address 1411 shown in FIG. 30. Thus, by newly recording the track management information 210 for managing track #1 1401, this change is reflected.

Figure 10:
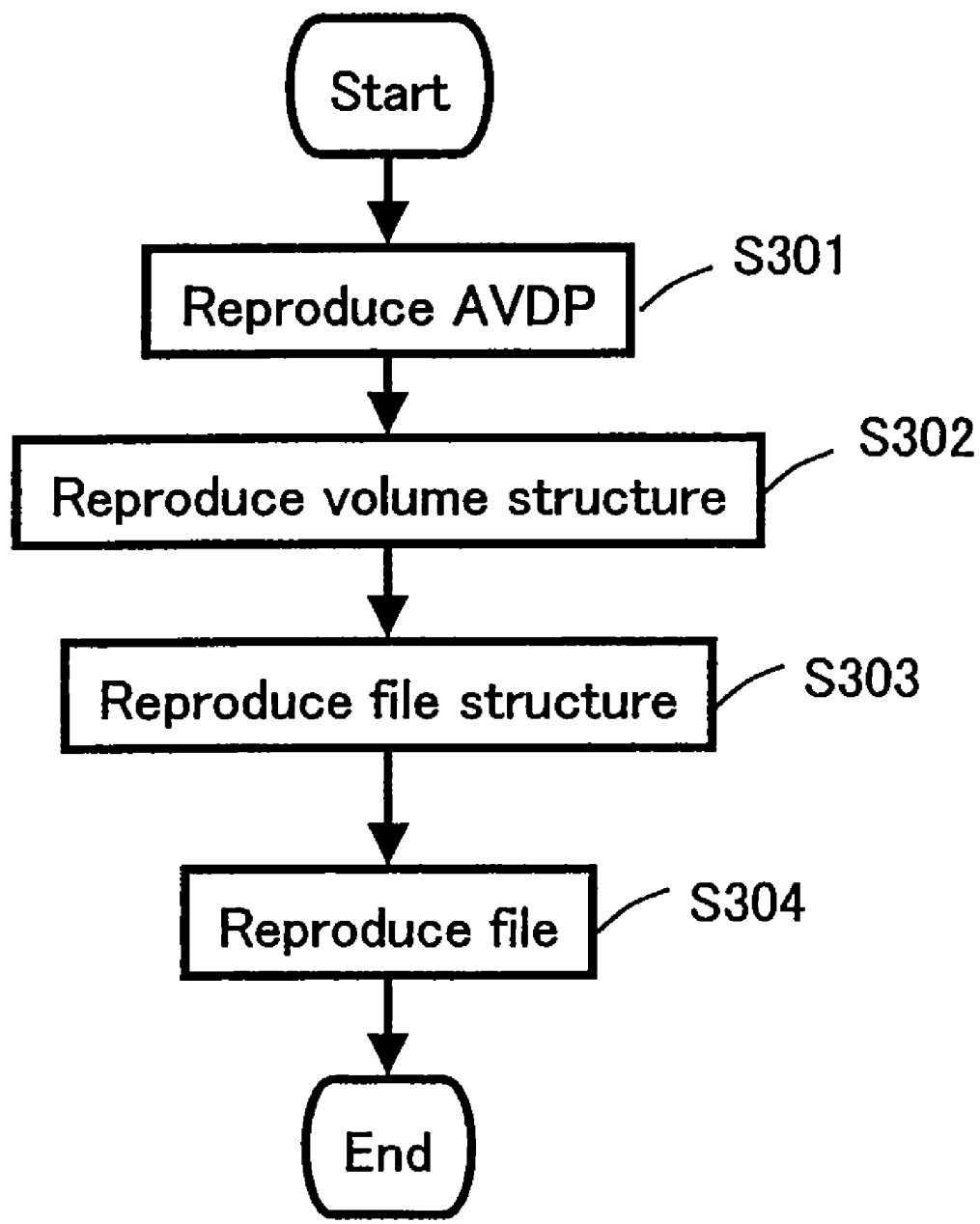
FIG. 10 is a flowchart showing a reproduction processing in an embodiment according to the present invention.

The file after such a recording process for the file is performed can be reproduced using, for example, the procedure described in Embodiment 2 with reference to the flow chart of FIG. 10.

With such a structure, effects similar to those achieved in the above-described embodiments can also be obtained in the present embodiment.

Furthermore, as an effect specific to the present embodiment, unrecorded areas are managed by the track management information 210. Thus, the present embodiment can be implemented more simply compared to the example in which unrecorded areas are managed by the spare area management information 220.

In the present embodiment, the target of the pseudo-overwrite recording is the volume structure. However, as in Embodiments 1 and 3, the target of the pseudo-overwrite recording may be FE or AVDP.

Embodiment 6

A data recording method different from those in the above-described embodiments will be further described.

Figure 31:
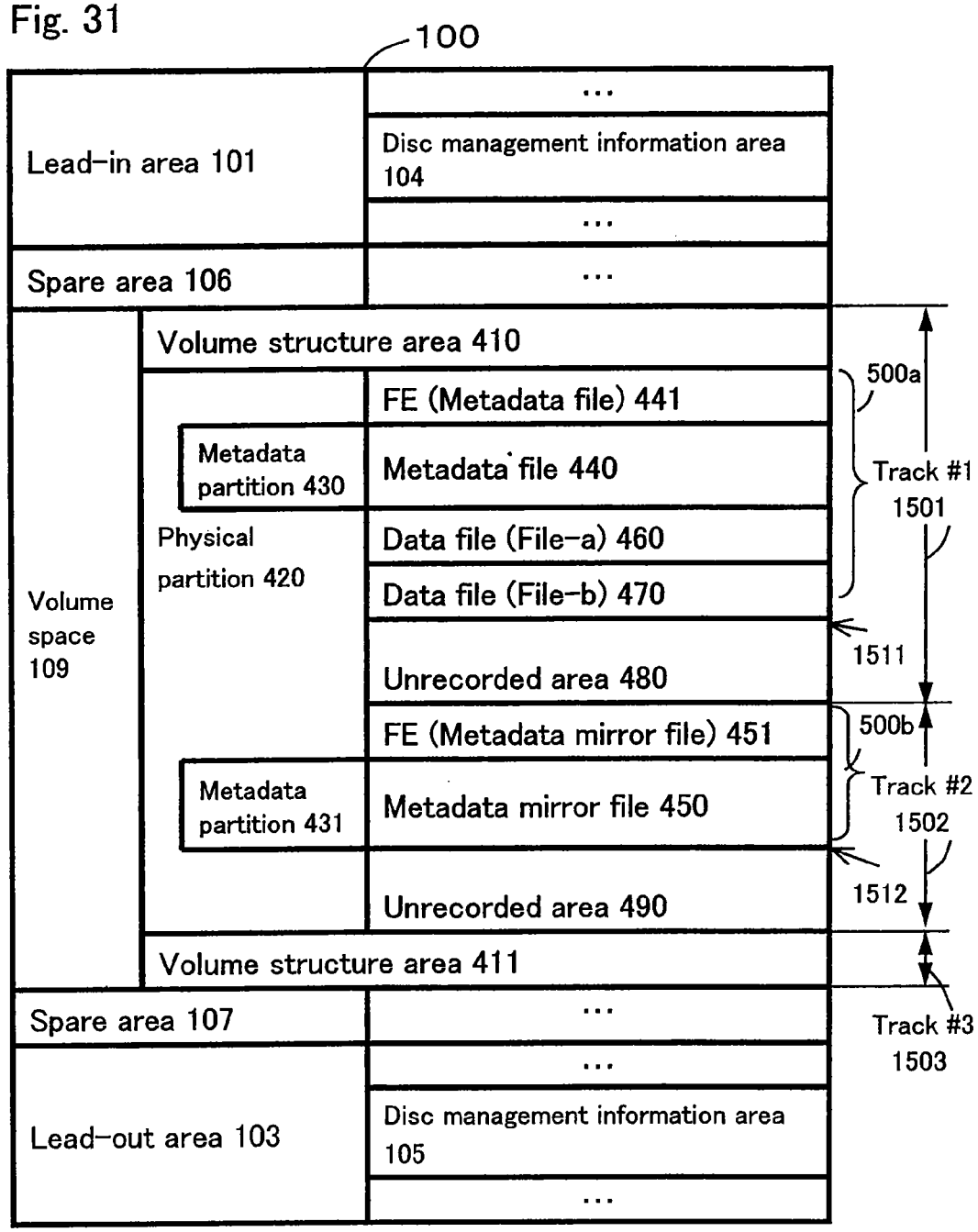
FIG. 31 is a diagram showing the data structure of the information on the information recording medium in an embodiment according to the present invention.

FIG. 31 shows an example of a data structure on a information recording medium 100 after first data recording in the present embodiment is performed.

With reference to FIG. 31, an example where a file and directory tree structure shown in FIG. 12 is recorded in the information recording medium 100 will be described.

Similar to the above-described embodiments, image data 500 is recorded in a volume space 109.

Further, as shown in FIG. 31, a plurality of tracks are allocated in the volume space 109. A track #1 1501 is allocated as a track for recording image data 500*a*, which is a portion of the image data 500 from FE (metadata file) 441 to a data file (File-b) 470.

Track #2 1502 is allocated as a track for recording image data 500*b*, which is a portion of the image data 500 corresponding to FE (metadata mirror file) 451 and metadata mirror file 450.

Track #3 1503 is allocated as a track for recording a volume structure 411.

Allocation of the tracks is performed when, for example, the information recording medium 100 is formatted, and the like, as appropriate.

The track #1 1501 is an open track including an unrecorded area 480 at the location indicated by the last recorded address 1511 or below. The track #2 1502 is an open track including an unrecorded area 490 at the location indicated by the last recorded address 1512 or below.

Figure 32:
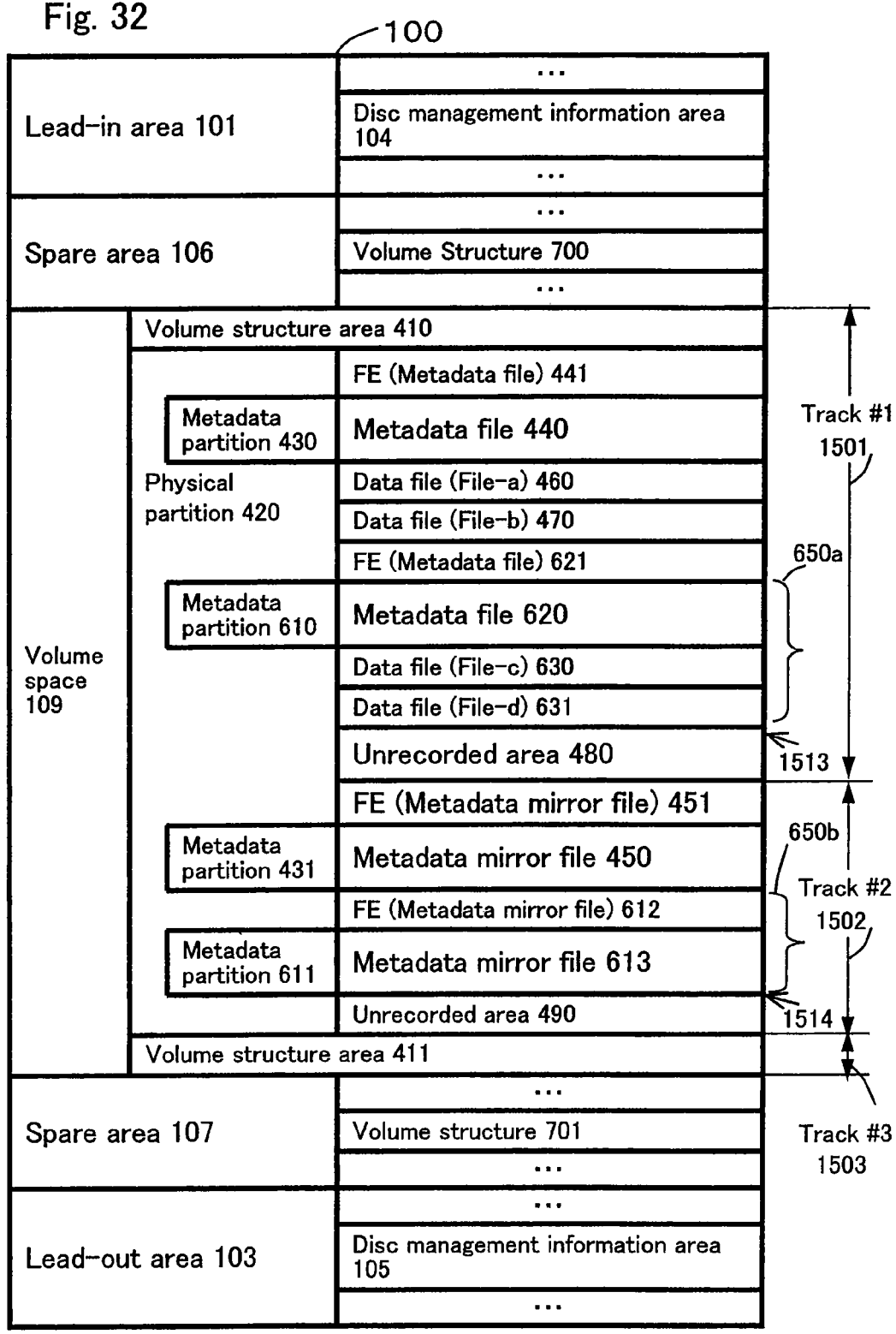
FIG. 32 is a diagram showing the data structure of the information on the information recording medium in an embodiment according to the present invention.
Figure 33:
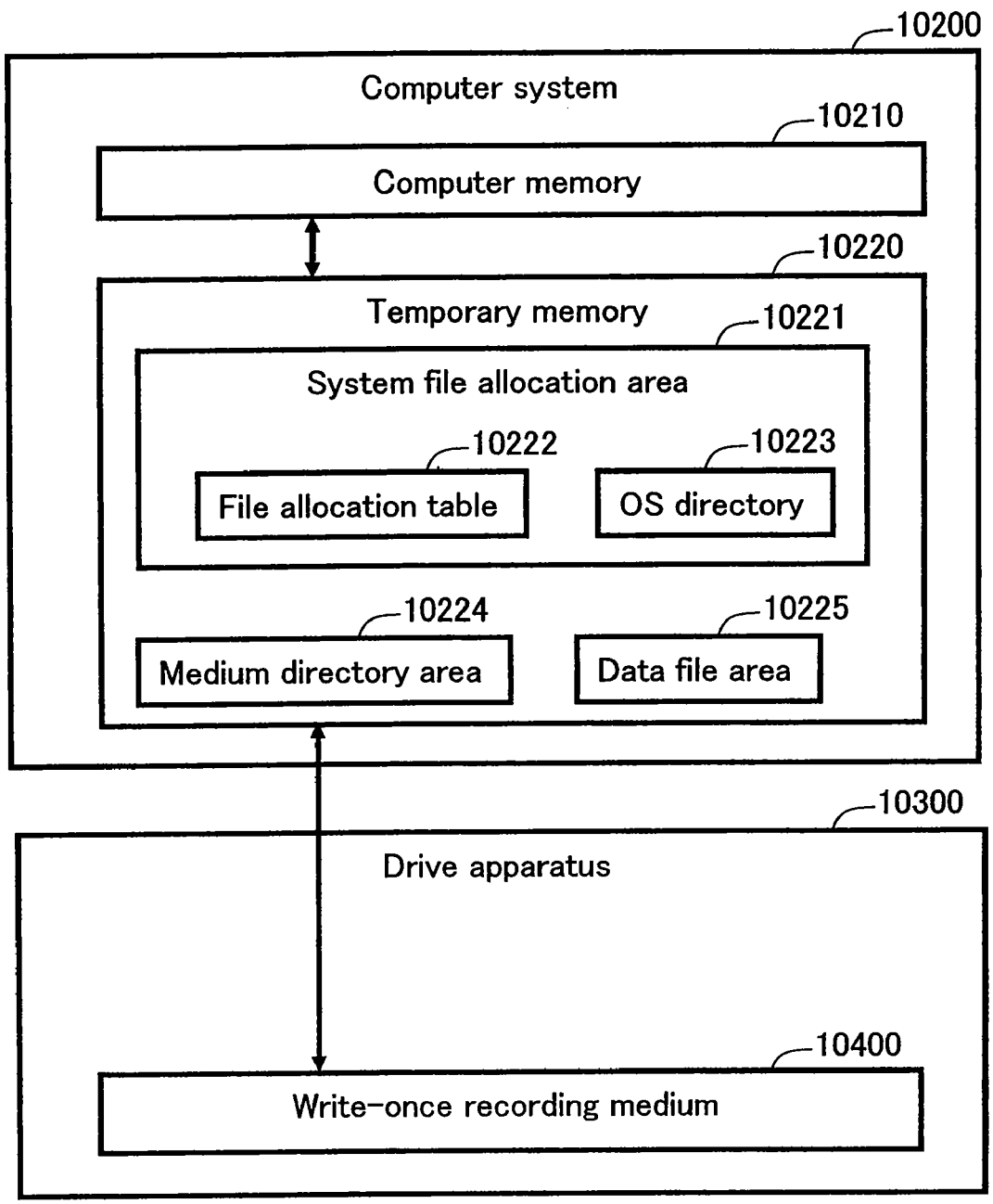
FIG. 33 is a block diagram showing the structure of the computer system according to the conventional technique.
Figure 34:
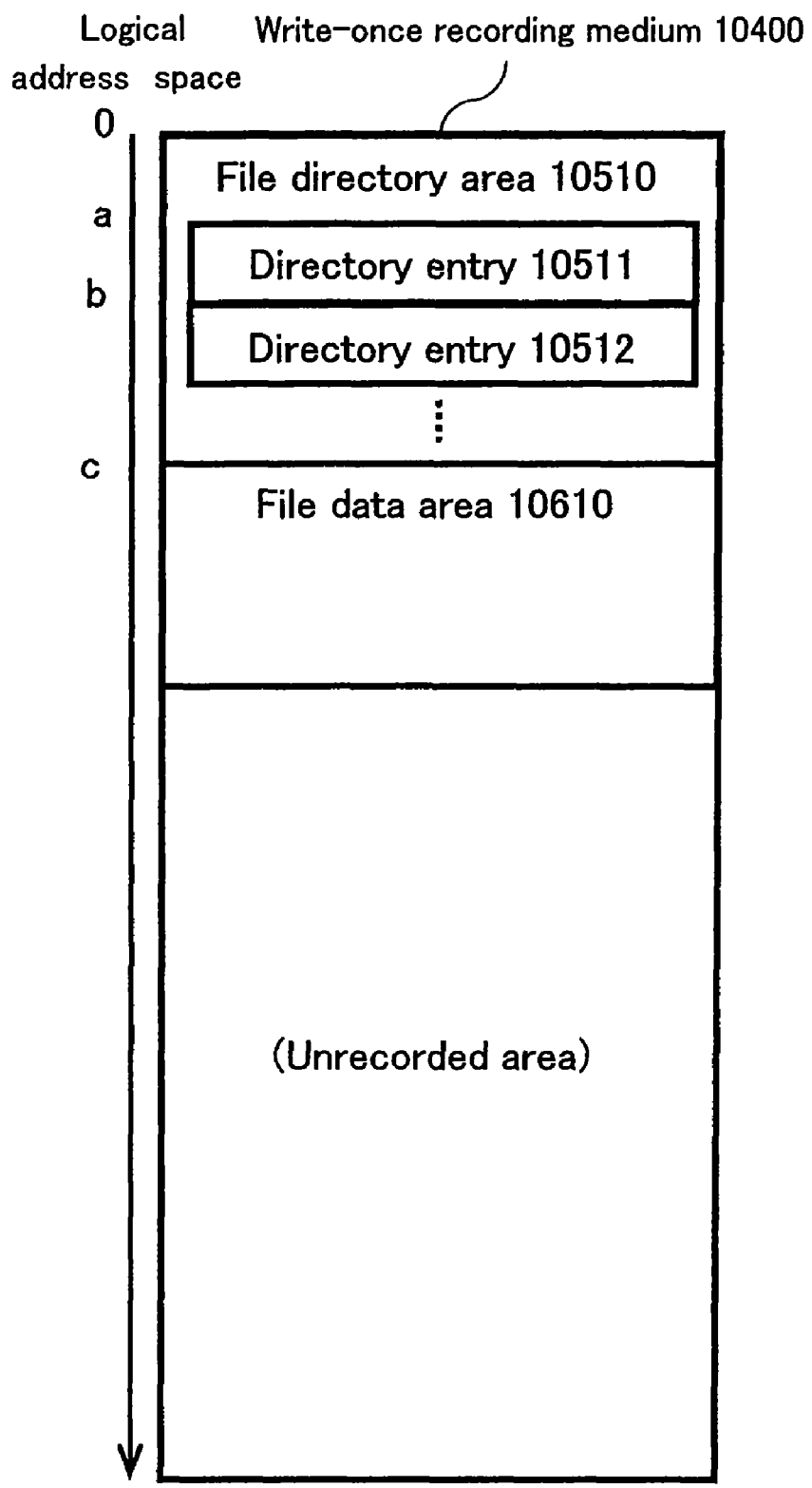
FIG. 34 is a diagram showing the data structure of the information on the information recording medium according to the conventional recording method.
Figure 35:
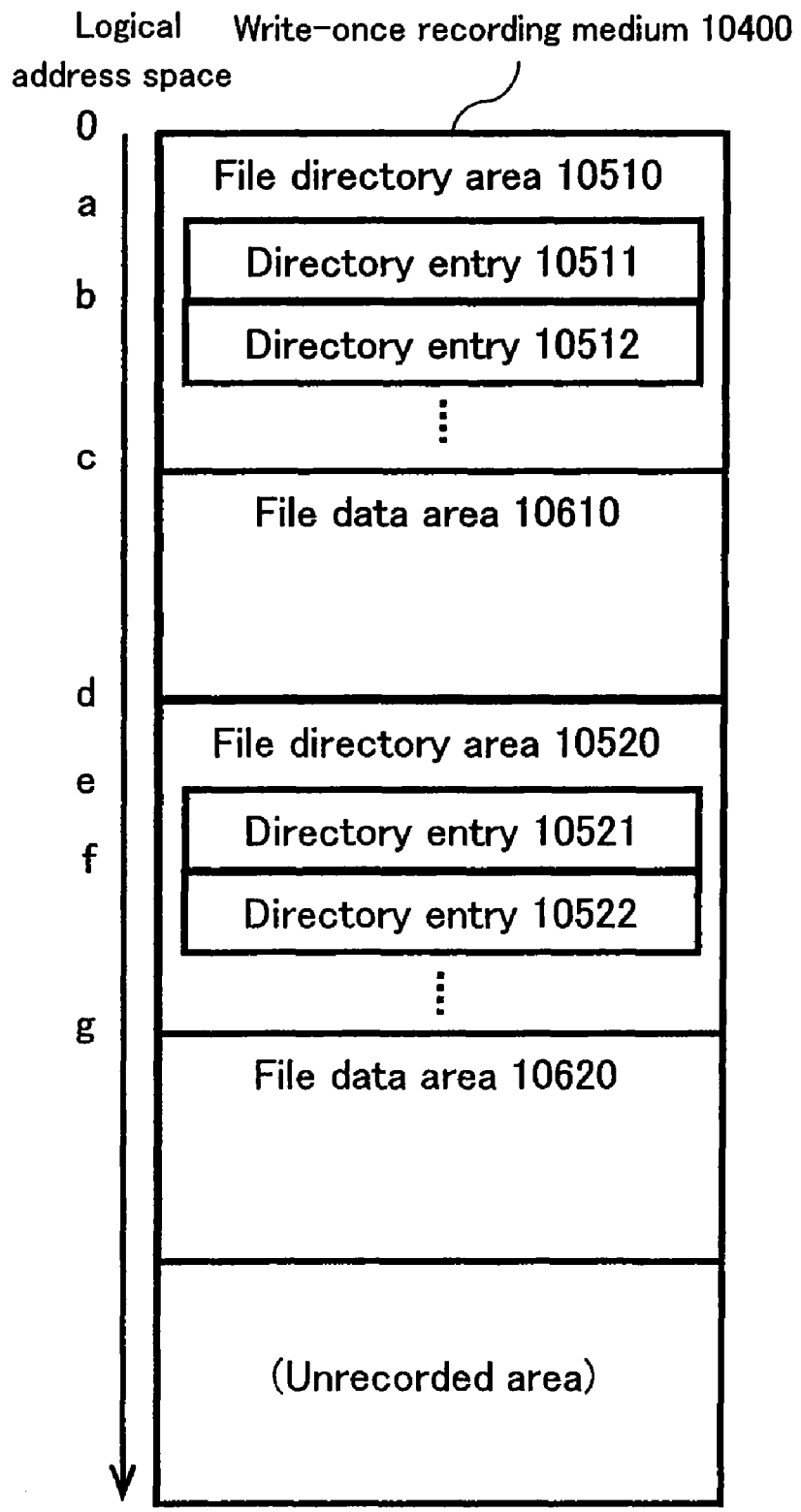
FIG. 35 is a diagram showing the data structure of the information on the information recording medium according to the conventional recording method.

When new image data 650 is incrementally recorded in the state shown in FIG. 31, a data structure as shown in FIG. 32 is obtained. Specifically, image data 650*a* which is the former part of the image data 650 is recorded immediately after the last recorded address 1511 of track #1 1501, and the last recorded address is updated to 1513.

Further, image data 650*b* which is the latter part of the image data 650 is recorded immediately after the last recorded address 1512 of the track #2 1502, and the last recorded address is updated to 1514.

A difference between the present embodiment and Embodiment 5 is that, in Embodiment 5, image data is incrementally recorded to only track #1 1401, while in the present embodiment, the track #1 1501 and the track #2 1502 are open tracks, and different parts of the image data are incrementally recorded respectively.

Except for such a difference, the recording procedure and the reproduction procedure are similar to those in Embodiment 5.

Effects of the present embodiment are also similar to those of Embodiment 5. However, the present embodiment has an additional effect that the relationship between the physical locations of the metadata file and the corresponding metadata mirror file can be made more distant. This improves the possibility of avoiding a situation in which the metadata file and the metadata mirror file are destroyed at the same time due to a scratch on the information recording medium 100 and the like.

Furthermore, areas are divided depending upon the types of data. Thus, more efficient data access becomes possible.

In the present embodiment, three types of the tracks are allocated. However, the number of types of tracks equal to or larger than three may be allocated. For example, the image data may be divided into three parts: metadata file; data file; and metadata mirror file, and tracks may be allocated to each of them.

Embodiment 7

In the present embodiment, a method for recording image data particularly including AV data, and repairing an error in recording using pseudo overwrite recording will be described. Conventionally, there has been a problem that, while recording is performed using image data, if an error occurs in recording data, repairing is impossible. The present embodiment can solve such a problem.

FIG. 36 illustrates a data structure on an information recording medium 100 immediately before image data is recorded according to the present embodiment. As shown in portion (a) of FIG. 36, there are a lead-in area 101 including a disc management information area 104, and a lead-out area 103 including disc management information area 105. In a volume space 109, no data has been recorded yet.

A procedure of recording image data 2000 including a file and directory tree structure shown in portion (b) of FIG. 36 to such a state and a data structure will be described. As shown in portion (b) of FIG. 36, File-e which is a general data file, Dir-E which is a parent directory thereof, AV-File including AV data encoded by an MPEG scheme or the like, and AV-Dir which is a parent directory thereof.

The file including the AV data is also referred to as a real-time file. Unlike general data files, such a file has to be recorded/reproduced without interruption. Thus, the real-time file is recorded on the information recording medium 100, recording control is performed such that the real-time file is located in physically contiguous areas with a predetermined length.

Such a contiguous area with a predetermined length is called CDA (Contiguous Data Area) in the case of the DVD specification. The conditions of the contiguous area which is required for the CDA are decided depending upon parameters such as a data rate of the AV data included in a real-time file, an access performance and/or reading performance of a drive apparatus, the size of a buffer memory, and the like.

In the UDF specification, each of the files includes a contiguous area called an extent. The extent is managed by a file entry (FE) to form one file. In real-time files, the extents are located on the information recording medium 100 so as to satisfy the above-mentioned conditions for the contiguous area.

Further, in the UDF specification, a file type indicating that it is a real-time file is defined. It is common to distinguish a real-time file from general data files for management by giving a property value of a predetermined value (for example, 249).

Figure 37:
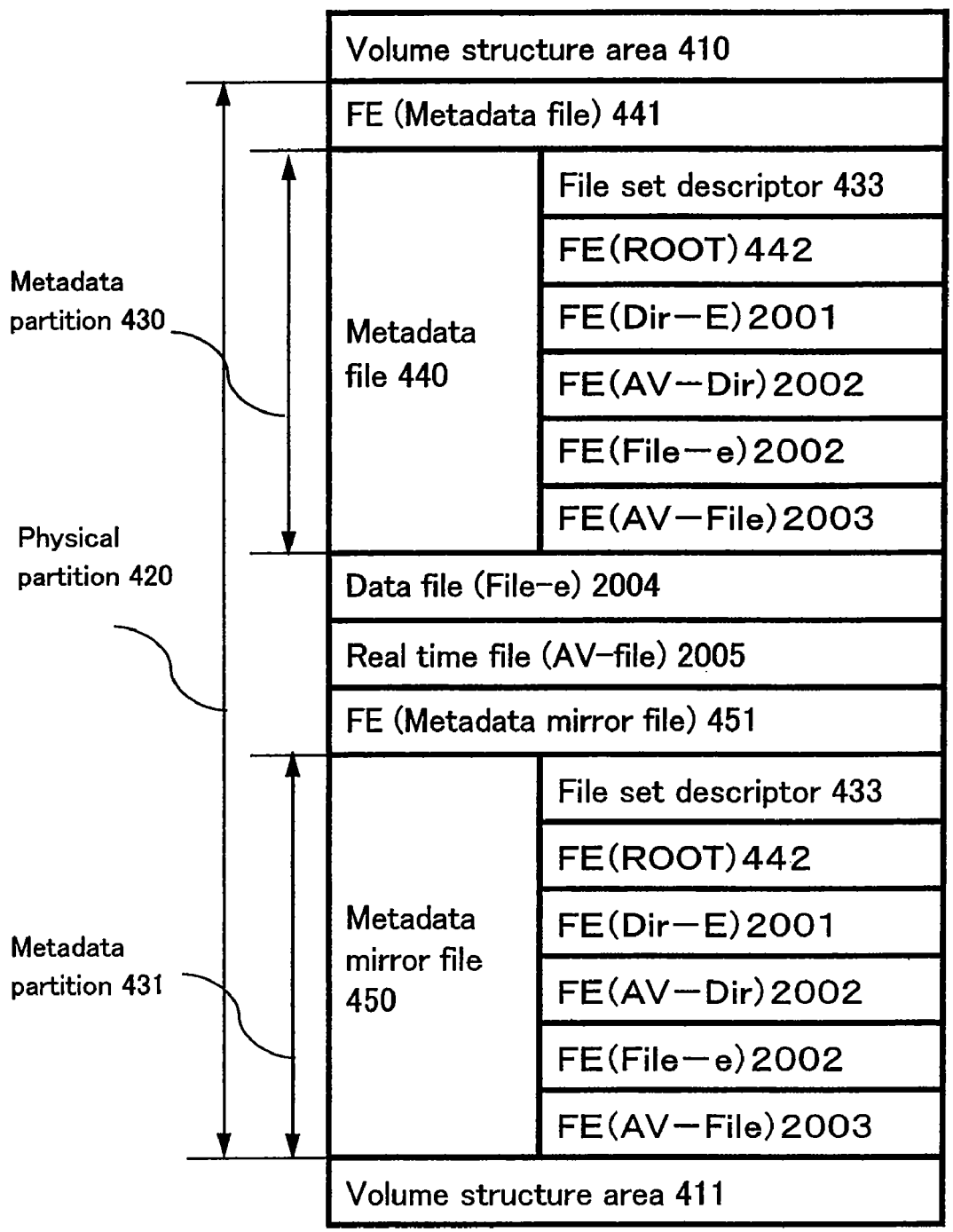
FIG. 37 is a diagram showing the data structure of the image data on the information recording medium in an embodiment according to the present invention.
Figure 39:
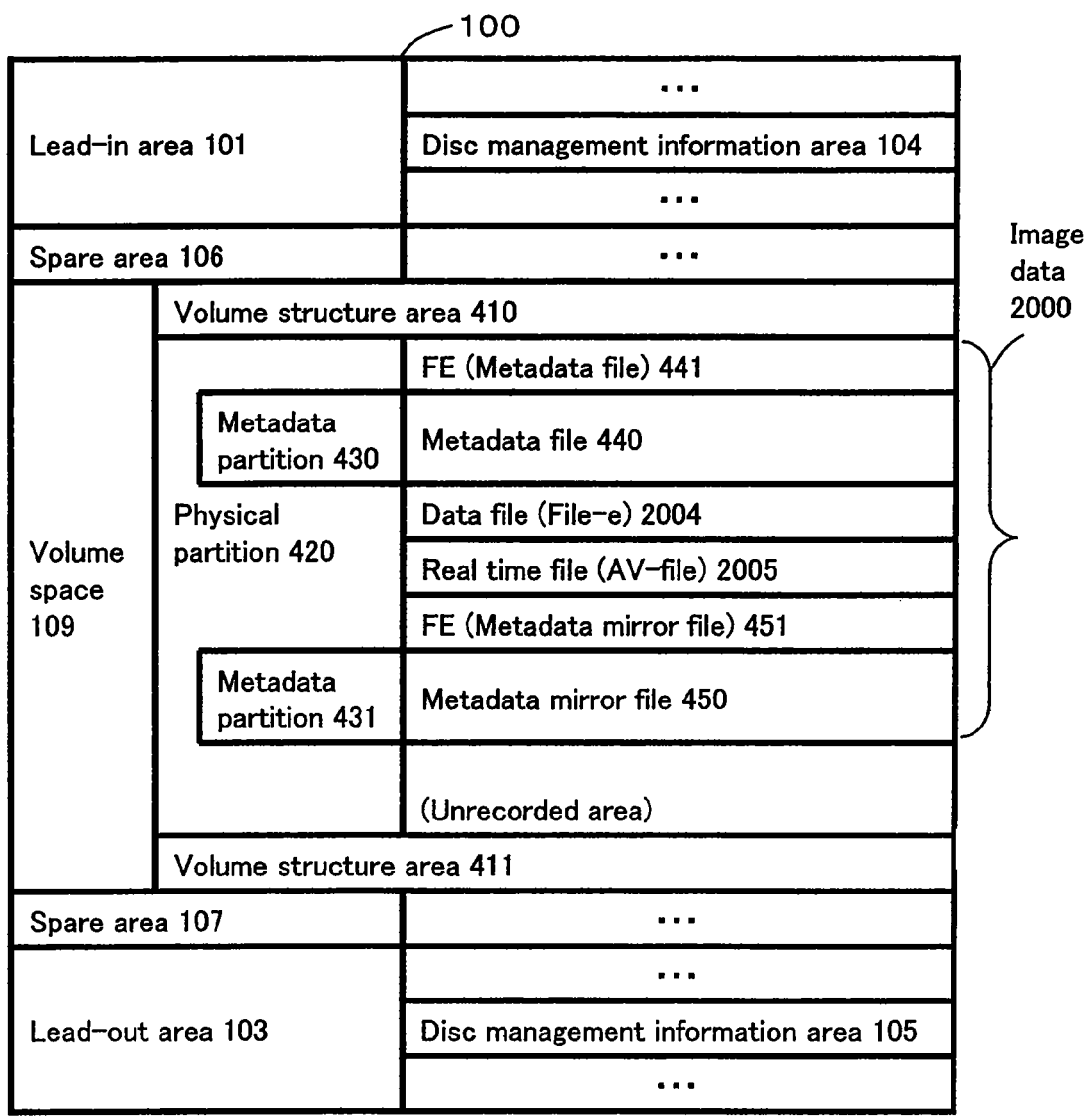
FIG. 39 is a diagram showing the data structure of the information on the information recording medium in an embodiment according to the present invention.

FIG. 37 shows a data structure of the image data 2000 (FIG. 39). The image data 2000 is a file which is obtained by combining directory tree structure shown in portion (b) of FIG. 36 and file management information for managing them into one file.

The image data 2000 includes a volume structure area 410, FE (metadata file) 441, a metadata file 440, a data file (File-e) 2004, a real-time file (AV-File) 2005, FE (metadata mirror file) 451, a volume structure area 411, and a metadata mirror file 450 in this order from the head.

The same data structures as the above-described image data 500 are denoted by the same reference numerals.

The areas except for the volume structure area 410 and 411 are areas corresponding to a physical partition 420 defined by the UDF specification version 2.5. Further, the physical partition 420 includes metadata partition 430 and 431 therein. As described above, the metadata partition includes file management information.

Specifically, in the example shown in FIG. 37, a file set descriptor 433, FE (ROOT) 442, FE (Dir-E) 2001, FE (AV-Dir) 2002, FE (File-e) 2002, and FE (AV-File) 2003 are included in the metadata file 440. The metadata mirror file 450 has the same data as the metadata file 440.

In the description below, for the sake of the simplicity of the description, the directory files are included in FE.

The recorded location and the capacity of the metadata file 440 and the metadata mirror file 450 in the physical partition 420 are respectively managed by the FE (metadata file) 441 and the FE (metadata mirror file) 451.

On the other hand, a data file (File-e) 2004 and a real time file (AV-File) 2005 are located in the physical partition 420.

Particularly, the real-time file (AV-File) 2005 is located in a contiguous area which satisfies the predetermined conditions in the physical partition 420 so that data is reproduced without interruption while being reproduced.

Such image data 2000 is previously formed on the magnetic disc apparatus 304 or the like, and then, recorded in the volume space 109 sequentially from the head.

Figure 38:
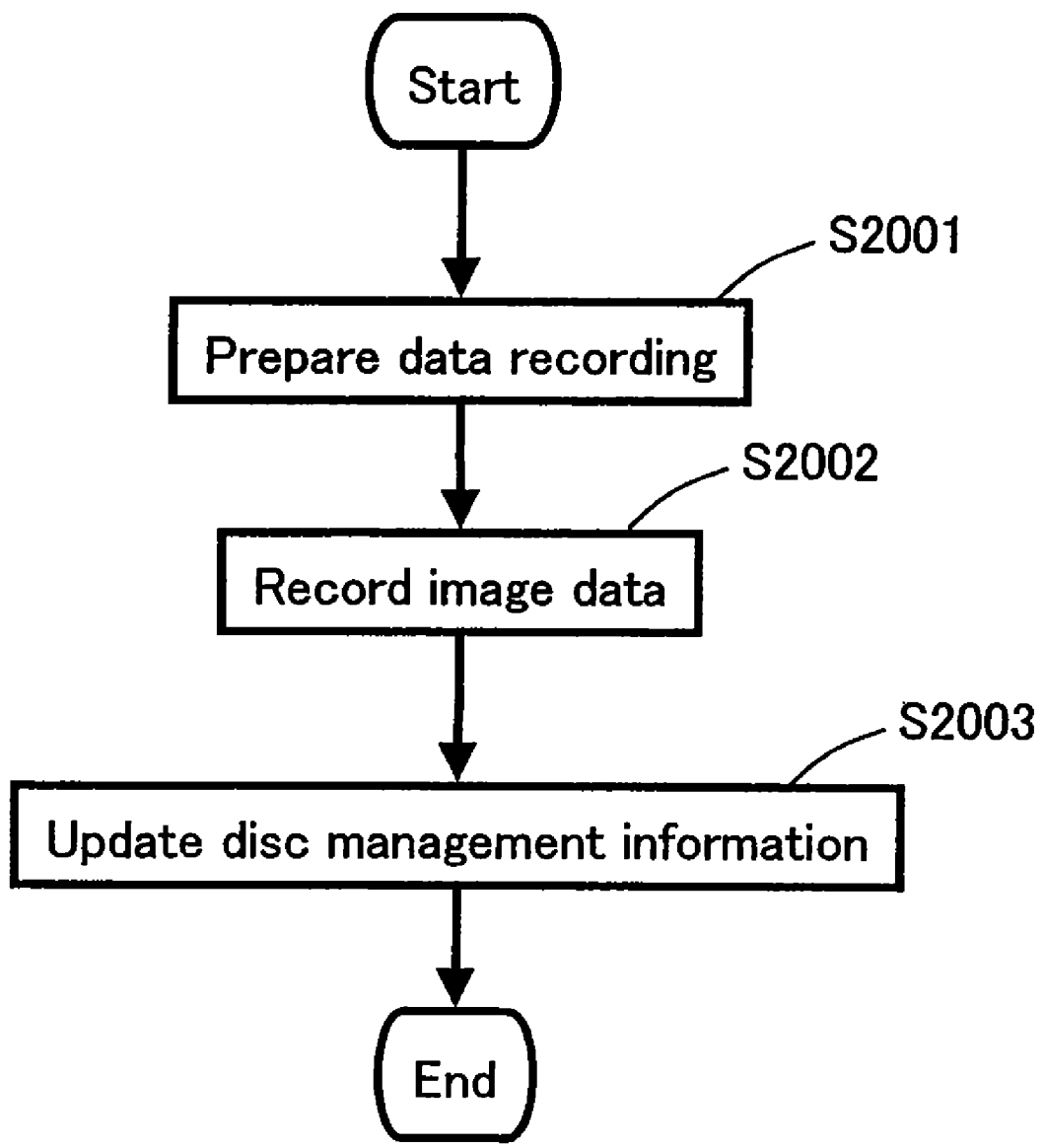
FIG. 38 is a flowchart showing a recording processing in an embodiment according to the present invention.

Next, with reference to a flow chart shown in FIG. 38, a procedure of recording the image data 2000 to the state shown in portion (a) of FIG. 36 will be described.

In this example, the image data 2000 is formed on the magnetic disc apparatus 304, and then recorded in the information recording medium 100.

Before recording the image data 2000, a system control section 301 and a drive control section 311 reads out data necessary for recording/reproducing data from the disc management information area of the information recording medium 100, and the like (step S2001).

Then, recording of image data 2000 is started (step S2002). The system control section 301 reads out the image data 2000 from the magnetic disc apparatus 304 sequentially from the head, and transfers it to the memory circuit 302.

The system control section 301 instructs the drive apparatus 310 to record the image data 2000. At this time, with reference to the disc management information, the image data 2000 is recorded in unrecorded contiguous areas of the information recording medium 100.

In the state shown in portion (a) of FIG. 36, the entire volume space 109 is unrecorded. Thus, the image data 2000 is recorded from the head.

In such recording of data, it is assumed that recording operation without a verify process is performed. After the image data 2000 is all recorded, the procedure proceeds to the next step.

Next, disc management information is updated (step S2003). Such a process is performed in order to reflect the results of recording the image data 2000.

For example, last recorded address information 1107 is updated. Further, since the unrecorded area is changed in accordance with recording of image data 2000, session management information 200 and/or spare area management information 220 are updated to the latest state.

As a result of such a recording procedure, the data structure on the information recording medium 100 becomes one as shown in FIG. 39. The image data 2000 is continuously recorded in the volume space 109 which remains unrecorded in portion (a) of FIG. 36.

Figure 40:
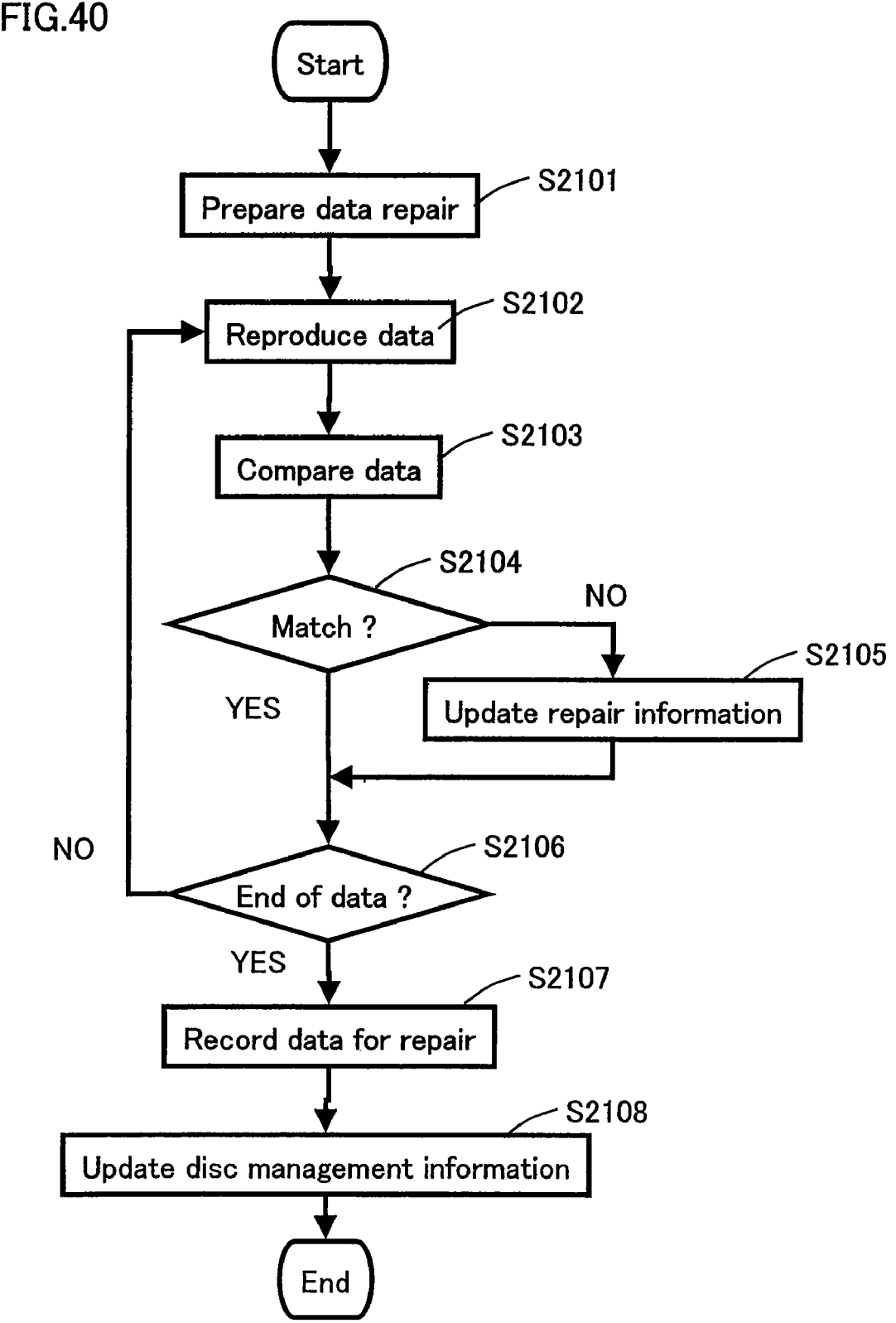
FIG. 40 is a flowchart showing a repair processing in an embodiment according to the present invention.

After completing the recording processing of the image data, the repair processing for recorded data is performed. With reference to the flowchart shown in FIG. 40 and an example of the data structure shown in FIG. 42, the repair processing for recorded data will be described.

The system control section 301 prepares the data repair (step S2101). For example, the system control section 301 and the drive control section 311 read data required to record/reproduce data from the disc management area and the like in the information recording medium 100.

Further, the reproduction of the image data 2000 on the magnetic disc apparatus 304 and the data recorded on the information recording medium 100 is prepared.

Next, The system control section 301 outputs an instruction to the drive apparatus 310 so as to reproduce data having a predetermined size from a leading position of the image data 2000 recorded on the information recording medium 100 (step S2102). Herein, the predetermined size is represented as a unit of sector or a unit of ECC block. Alternatively, the predetermined size may be represented as a unit of integer times of sector or ECC block. In particular, it is desirable that the predetermined size is equal to a unit of data in rewriting the data on the information recording medium 100 or a unit of integer times of the unit of data. The reproduced data is transferred to the memory circuit 302.

The system control section 301 compares the reproduced data in the memory circuit 302 with the original image data 2000 (step S2103). This comparison is made by transferring a portion of the image data 2000 corresponding to the reproduced data from the magnetic disc apparatus 304 to the memory circuit 302 and performing comparison operation of data on the memory circuit 302. This comparison can be made at a location other than the location described above (e.g. on the memory circuit 312).

Depending on the comparison result in step S2013, the processing branches into two steps. If the comparison result does not match, then the processing proceeds to step S2015. If the comparison result does match, then the processing proceeds to step S2106.

When the comparison result does not match, the system control section 301 determines that the data recording has failed, and holds the recording location as repair information (step S2105). The repair information can be stored, for example, in the memory circuit 302 or the magnetic disc apparatus 304.

Figure 42:
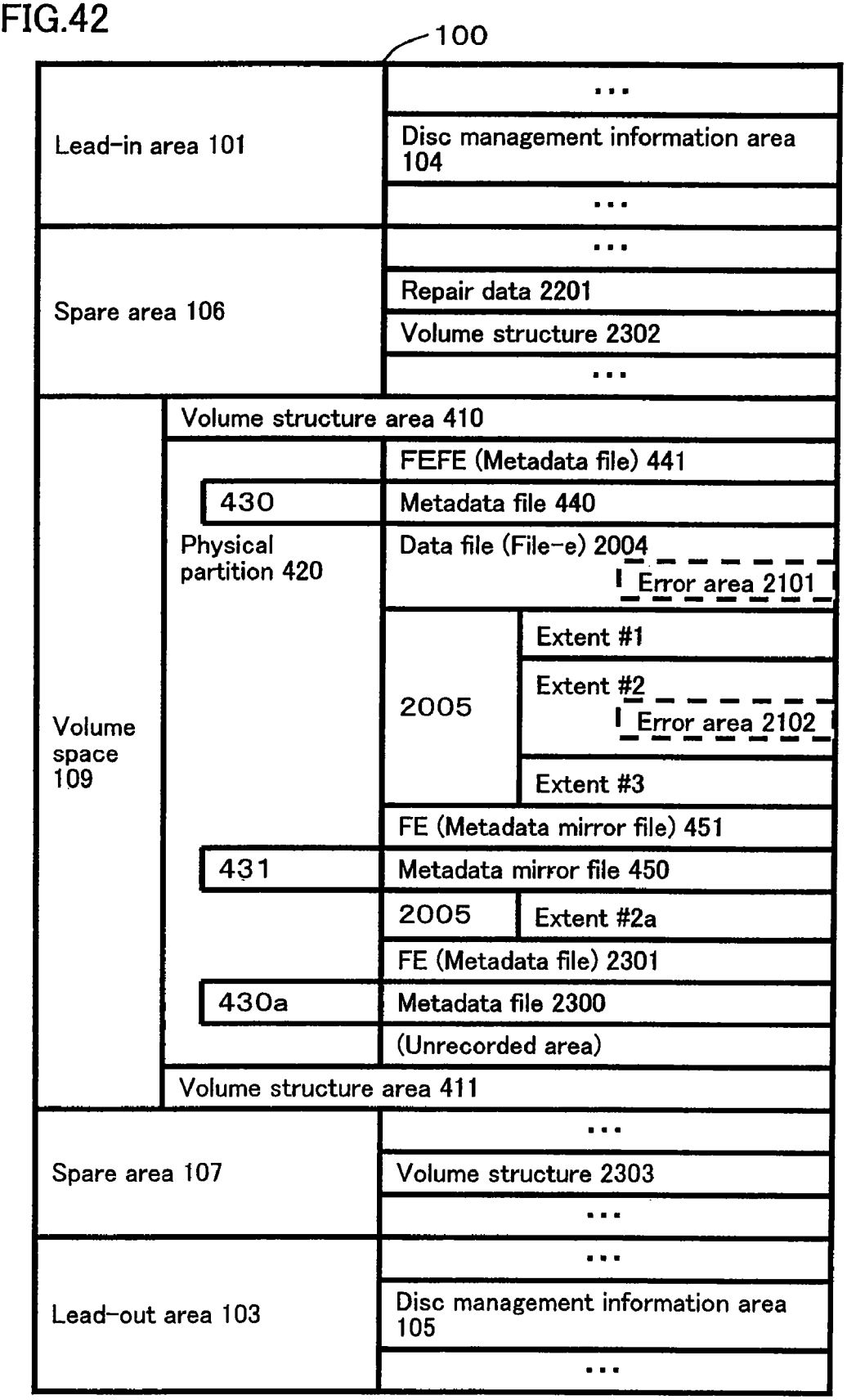
FIG. 42 is a diagram showing the data structure of the information on the information recording medium in an embodiment according to the present invention.

For example, in FIG. 42, it is assumed that error areas 2101, 2102 are areas where the data recording has failed. In this case, information specifying these error areas is stored as the repair information. When the data reproduction has failed (i.e. there occurs a reproduction error) for some reason, the processing is performed in a similar manner to the processing when the comparison result does not match.

When the processing in step S2015 is completed, the processing proceeds to step S2106.

It is determined whether or not the data reproduction/comparison reaches the end of data (step S2106). If it does not reach the end of data, then the processing returns back to step S2012, where the data reproduction/comparison is performed subsequently. If it reaches the end of data, then the processing proceeds to step S2107.

Figure 41:
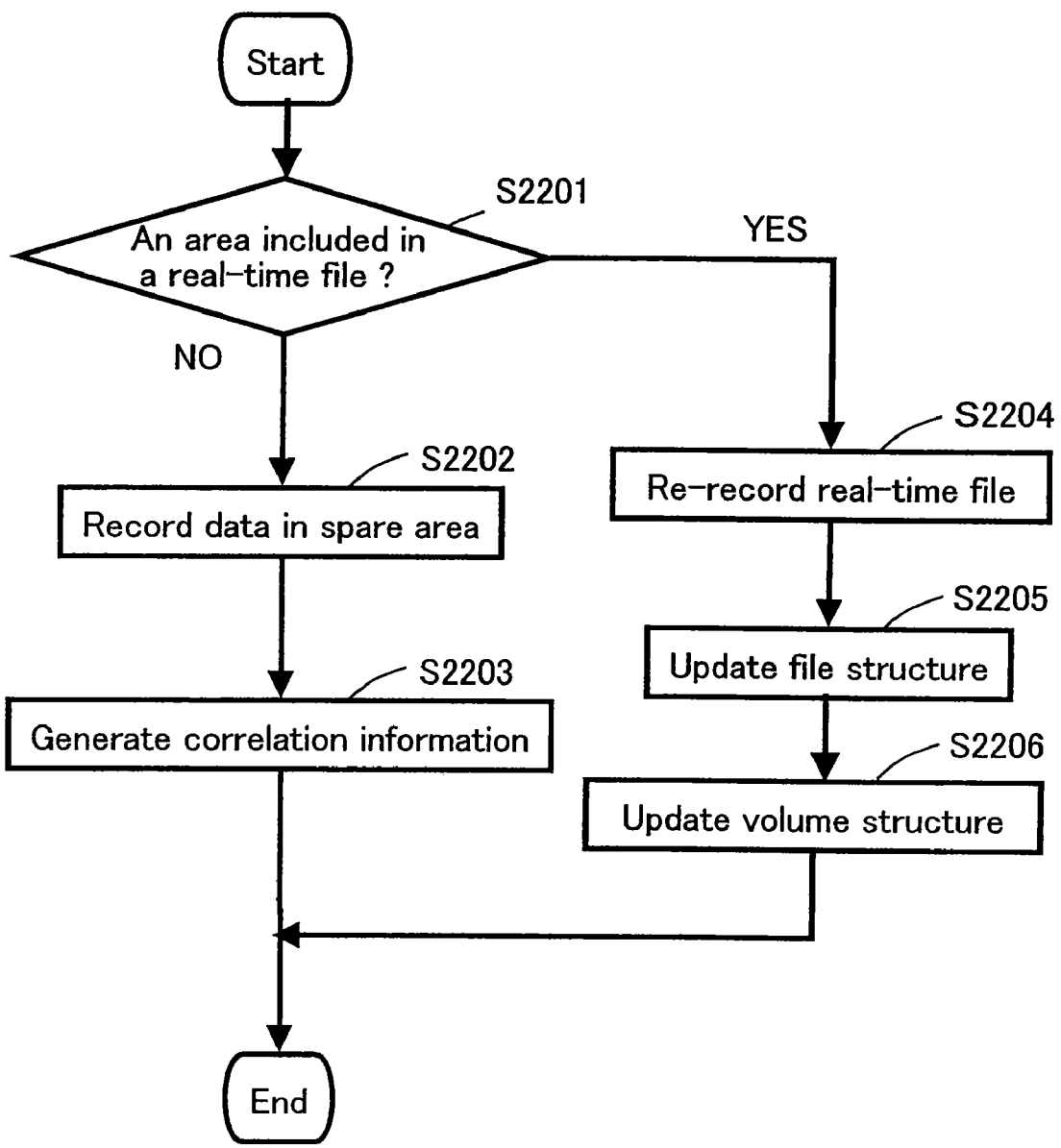
FIG. 41 is a flowchart showing a repair recording processing in an embodiment according to the present invention.

Next, the data recording is performed to repair the recording-failed data (step S2017). The processing for this step is selected depending on the kind of error area. The processing for this step will be described below in more detail with reference to FIG. 41.

By referring to the information specifying the error area, which is stored as the repair information, it is determined whether or not the error area is included in an extent of a real-time file (step S2201).

This determination can be made, for example, by checking the file entry (FE) in the file structure. This is because each FE holds information relating the position of extent and the capacity of each file in the partition space. Further, by referring to a file type defined by the UDF specification, it is possible to determine whether or not each file is a real-time file.

For example, the error area S2101 is an area which is not included in any extent of any real-time file. In this case, the processing proceeds to step S2202. On the other hand, the error area S2102 is an area which is included in an extent of a real-time file. In this case, the processing proceeds to step S2204.

The repair data corresponding to the error area (i.e. data indicating correct contents for the error area) is recorded in the spare area 106 (or the spare area 107) (step S2202). The data corresponding to the error data is read from a corresponding location of the image data 2000, the read data is recorded in the spare area as the repair data. For example, in FIG. 42, the repair data 2201 is recorded for the error area 2101.

These processing steps are performed, for example, by the system control section 301 issuing a predetermined command for the repair recording to the drive apparatus 310.

It is desirable to record the repair data corresponding to the error data at the location in the spare area which is close to the error area. This makes it possible to reduce the access time required for the data recording/reproduction.

The correlation information is generated and held in the memory such as the memory circuit 302 or the memory circuit 312 (step S2203). The correlation information is information for correlating the location information of the error area with the recording location of the repair data in the spare area.

The real-time file is re-recorded (step S2204). In this case, as described above, in order to reproduce the real-time file without any interruption (i.e. in order to perform seamless reproduction), it is required to locate the real-time file in a physically contiguous area which satisfies predetermined criteria.

However, when the error area is included in the real-time file, there is a possibility that the reproduction of the real-time file is interrupted due to the suspension of supplying the data from the error area.

In this step, an area including the error area on the real-time file is examined. The area including the error area may cause the interruption of the reproduction of the real-time file. Specifically, in FIG. 42, the area including the error area corresponds to extent #2 included in the real-time file (AV-File) 2005.

The data corresponding to extent #2 is read from the image data 2000, and the read data is recorded in an unrecorded area in the volume space 109 as extent #2a (data indicating the correct content of extent #2).

The length of extent #2a is determined such that predetermined criteria are satisfied. The predetermined criteria are for reproducing the repaired real-time file (AV-File) 2005 including extent #2a without any interruption.

In an example shown in FIG. 42, there is only one error area in a real-time file. However, there may be a plurality of error areas in a real-time file. In this case, a similar processing is applicable. As described above, the length of each extent is determined when the extent is re-recorded, such that the reproduction of the extent can be performed without any interruption.

Next, the file structure is updated to reflect re-recording of the extent (step S2205). In step S2204, the extent of the real-time file (AV-File) 2005 is changed. In order to reflect this change, the file structure should be updated. In this example, it is required to update the FE for managing the real-time file (AV-File) 2005. The update of the file structure can be made, for example, by updating the metadata file.

In an example shown in FIG. 42, the metadata file 2300, which is the update of the metadata file 440, is recorded in an unrecorded area in the volume space 109. Further, the FE (metadata file) 2301 for managing the metadata file 2300 is recorded.

The volume structure is updated (step S2206). In step S2205, the file structure is updated. By pseudo overwriting the volume structure, the volume structure which refers to the file structure is updated to the latest information.

In an example shown in FIG. 42, the update of the volume structure corresponds to the recording of the volume structures 2302 and 2303. This processing is similar to the processing in step S1203 shown in FIG. 29 in Embodiment 2 described above.

The repair recording processing is performed for every error area included in the repair information. When the repair processing is completed, the processing returns back to the processing in FIG. 40.

The disc management information is updated (step S2108). This update processing includes the following steps.

The system control section 301 generates replacement management information 1010 including the correlation information obtained in step S2203, and generates a new replacement management information list 1000 including the generated replacement management information 1010. Further, the replacement management information (correlation information) 1010 which is generated by pseudo overwriting the volume structure in step S2206 is added to the new replacement management information list 1000.

The system control section 301 outputs an instruction to the drive apparatus 310. The drive apparatus 310 records the new replacement management information list 1000 in the disc management information area 104.

Figure 43:
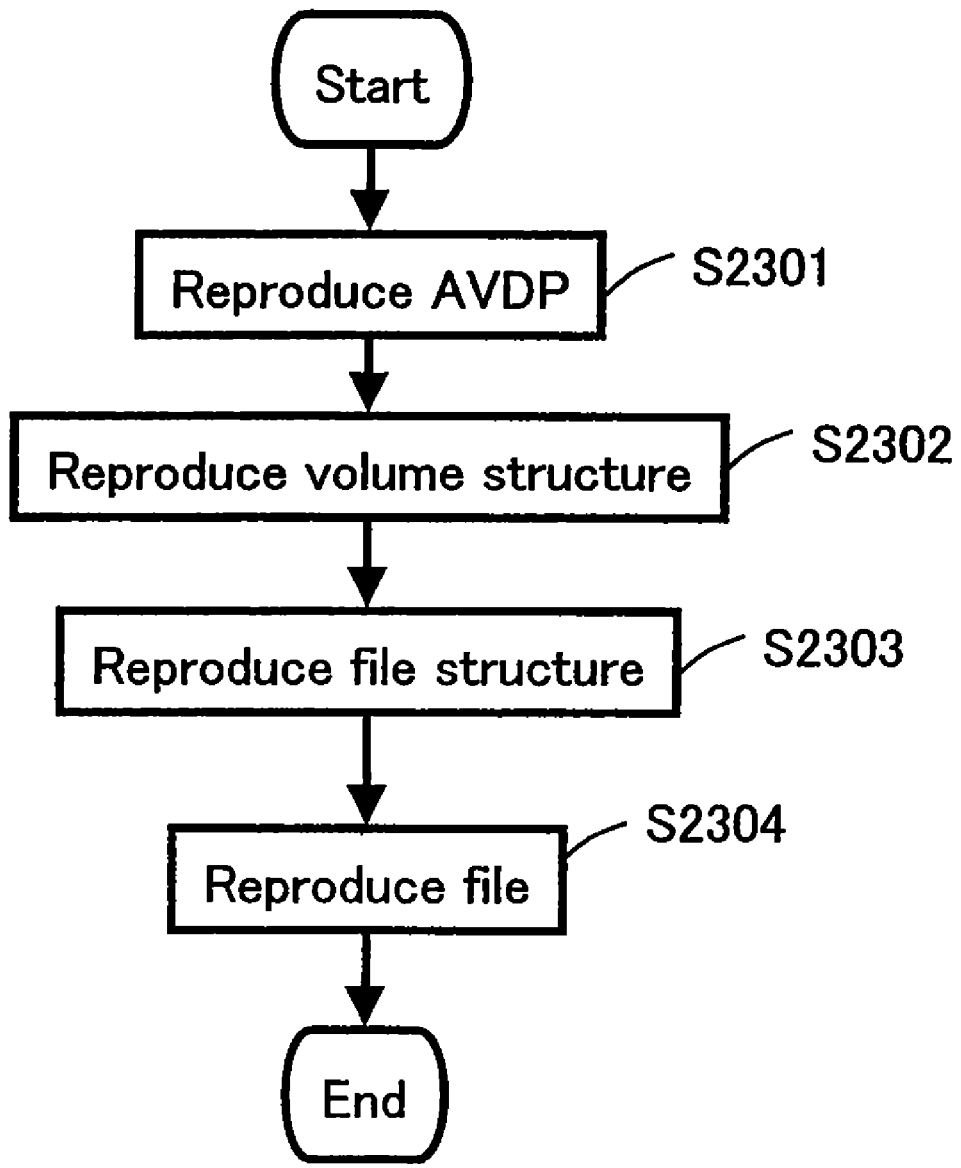
FIG. 43 is a flowchart showing a reproduction processing in an embodiment according to the present invention.

After completing the processing for recording such a file, the processing for reproducing the file is performed. With reference to the flowchart shown in FIG. 43, the processing for reproducing the file will be described below. Herein, an operation of reproducing the data file (File-e) 2004 will be described as an exemplary reproduction operation.

The system control section 301 outputs an instruction to the drive apparatus 310 so as to reproduce the AVDP 600 recorded in a predetermined location (e.g. logical address=256) of the information recording medium 100 (step S2301).

Next, the system control section 301 obtains the location information of the volume structure 410 from the AVDP 600, and outputs an instruction to the drive apparatus 310 so as to reproduce the volume structure 410 (step S2302).

Upon the receipt of the instruction, the drive apparatus 310 refers to the replacement management information list 1000, retrieves the replacement management information 1010 holding the location information of the logical volume descriptor 601 as the original location information 1012. When the drive apparatus 310 retrieves the replacement management information 1010, it obtains the replacement location information 1013 included in the replacement management information 1010. As a result, the location information of the volume structure 2302 is obtained. The drive apparatus 310 reproduces the volume structure 2302 and returns it back to the system control section 301. Upon the receipt of the volume structure 2302, the system control section 301 obtains the location information of the FE (metadata file) 2301 from the partition map (type 2) included in the volume structure 2302.

Next, the system control section 301 reproduces the file structure (step S2303). In order to reproduce the file structure, the system control section 301 instructs the drive apparatus 310 to reproduce the FE (metadata file) 2301, based on the location information of the obtained FE (metadata file) 2301.

The location information of the metadata file 2300 is obtained from the reproduced FE (metadata file) 2301. Thus, it is possible to access the metadata file 2300 included in the latest file management information.

The recording location of the data file (File-e) 2004 is obtained from the reproduced file structure, and the data file (File-e) 2004 is reproduced (step S2304). In order to reproduce the data file (File-e) 2004, the system control section 301 outputs a reproduction instruction to the drive apparatus 310. In the reproduction instruction, the location information of the data file (File-e) 2004 is represented by a logical address. Upon receipt of the reproduction instruction, the drive apparatus 310 converts the logical address into a physical address. The drive apparatus 310 refers to the replacement management information list 1000, and retrieves the replacement management information 1010 holding the physical address as the original location information 1012.

When the drive apparatus 310 retrieves the replacement management information 1010, it obtains the replacement location information 1013 included in the replacement management information 1010. As a result, the physical address corresponding to the logical address in the reproduction instruction is obtained. The drive apparatus 310 reproduces the data located at the physical address and returns it back to the system control section 301.

In an example shown in FIG. 42, when a reproduction instruction including the logical address of the error area 2101 is output to the drive apparatus 310, the drive apparatus 310 retrieves the replacement management information list 1000, and obtains a physical address of the repair data 2201. The drive apparatus 310 reproduces the repair data and returns it back to the system control section 301. A similar processing is applicable to other error areas.

On the other hand, in the reproduction of the real-time file (AV-File) 2005, the extent is re-recorded without using the replacement mechanism, and the file structure is updated. Accordingly, in reproducing the real-time file (AV-File) 2005, the extents included in the file entry are reproduced in steps.

According to the processing mentioned above, in the recording of the image data 2000, it is possible to repair the information of the failed-recording area (error area) using a replacement mechanism including replacement information and spare areas.

If the replacement mechanism is used for the real-time file, the AV data is arranged in discrete locations so that the AV data cannot be reproduced without any interruption. According to the present embodiment of the invention, by re-recording the extent of the real-time file including the error area in the user area, it is possible to repair the data and satisfy the arrangement criteria of the AV data. The update of the file structure required for the repair processing is realized by pseudo overwriting the file structure.

The repair of error areas in the real-time file is realized without using any spare area. Accordingly, it is not necessary to allocate a large size of spare area. As a result, it is possible to reduce the burden of the implementation and efficiently utilize the data area on the information recording medium.

By implementing the repair function mentioned above, even if the quality of the information recording medium at the time of manufacturing them is reduced, it is possible to achieve a high reliability as a whole system. This provides a significant industrial advantage in that the cost of manufacturing the discs can be reduced.

On the logical space, the file structure obtained after the repair is completed as shown in FIG. 42 is the same as the file structure for reproduction only. Thus, it is possible to reproduce data recorded in the write-once recording medium, even in the system which is not capable of performing the reproduction operation for the reproduction only recording medium or the rewritable recording medium.

In the recording procedure mentioned above, the repair recording is performed after all of image data is recorded without performing any verifying process. When the image data is recorded while the verifying process is performed, it is necessary to access the recorded data immediately after the data has been recorded and reproduce the recorded data for each minimum unit (e.g. a unit of ECC block) of the data recording. Thus, when the recording of the image data is performed with the verifying process, the time required for recording whole image data 2000 is greatly increased.

On the other hand, in the present embodiment of the invention, the recording of data and the repairing of data both can be made using continuous data access. Accordingly, any extra waiting time for access by the head section 334 and control of disc rotation number is not required and it is possible to greatly reduce the processing time.

In the embodiments of invention mentioned above, the file structure is updated into the latest information by pseudo overwriting the volume structure and the like. However, the file structure can be updated by directly pseudo overwriting the changing portion of the file structure. Thus, it is possible to reproduce data recorded in the write-once recording medium, even in the system which is not capable of performing the reproduction operation for the read-only recording medium or the rewritable recording medium.

In the embodiments of invention mentioned above, the system control section 301 instructs the drive apparatus 310 to perform pseudo overwriting. Such an instruction can be made by using a predetermined instruction (command) for performing pseudo overwriting. Alternatively, upon the receipt of the normal recording instruction, the drive apparatus 310 may detect overwriting of data and may automatically perform pseudo overwriting.

In the embodiments of invention mentioned above, the update of replacement information included in the disc management information is performed by the drive apparatus 310. However, the update processing can be made by the host apparatus 305. In this case, the host apparatus 305 instructs the drive apparatus 310 to reproduce information from the disc management information area. The reproduced information is stored in the memory circuit 302. After the necessary update processing is completed, the recording for the disc management information area is performed using a predetermined instruction.

Embodiment 8

Figure 44:
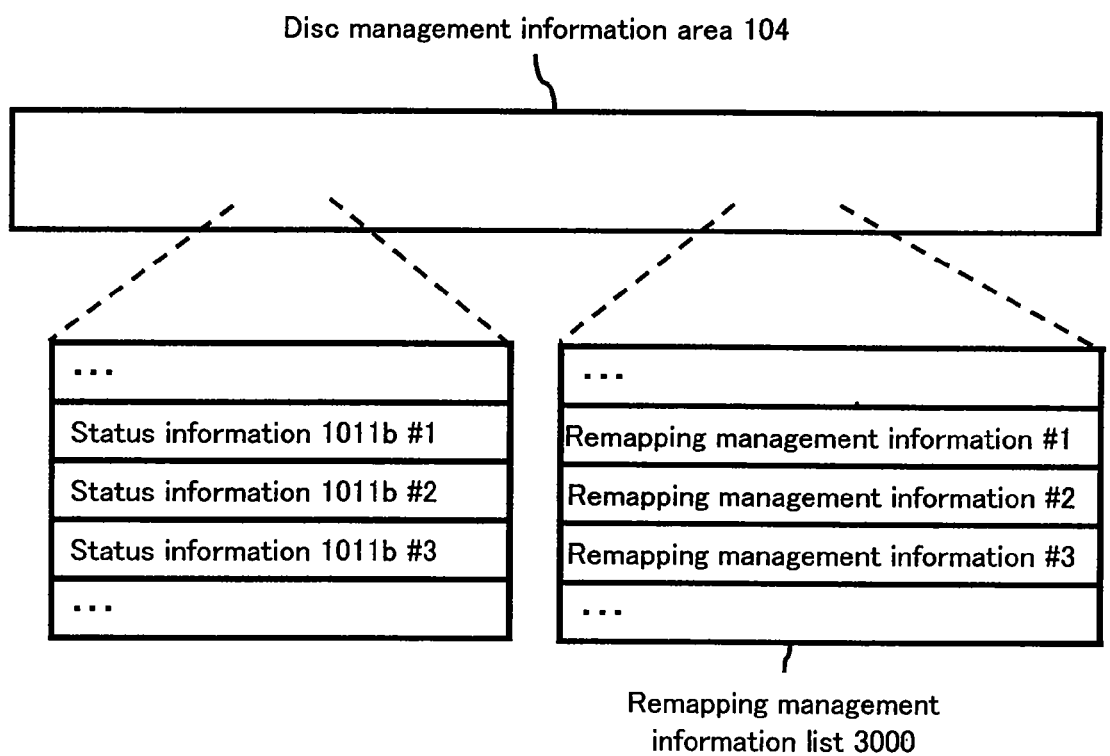
FIG. 44 is a diagram showing the data structure of the mapping management information list on the information recording medium in an embodiment according to the present invention.

FIG. 44 shows a remapping management information list 3000, which is one example of replacement information for implementing the pseudo overwrite according to this embodiment of the invention.

The remapping management information list 3000 represents replacement information in a form which is different from the form of the replacement management information list 1000 shown in portion (a) of FIG. 17. The remapping management information list 3000 includes at least one remapping management information such as remapping management information #1.

The status information 1011b is provided in the disc management information area 104. The status information 1011b is similar to the status information 1011 shown in portion (a) of FIG. 17.

The status information 11011b includes status information for a corresponding remapping management information. The status information 1011b indicates, for example, a valid/invalid status of the replacement location information 1013 included in the remapping management information.

For example, when a predetermined value (e.g. "0"), which indicates that the replacement location information 1013 is invalid, is set to the status information 1101b #1, the remapping management information #1 corresponding to the status information 1101b #1 is handled as being invalid. In this case, although the remapping management information #1 exists in the remapping management information list 3000, the original location designated by the remapping management information #1 is not used to map the original location to a replacement location for the purpose of performing pseudo overwrite. As a result, the data recorded at the original location designated by the remapping management information #1 is handled as being valid.

On the other hand, when a predetermined value (e.g. "1"), which indicates that the replacement location information 1013 is valid, is set to the status information 1101b #1, the remapping management information #1 corresponding to the status information 1011b #1 is handled as being valid. In this case, the original location designated by the remapping management information #1 is used to map the original location to a replacement location for the purpose of performing pseudo overwrite. As a result, the data recorded at the replacement location designated by the remapping management information #1 is handled as being valid.

Next, with reference to FIG. 45, the data structure on the information recording medium 100b shown in FIG. 20 after a first time data recording will be described. The information recording medium 100b has two layers and each layer has a recording surface.

Figure 45:
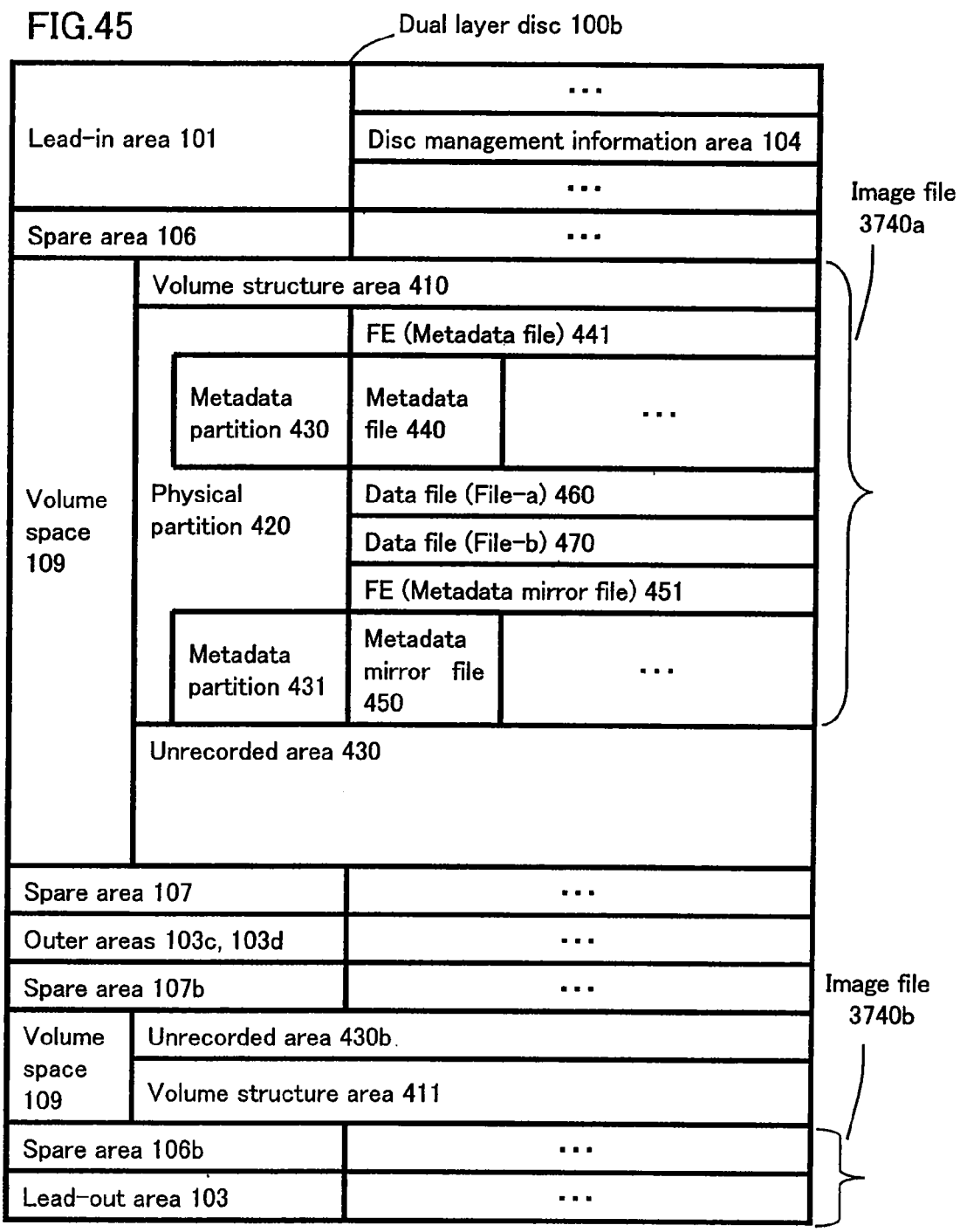
FIG. 45 is a diagram showing the data structure of the information on the information recording medium in an embodiment according to the present invention.

In FIG. 45, the image data 3740 including the volume structure areas 410 and 411 is recorded. The image data 3740 is similar to the image data 740 shown in FIG. 11.

The image data 3740 is divided into two parts (I.e. the image data 3740a and the image data 3740b). This division of the image data 3740 is similar to the case shown in FIG. 25.

In the image data 3740, in accordance with the UDF specification, the volume structure area 410 includes an AVDP 3600a (recording location: LSN=256) and the volume structure area 411 includes an AVDP 3600b (recording location: LSN=last LSN-256) and an AVDP 3600c (recording location: LSN=Last LSN).

Next, the recording processing for the information recording medium 100b shown in FIG. 45 will be described below. This recording processing is similar to that described in Embodiment 3.

Figure 46:
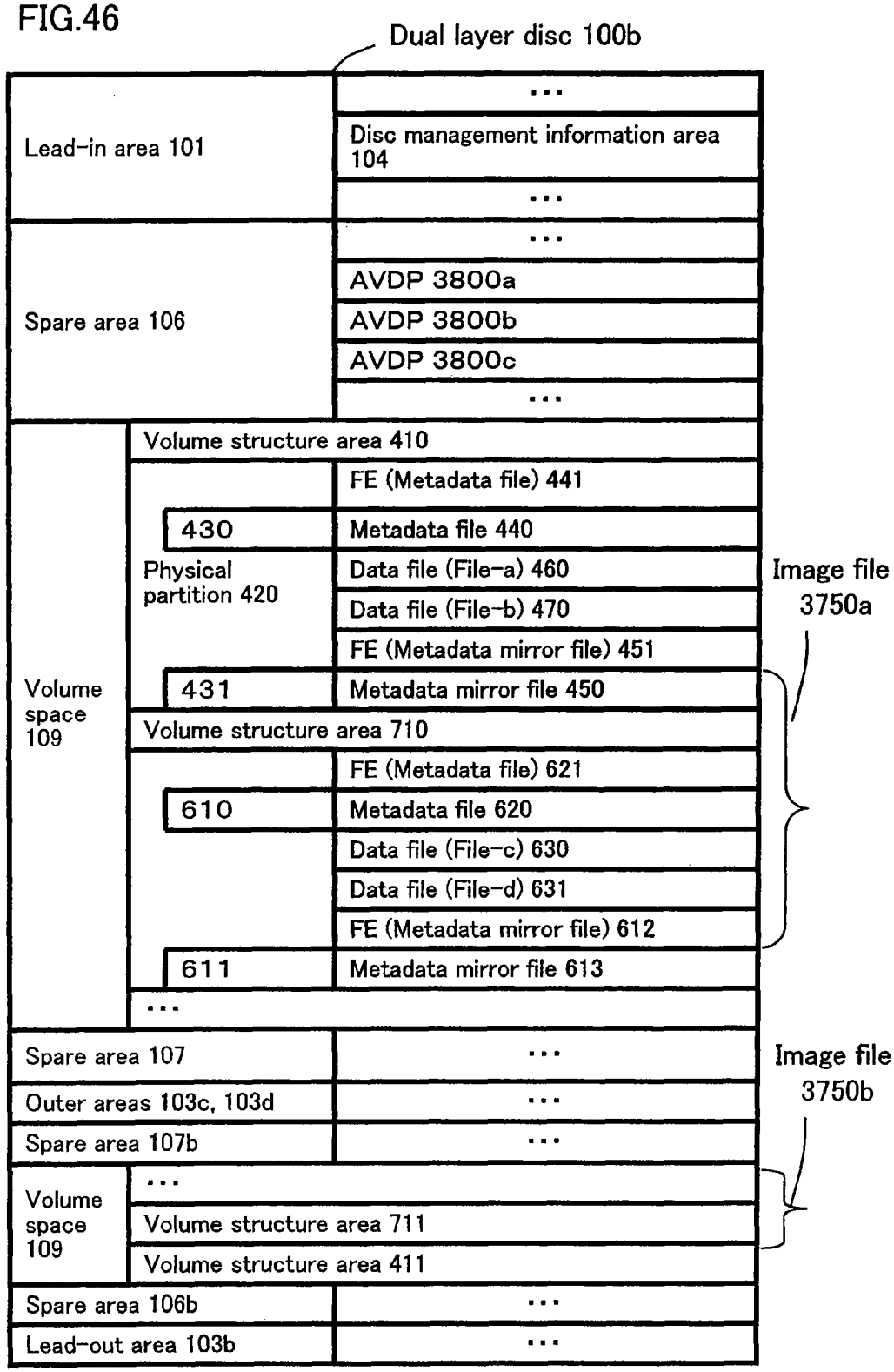
FIG. 46 is a diagram showing the data structure of the information on the information recording medium in an embodiment according to the present invention.

FIG. 46 shows a status where the image data 3750 including the volume structure areas 710 and 711 is recorded. The image data 3750 is similar to the image data 750 shown in FIG. 11.

The image data 3750 is divided into two parts (i.e. the image data 3750a and the image data 3750b). This division of the image data 3750 is similar to the case shown in FIG. 45.

In the image data 3750, new directory (Dir-C) and new files (File-c, File-d) are added. As a result, it is required to update the file structure. In order to update the file structure, an AVDP is updated. The AVDP is used as a start point to reproduce the file structure. The AVDP includes the recording location of the volume/file structure on the information recording medium 100b.

Specifically, the volume structure area 710 includes an AVDP 3800a which is update information of the AVDP 3600a. Similarly, the volume structure area 711 includes an AVDP 3800b and an AVDP 3800c which are the respective update information of the AVDP 3600b and the AVDP 3600c.

The generation of the image data 3750 includes the update of the AVDP. The system control section 301 updates the AVDP by performing so-called "read-modify-write" processing.

Specifically, an ECC block including the AVDP 3600a of the image data 3740 is read, and a portion corresponding to the AVDP 3600a among the read ECC block is re-written (modified) into the AVDP 3800a. In this case, the remaining portion other than the AVDP 3600a among the read ECC block is held as it is, when the remaining portion is not required to be re-written.

When the AVDP 3600a has been already updated, the latest AVDP is reproduced using replacement information and a corresponding portion is re-written.

The data thus obtained as a unit of ECC block is located at a predetermined location in the volume structure area 710 of the image data 3750.

Similarly, if necessary, a corresponding ECC block is read for each of the AVDP 3600b and the AVDP 3600c, and a portion of the corresponding ECC is re-written into a corresponding one of the AVDP 3800b and the AVDP 3800c. The AVDP 3800b and the AVDP 3800c are located at the respective predetermined locations in the volume structure area 711 of the image data 3750.

Thus, an image data 3750 is generated such that the image data 3750 includes the AVDP 3800a, the AVDP 3800b and the AVDP 3800c, which have been already updated.

When the image data 3750 is recorded on the information recording medium 100b shown in FIG. 45, it is necessary to pseudo overwriting the AVDP. This recording processing is similar to that described in Embodiment 3.

Specifically, the system control section 301 instructs the derive apparatus 310 to record the image data 3750. Herein, the image data 3750 is recorded as the image data 3750a and the image data 3750b. During the recording operation of the image data, the system control section 301 also instructs the derive apparatus 310 to record the AVDP 3800a, the AVDP 3800b and the AVDP 3800c.

Further, the system control section 301 outputs a generation instruction for generating a disc management information including the remapping management information list 3000 to the derive apparatus 310. The generation instruction includes the recording location information of one of the AVDP 3600a, AVDP 3600b and AVDP 3600c.

Upon the receipt of the generation instruction, the drive apparatus 310 updates the remapping management information list 3000 to reflect a new mapping status from the before-update AVDP to the after-update AVDP, and records the disc management information including the updated remapping management information list 3000.

For example, the drive apparatus 310 sets the location information of the AVDP 3600a to the original location information 1012 in the remapping management information 1010 #1, and sets the location information of the AVDP 3800a to the replacement location information 1013 in the remapping management information 1010 #1.

The drive apparatus 310 sets information indicating that the mapping from the original location information to the replacement location information in the remapping management information 1010 #1 is valid to the status information 1011b corresponding to the remapping management information 1010 #1.

Further, the drive apparatus 310 records the duplication of the AVDP 3800a, which is update information of the AVDP 3600a included in the image data 3750, at a predetermined location of the information recording medium 100b. The predetermined location is different from the recording location of the AVDP 3800a included in the image data 3750 (for example, the duplication of the AVDP 3800a is recorded in the spare area 106).

A similar processing is applicable to the AVDP 3600b and the AVDP 3600c. In response to the instruction from the system control section 301, the before-update AVDP is mapped to the after-update AVDP using the remapping management information 1010 and the status information 1101b is set to being valid. Further, the duplication of each of the AVDP 3600b and the AVDP 3600c is recorded at a predetermined location of the information recording medium 100b.

FIG. 47 shows an example of the remapping management information list 3000 after the pseudo overwrite is completed. In FIG. 47, the AVDP 3600a, the AVDP 3600b and the AVDP 3600c for the original location information 1012 are mapped to the AVDP 3800a, the AVDP 3800b and the AVDP 3800c for the replacement location information 1013, respectively.

As described in Embodiment 3, according to the UDF specification, the AVDP has a fixed logical address. Accordingly, the original location information 1012 has a fixed value. By correlating each fixed address value with one of the plurality of remapping management information (e.g. the remapping management information #1 to #3), it is possible to omit the original location information 1012 from each remapping management information shown in FIG. 47.

According to the UDF specification, the AVDP can be recorded in three different locations at maximum. The AVDP should be recorded or updated in at least two different locations among the three different locations.

Accordingly, in the recording processing mentioned above, it is possible to generate image data including two AVDPs (e.g. the AVDP 3600b and the AVDP 3600c), and update these AVDPs using pseudo overwrite so as to map the AVDP 3600b and the AVDP 3600c to the AVDP 3800b and the AVDP 3800c, respectively.

It is desirable to set the remapping management information, which is not used to map for the purpose of pseudo overwrite, to being invalid. For example, the remapping management information #1 in the remapping management information list 3000 shown in FIG. 44 can be set to being invalid. In this case, information indicating that it is invalid is set to the remapping management information #1.

In the recording processing mentioned above, the drive apparatus 310 sets valid information to the status information 1011b for the remapping management information in which the pseudo overwrite is performed, sets invalid information to the status information 1011b for the remapping management information in which the pseudo overwrite is not performed, generates a disc management information including the remapping management information list 3000, and records the disc management information in the disc management information area 104.

After completing the processing for recording such a file, the processing for reproducing the file is performed. The processing for reproducing the file is similar to that described in Embodiment 3.

Specifically, the system control section 301 instructs the drive apparatus 310 to reproduce data with a logical address of the AVDP 3600a.

The drive apparatus 310 detects remapping management information including the original location information corresponding to the AVDP 3600a from the remapping management information list 3000. Then, the drive apparatus 310 refers to status information corresponding to the remapping management information and determines whether or not the remapping management information is valid.

When it is determined that the remapping management information is invalid, there does not exist any mapping for pseudo overwrite. In this case, the drive apparatus 310 reproduces the data of the requested AVDP 3600a and returns the reproduced data to the system control section 301.

When it is determined that the remapping management information is valid, there exists a mapping for pseudo overwrite. In this case, the drive apparatus 310 accesses the AVDP 3800a rather than the requested AVDP 3600a according to the mapping, reproduces the data of the requested AVDP 3800a and returns the reproduced data to the system control section 301.

The AVDP 3800a includes information indicating the recording location of the latest volume structure area 710. Accordingly, the processing for reproducing the file can be performed in a similar manner as described in the embodiments mentioned above.

According to the structure mentioned above, it is possible to pseudo overwrite the AVDP using the remapping management information. As a result, on the logical space, the file structure for pseudo overwrite is the same as the file structure for read-only. Thus, it is possible to reproduce data recorded in the write-once recording medium, even in the system which is not capable of performing the reproduction operation for the read-only recording medium or the rewritable recording medium.

Further, by limiting information to be pseudo overwritten into the AVDP(s) for the purpose of updating the volume/file structure, it is possible to simplify the structure of the system control section 301.

This is because the number of the AVDPs is limited to two or three according to the UDF standard and each of the AVDPs has a fixed logical address.

Furthermore, only the minimum data is updated by pseudo-overwriting. Thus; the burden of the replacement process can be alleviated, and the consumption of the spare area can be suppressed.

Furthermore, by providing information having a valid/invalid information for the remapping management information (e.g. status information 1011b), it is possible that the drive apparatus 310 efficiently knows which AVDP is mapped to new AVDP by performing the pseudo overwrite.

Without such valid/invalid information, it is necessary to always update all of the remapping management information. In this case, even if the AVDP itself is not updated, the remapping management information must be updated. This causes unnecessary recording processing.

In the reproduction processing, it is necessary to operate under the assumption that all of the remapping management information has been updated. As a result, it is necessary to access the AVDP for reading it, regardless of whether or not the remapping management information has been actually updated. This increases the time required for the reproduction processing.

Thus, it is useful to have a valid/invalid information for the remapping management information as the status information 1011b.

Further, the duplication information of the updated AVDP is recorded. This makes it possible to improve the reliability of the data. In particular, according to the UDF specification, the AVDP serves as a start point for reproduction data. Therefore, it is very useful to improve the reliability of the AVDP.

As shown in FIG. 46, it is desirable to record the duplication information of all of the updated AVDP on the same spare area.

Further, by recording the duplication information of the updated AVDP at an inner location than the updated AVDP, the following effect can be obtained.

Specifically, in FIG. 46, the recording location of the duplication information of the AVDP 3800a, the AVDP 3800b and the AVDP 3800c is located at an inner location in the spare area 106 than the recording location of the AVDP 3800a, the AVDP 3800b and the AVDP 3800c. Such a data allocation makes it possible to rapidly access the latest AVDP.

In particular, the two AVDPs are recorded apart from each other in the volume space. By recording them at an inner location of the spare area, it is possible to rapidly access the AVDP(s).

The structure of the spare area is not limited to that shown in portion (b) of FIG. 1. For example, like a DVD-RAM disc, a plurality of spare areas can be located in a concentric manner in an intermediate area between an inner area and an outer area of the user data area 108.

In such an information recording medium, it is desirable to record the duplication information at an inner location than the original information.

According to the present embodiment of the invention, efficient incremental recording of data can be performed using the image data, and it becomes possible to rapidly access the latest file structure.

In the embodiment mentioned above, a method for updating the data by recording the image data is described. However, this method can be applied to a method for sequentially record a file and finally recording the latest volume structure and the AVDPs.

INDUSTRIAL APPLICABILITY

The present invention can be applied to, but are not limited to, an information recording medium such as a write-once optical disc, a recording/reproduction apparatus such as a disc video recorder or a disc video camera.

The invention claimed is:

1. A recording apparatus for recording second address information and second information in an information recording medium to update first information recorded in the information recording medium to the second information by updating first address information recorded in the information recording medium to the second address information, wherein the first address information includes a first address indicating at least one of locations of the information recording medium at which the first information is recorded, the second address information includes a second address indicating at least one of locations of the information recording medium at which the second information is to be recorded, the recording apparatus comprises a host apparatus and a drive apparatus, the host apparatus includes a system control section for controlling the drive apparatus, the drive apparatus includes a head section for performing a recording operation or a reproduction operation for the information recording medium and a drive control section for controlling the head section, the system control section generates an update instruction including a third address indicating at least one of the locations of the information recording medium at which the first address information is recorded and the second address information as an update instruction for updating the first address information to the second address information, and outputs the update instruction to the drive apparatus, and the drive control section receives the update instruction from the host apparatus, the drive control section, in accordance with the update instruction, controls the head section to record the second address information in the information recording medium, generates disc management information including correlation information, and controls the head section to record the disc management information in the information recording medium, and the drive control section controls the head section to record the second information in the information recording medium in accordance with the second address, wherein the correlation information correlates the first address information with the second address information by correlating the third address with a fourth address indicating at least one of the locations of the information recording medium at which the second address information is recorded, such that when reproducing the information is recorded, such that when reproducing the information recorded by the recording apparatus by a reproduction apparatus, in response to a reproduction instruction for the first address information from the reproduction apparatus, wherein the reproduction instruction includes the third address, the correlation information is referenced to by the reproduction apparatus so as to determine the fourth address based on the third address such that the reproduction apparatus reproduces the second address information based on the determined fourth address instead of reproducing the first address information.

2. A recording apparatus according to claim 1, wherein the disc management information further includes status information indicating whether the correlation information is valid or invalid, and the drive control section sets the status information to indicate that the correlation information is valid when the first address information has been updated to the second address information.

3. A reproducing apparatus for reproducing information recorded in an information recording medium, wherein first information, second information, first address information, second address information and disc management information at least, are recorded in the information recording medium, the second information is update information of the first information, the first address information includes a first address indicating at least one of locations of the information recording medium at which the first information is recorded, the second address information is update information of the first address information, the second address information includes a second address indicating at least one of locations of the information recording medium at which the second information is recorded, and the disc management information includes correlation information which correlates the first address information with the second address information by correlating a third address indicating at least one of the locations of the information recording medium at which the first address information is recorded with a fourth address indicating at least one of the locations of the information recording medium at which the second address information is recorded, the reproducing apparatus comprising a host apparatus and a drive apparatus, wherein the host apparatus includes a system control section for controlling the drive apparatus, the drive apparatus includes a head section for performing a recording operation or a reproduction operation for the information recording medium and a drive control section for controlling the head section, the system control section generates a first reproduction instruction including the third address as a first reproduction instruction for reproducing the first address information, and outputs the first reproduction instruction to the drive apparatus, the drive control section receives the first reproduction instruction from the host apparatus, determines the fourth address based on the third address by referencing to the correlation information, controls the head section to reproduce the second address information correlated with the first address information based on the determined fourth address, and outputs the reproduced second address information to the host apparatus, the system control section receives the second address information from the drive apparatus, generates a second reproduction instruction including the second address as a second reproduction instruction for reproducing the second information, and outputs the second reproduction instruction to the drive apparatus, and the drive control section receives the second reproduction instruction from the host apparatus, controls the head section to reproduce the second information recorded in the information recording medium in accordance with the second reproduction instruction, and outputs the reproduced second information to the host apparatus.

4. A reproducing apparatus according to claim 3, wherein the disc management information further includes status information indicating whether the correlation information is valid or invalid, and the drive control section determines whether the correlation information is valid or invalid by referring to the status information corresponding to the correlation information in accordance with the first reproduction instruction, controls the head section to reproduce the second address information correlated with the first address information and outputs the reproduced second address information to the host apparatus when it is determined that the correlation information is valid, and controls the head section to reproduce the first address information and outputs the reproduced first address information to the host apparatus when it is determined that the correlation information is invalid.

5. An information recording medium having first address information, first information, second address information, second information and disc management information recorded thereon, wherein the second information is update information of the first information, the first address information includes a first address indicating at least one of locations of the information recording medium at which the first information is recorded, the second address information is update information of the first address information, the second address information includes a second address indicating at least one of locations of the information recording medium at which the second information is recorded, and the disc management information includes correlation information which correlates the first address information with the second address information by correlating a third address indicating at least one of the locations of the information recording medium at which the first address information is recorded with a fourth address indicating at least one of the locations of the information recording medium at which the second address information is recorded, such that when reproducing the information recorded by a recording apparatus on the information recording medium by a reproduction apparatus, in response to a reproduction instruction for the first address information from the reproduction apparatus, wherein the reproduction instruction includes the third address, the correlation information is referenced to by the reproduction apparatus so as to determine the fourth address based on the third address such that the reproduction apparatus reproduces the second address information based on the determined fourth address instead of reproducing the first address information.

6. An information recording medium according to claim 5, further having duplication information of the second address information recorded thereon, wherein the disc management information further includes status information indicating whether the correlation information is valid or invalid, the status information is set to indicate that the correlation information is valid when the first address information has been updated to the second address information.

* * * * *